June 21, 1960 T. U. BURKE ET AL 2,941,738

AUTOMATIC RECORD TAPE HANDLING AND LOADING MECHANISM

Filed June 12, 1958 42 Sheets-Sheet 1

AUTOMATIC RECORD TAPE HANDLING AND LOADING MECHANISM

Filed June 12, 1958 42 Sheets-Sheet 6

AUTOMATIC RECORD TAPE HANDLING AND LOADING MECHANISM

Filed June 12, 1958 42 Sheets-Sheet 7

June 21, 1960 T. U. BURKE ET AL 2,941,738

AUTOMATIC RECORD TAPE HANDLING AND LOADING MECHANISM

Filed June 12, 1958 42 Sheets-Sheet 9

AUTOMATIC RECORD TAPE HANDLING AND LOADING MECHANISM

Filed June 12, 1958

June 21, 1960 T. U. BURKE ET AL 2,941,738

AUTOMATIC RECORD TAPE HANDLING AND LOADING MECHANISM

Filed June 12, 1958 42 Sheets-Sheet 13

AUTOMATIC RECORD TAPE HANDLING AND LOADING MECHANISM

Filed June 12, 1958

June 21, 1960 T. U. BURKE ET AL 2,941,738

AUTOMATIC RECORD TAPE HANDLING AND LOADING MECHANISM

Filed June 12, 1958 42 Sheets-Sheet 17

June 21, 1960 T. U. BURKE ET AL 2,941,738

AUTOMATIC RECORD TAPE HANDLING AND LOADING MECHANISM

Filed June 12, 1958 42 Sheets-Sheet 23

June 21, 1960 T. U. BURKE ET AL 2,941,738

AUTOMATIC RECORD TAPE HANDLING AND LOADING MECHANISM

Filed June 12, 1958 42 Sheets-Sheet 27

AUTOMATIC RECORD TAPE HANDLING AND LOADING MECHANISM

Filed June 12, 1958

AUTOMATIC RECORD TAPE HANDLING AND LOADING MECHANISM

Filed June 12, 1958

June 21, 1960 T. U. BURKE ET AL 2,941,738

AUTOMATIC RECORD TAPE HANDLING AND LOADING MECHANISM

Filed June 12, 1958 42 Sheets-Sheet 31

June 21, 1960 T. U. BURKE ET AL 2,941,738

AUTOMATIC RECORD TAPE HANDLING AND LOADING MECHANISM

Filed June 12, 1958 42 Sheets-Sheet 33

June 21, 1960 T. U. BURKE ET AL 2,941,738

AUTOMATIC RECORD TAPE HANDLING AND LOADING MECHANISM

Filed June 12, 1958 42 Sheets-Sheet 35

June 21, 1960 T. U. BURKE ET AL 2,941,738

AUTOMATIC RECORD TAPE HANDLING AND LOADING MECHANISM

Filed June 12, 1958 42 Sheets-Sheet 37

June 21, 1960 T. U. BURKE ET AL 2,941,738

AUTOMATIC RECORD TAPE HANDLING AND LOADING MECHANISM

Filed June 12, 1958 42 Sheets-Sheet 38

June 21, 1960 T. U. BURKE ET AL 2,941,738

AUTOMATIC RECORD TAPE HANDLING AND LOADING MECHANISM

Filed June 12, 1958 42 Sheets-Sheet 41

United States Patent Office 2,941,738
Patented June 21, 1960

2,941,738

AUTOMATIC RECORD TAPE HANDLING AND LOADING MECHANISM

Thomas U. Burke and Frederick G. Hughes, Poughkeepsie, Hans Reichle, Mahopac Falls, and Thomas L. Vinson, Poughkeepsie, all of New York, assignors to International Business Machines Corporation, New York, N.Y., a corporation of New York Filed June 12, 1958, Ser. No. 741,543

25 Claims. (Cl. 242—55.12)

This invention relates to a machine for manipulating and processing record tape.

More particularly, the invention relates to a machine capable of locating reels of record tape at a designated storage location, delivering such tape reels to a tape transport mechanism adapted to process the tape, loading such tape reels into operative relation to the tape transport mechanism, and then, after the tape has been processed, recovering the tape reels from the tape transport mechanism and returning the same to their former storage location or to a designated different storage location.

A change of tape reels on transport mechanism of the type shown in James A. Weidenhammer et al. United States Patent 2,792,217 requires about half a minute, and since the time required to process a reel of tape at processing speeds heretofore employed has been in excess of five minutes, the tape loading time has been of comparatively little consequence. However, with the advent of higher tape processing speeds, the time required to supply tape to the tape transport unit becomes an important consideration if maximum utility of the system is to be realized. For example, at tape processing speed of 300 inches of tape per second, a 2400 foot length of tape can be processed in less than two minutes. At the higher tape processing speed it is possible, therefore, that tape reel changing may consume as much as one-half the available processing time, and the time so consumed assumes a much greater importance.

Increase in the weight of tape reels is a further factor that dictates the use of automatic tape reel handling equipment. A reel of two inch tape, as contemplated herein, alone weighs almost 10 pounds, and when the reel must be lifted from storage racks disposed at various levels, carried to the tape transport mechanism and loaded on reel driving spindles which may be more than 5 feet above floor level, the physical effort, when exerted over a period of time, is too much for the endurance of operating personnel.

Furthermore, record tape reels are presently stored in receptacles in the form of metal "cans," which must be opened and from which the reel must be removed before it can be placed on the drive spindle of a tape transport. This operation is not only time consuming, but also has the more serious consequence that the tape is repeatedly exposed to the atmosphere, to damaging particles of dirt and dust in the atmosphere, and to the hazard of damage to both reel and tape as a result of manual handling. These latter considerations indicate the desirability of a system adapted to manipulate and process tape on reels housed in a capsule or cartridge so constructed that the cartridge can be loaded on the spindles of a tape transport and the reels within the cartridge can be driven by the tape transport spindles and run free in the cartridge. Use of a cartridge, as suggested, will eliminate the time required to remove new reels of tape from and return processed reels of tape to the reel package now employed. By the same token, also eliminated will be the time required to thread a new tape across the tape transport unit and attach it to the empty reel. Of even greater importance is the fact that a permanent tape reel package or cartridge will provide complete protection for the tape in storage, transport and processing.

It is, therefore, the primary object of the present invention to provide a record tape storage and processing system in which record tape reels in storage are automatically located and mechanically transported from storage locations to processing locations and vice versa.

The system herein consists of modular tape storage, transporting, and processing units. The tape storage unit is a framework within which are mounted a plurality of monorail tracks each of which is adapted to support a reel cartridge having therein a pair of tape reels. The storage unit preferably provides several storage levels, each level of which is adapted to accommodate a plurality of reel cartridges. Associated with each pair of storage units is a cartridge transporting carriage and elevator which upon receipt of a command will transverse horizontally and vertically to a designated tape reel cartridge storage address from which it laterally withdraws a tape reel cartridge and carries it to a delivery location in the storage unit where it is deposited for subsequent pickup by cartridge-handling mechanism associated with the tape transport. The tape reel cartridge carriage and elevator, while at the reel delivery position, may pick up a processed reel cartridge and return it to a storage address. The tape transport has associated therewith mechanism for securing a cartridge at a delivery position and for moving such cartridge laterally to a reel loading position in front of the tape transport. From such loading position further mechanism associated with the tape transport automatically loads the cartridge onto the reel drive spindles of the tape transport and threads the tape under the tape processing heads and into a pair of vacuum columns at the face of the tape transport. The same tape transport-associated mechanism operates to remove a processed tape cartridge from the tape reel spindles and return it to a delivery position where it is accessible to the cartridge carriage and elevator unit for return to storage. The system is designed to manipulate and process a succession of tape reel cartridges under control of an operating program such that any tape processing operation may be performed automatically without regard to any complexities that may be involved.

The nature of the invention can be more fully understood by reading the following detailed specification, which is illuminated by the drawings forming a part hereof, in which drawings like reference numerals indicate like parts, and in which.

Figure 3:
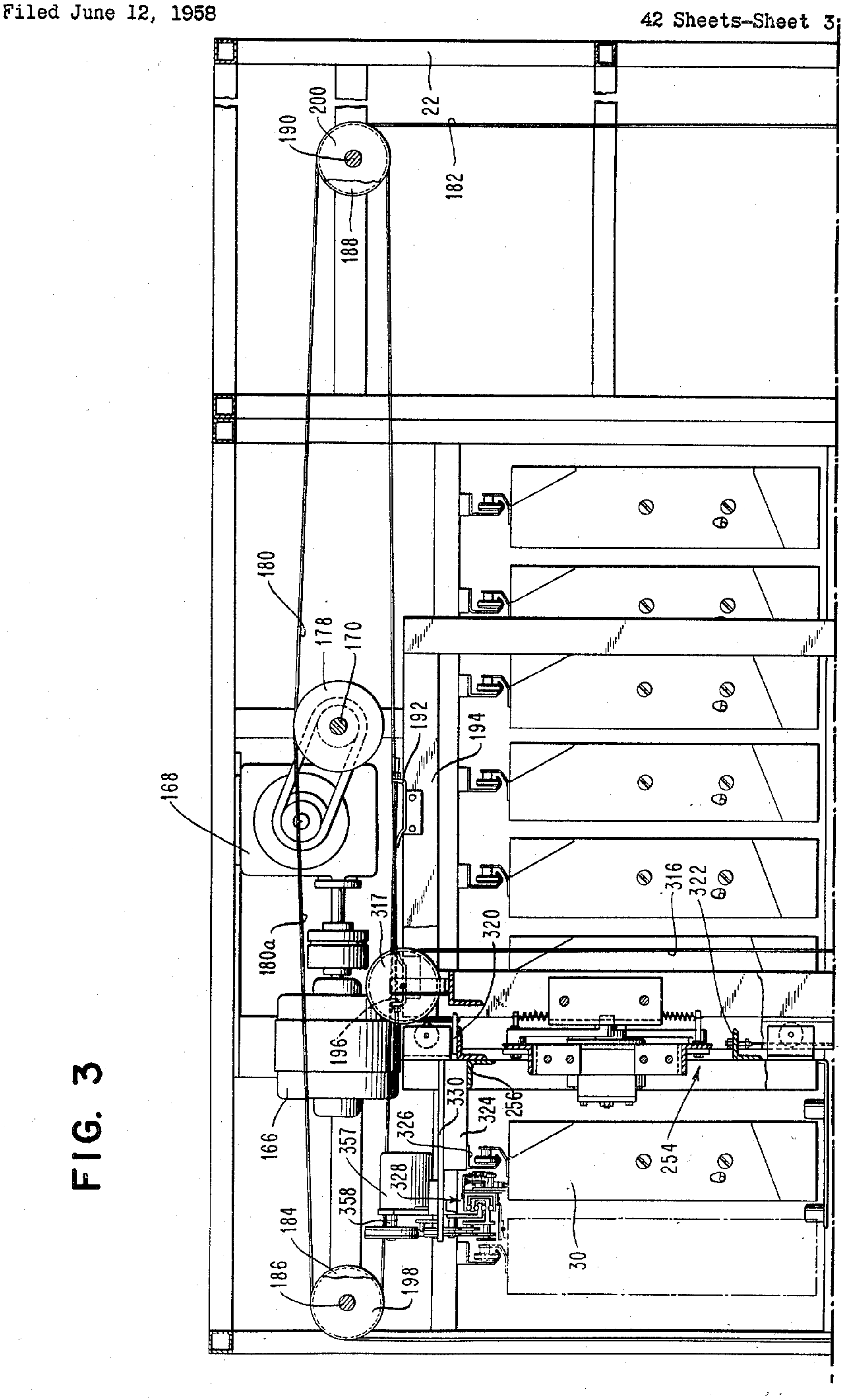
Figure 3A:
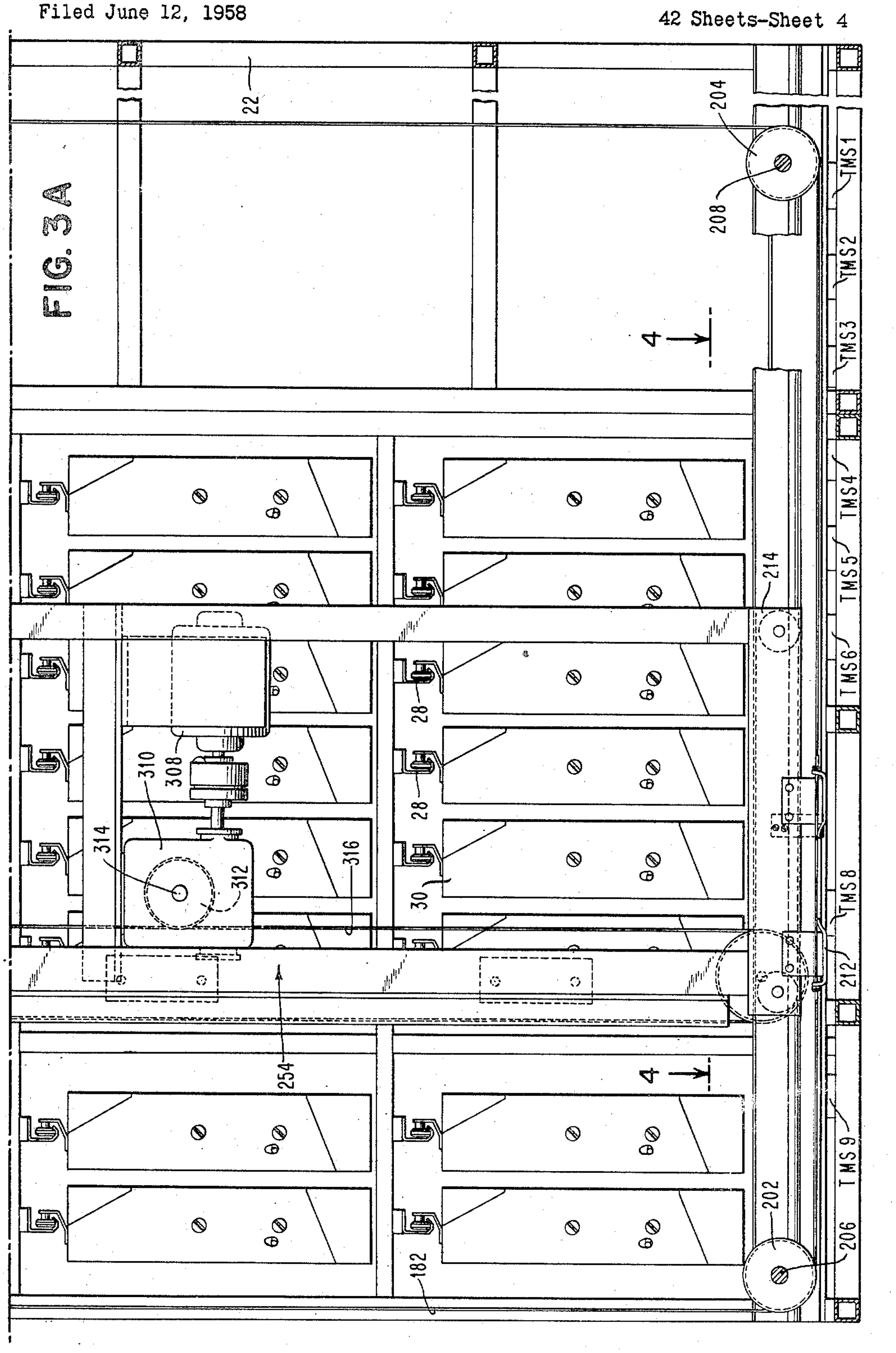
Figure 4:
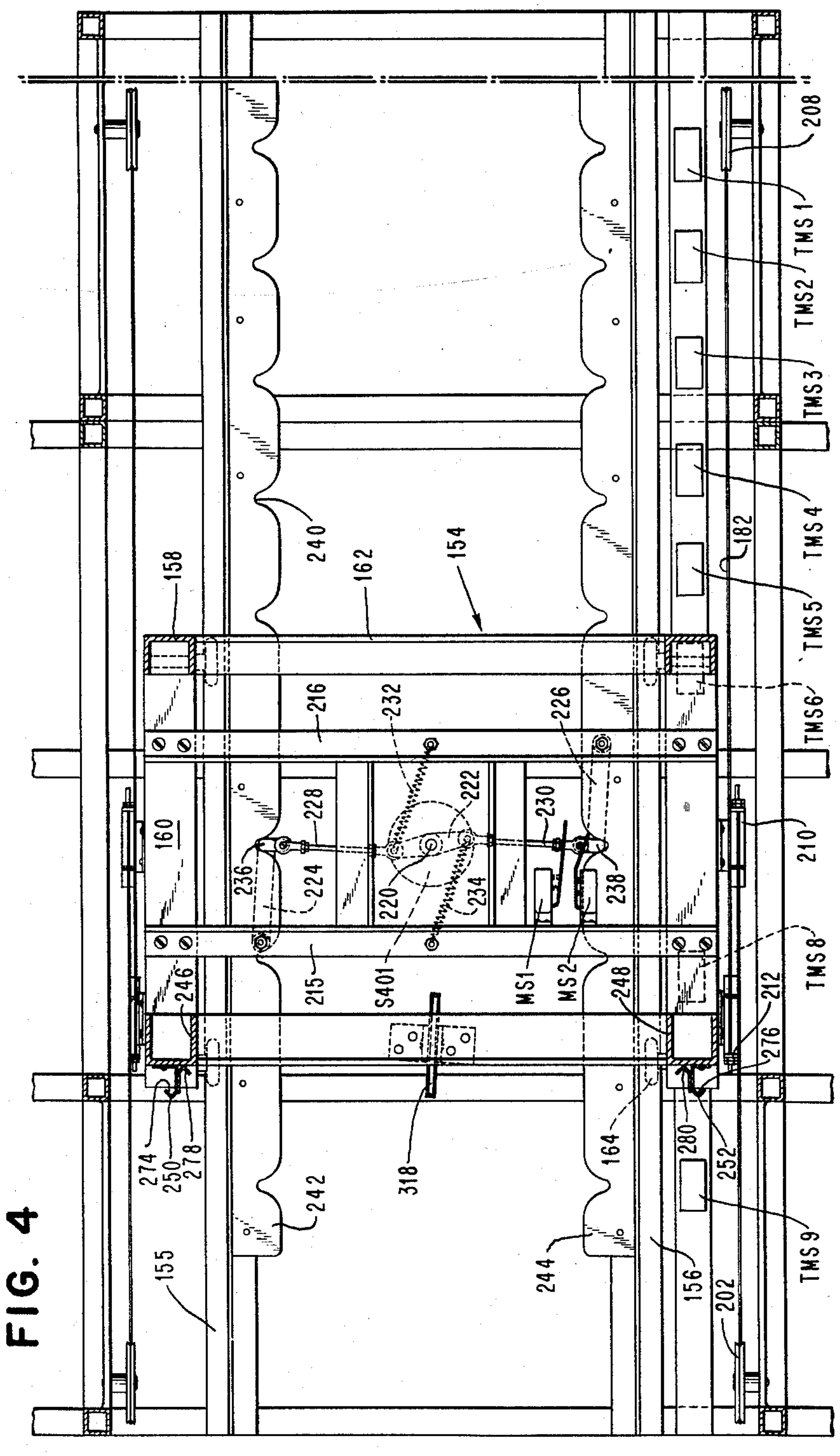
Figure 5:
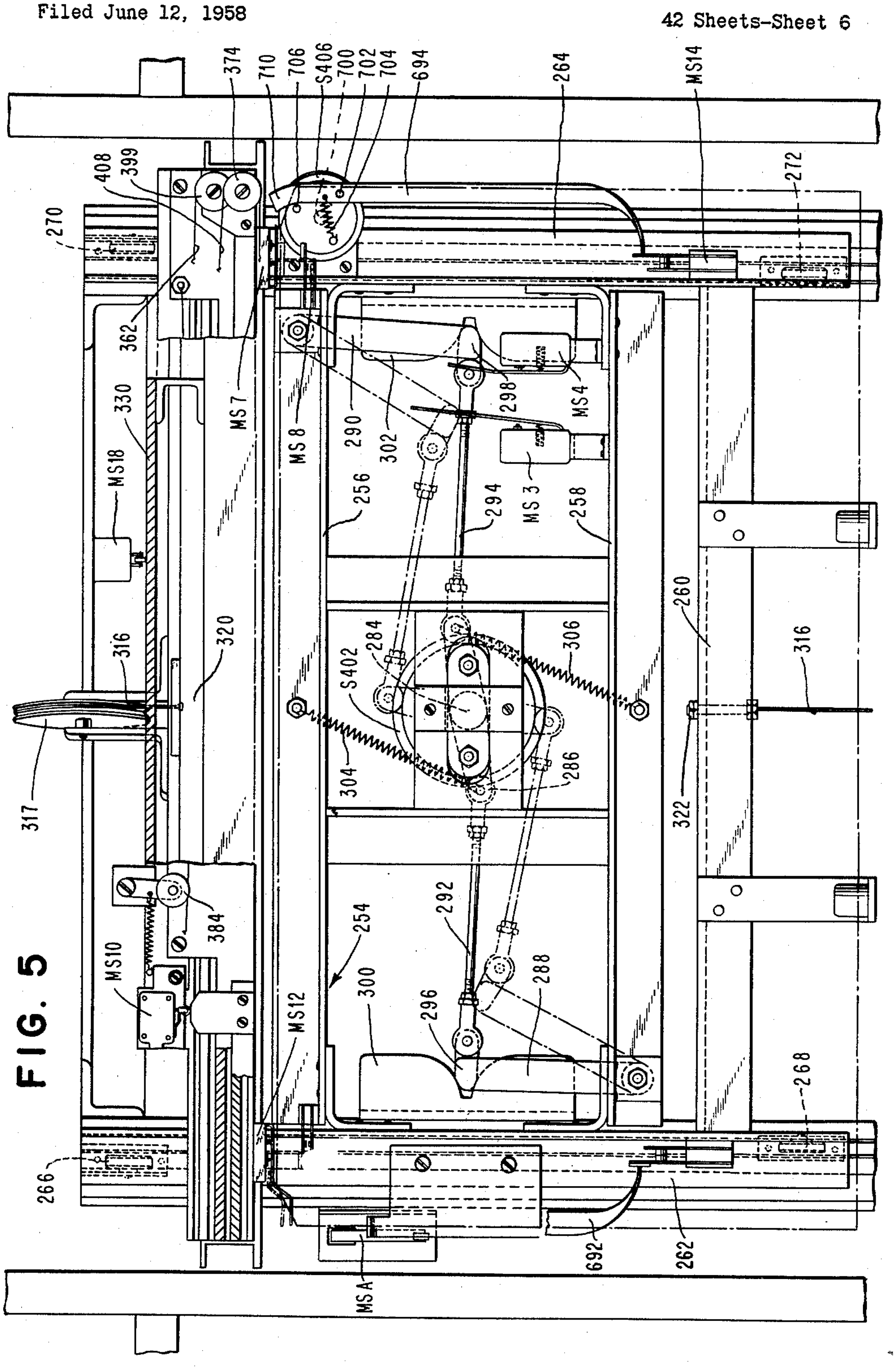
Figures 6, 7, 8, 9:
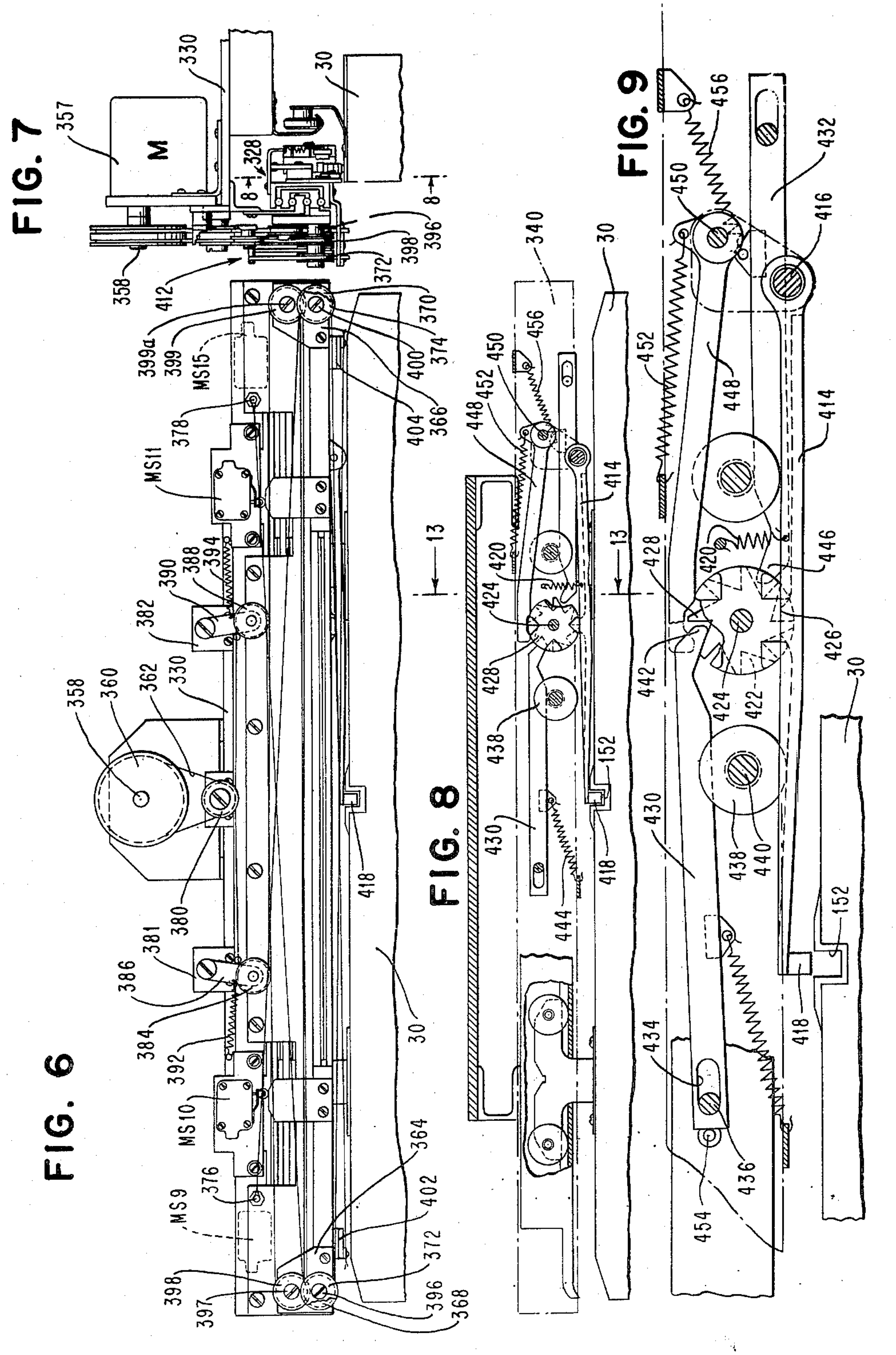
Figures 10, 12:
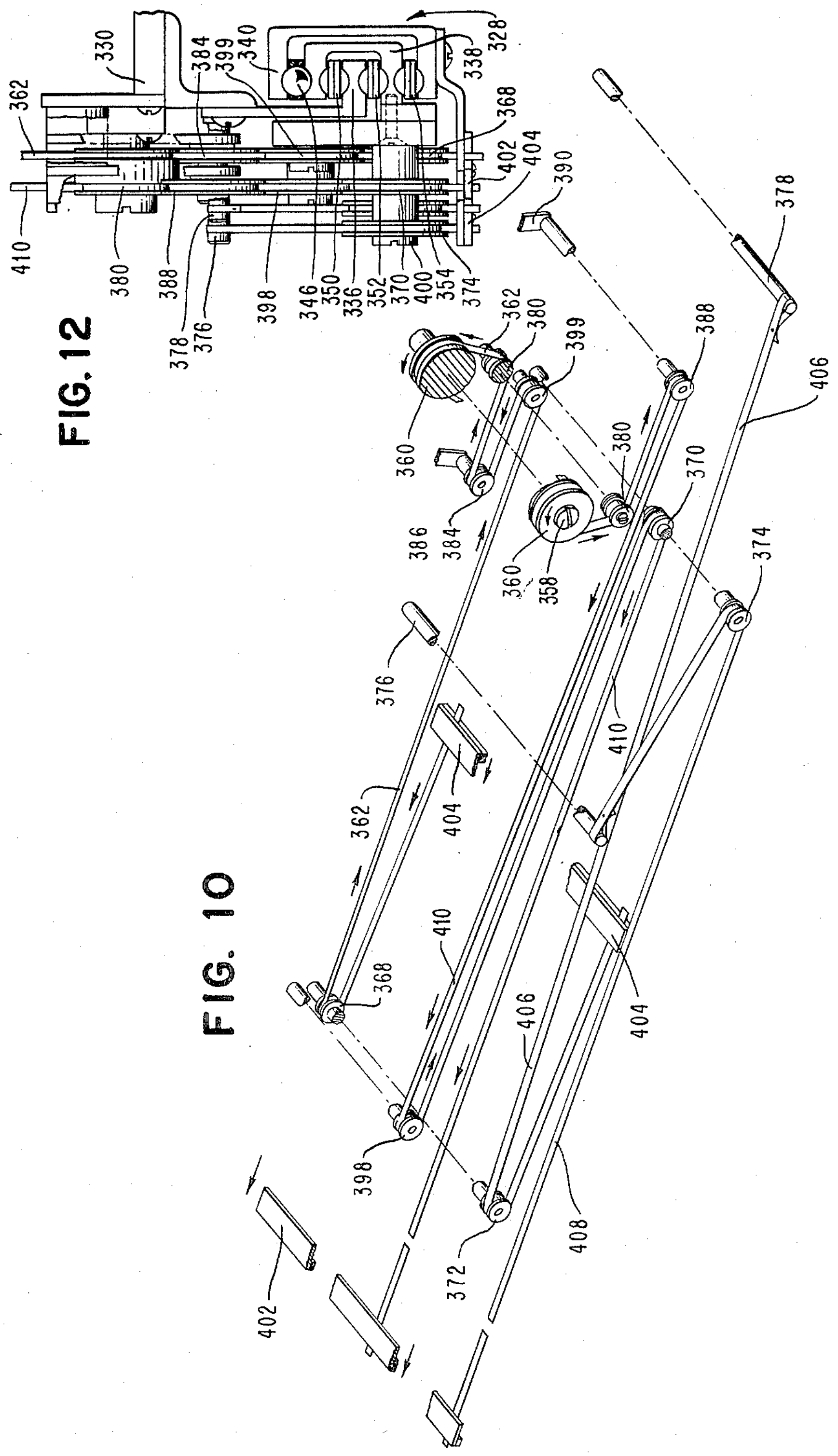
Figure 11:
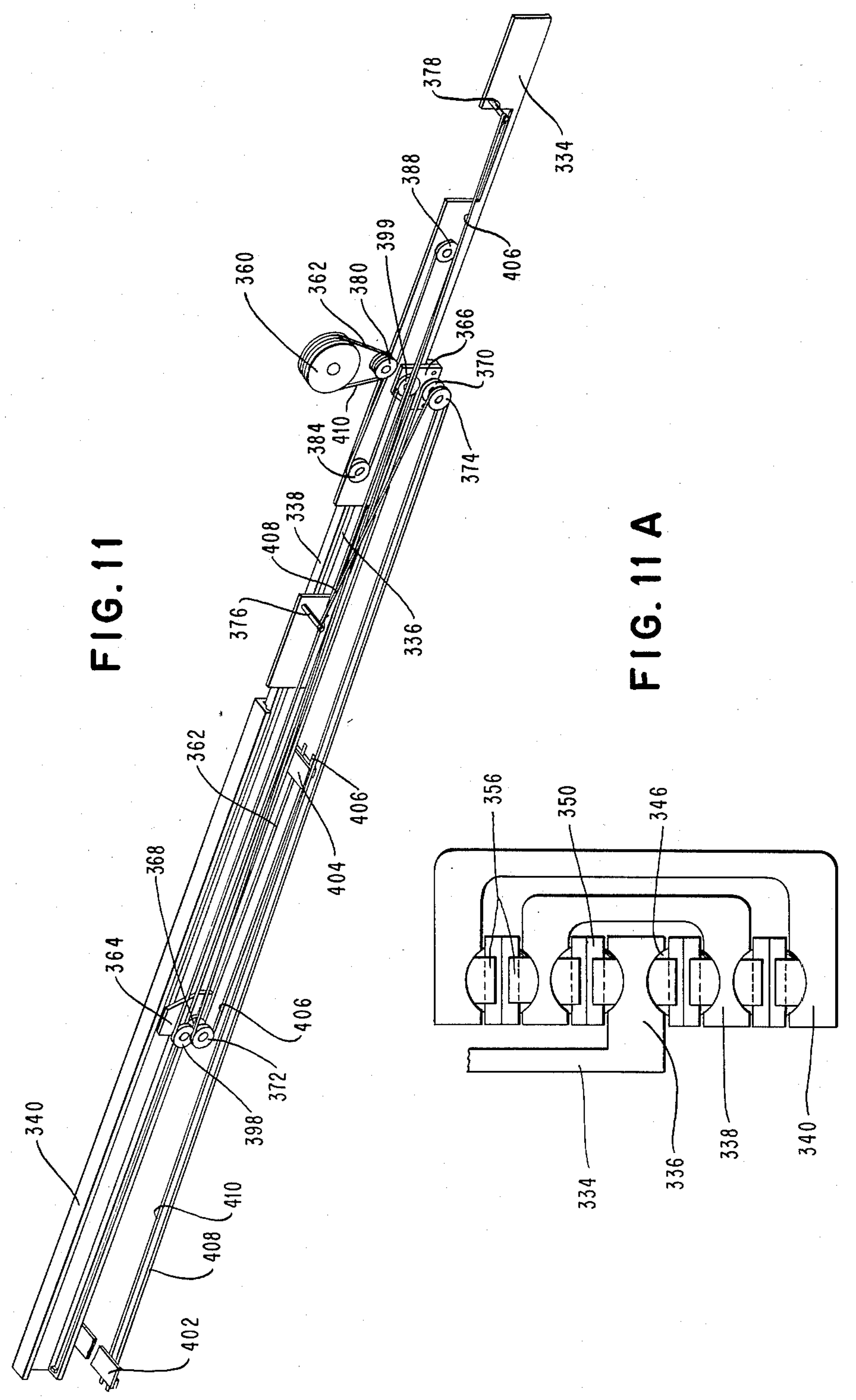
Figure 15:
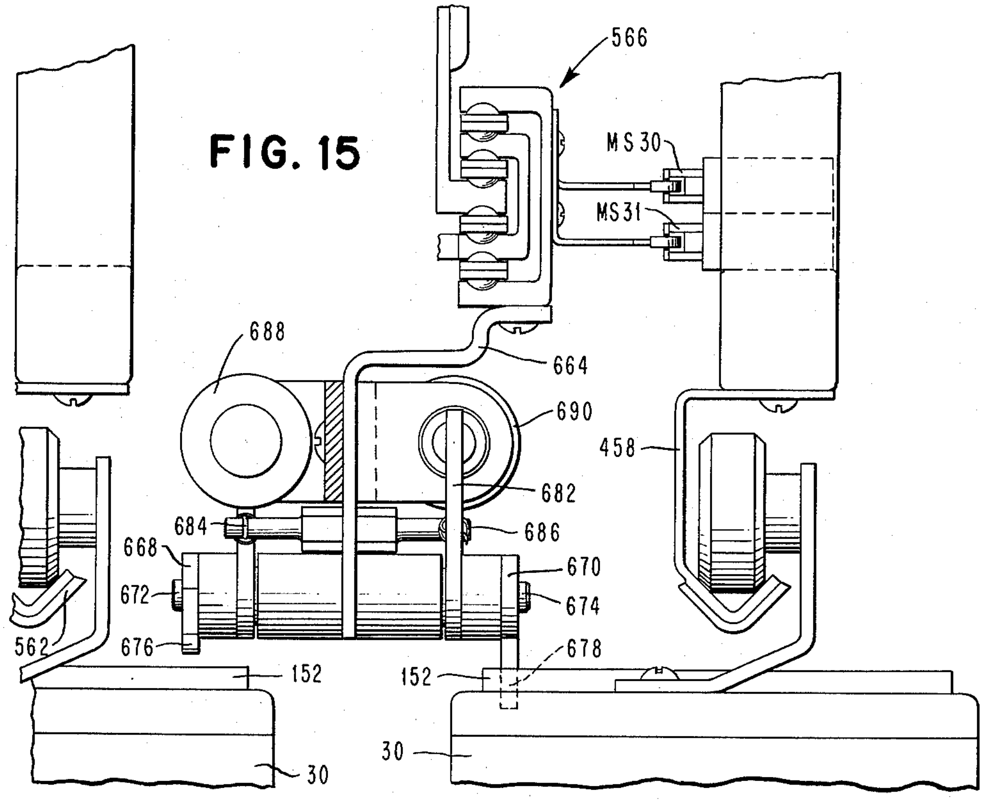
Figure 13:
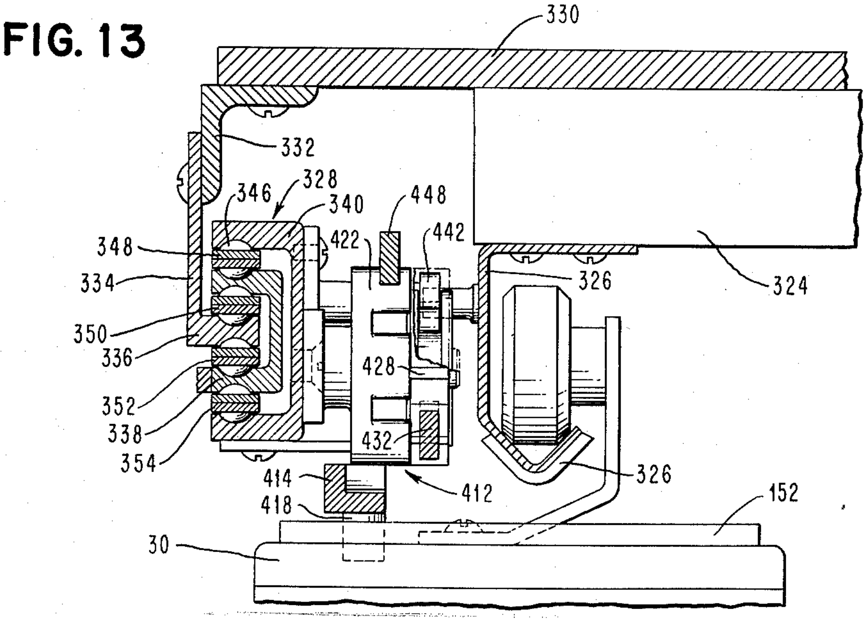
Figure 14:
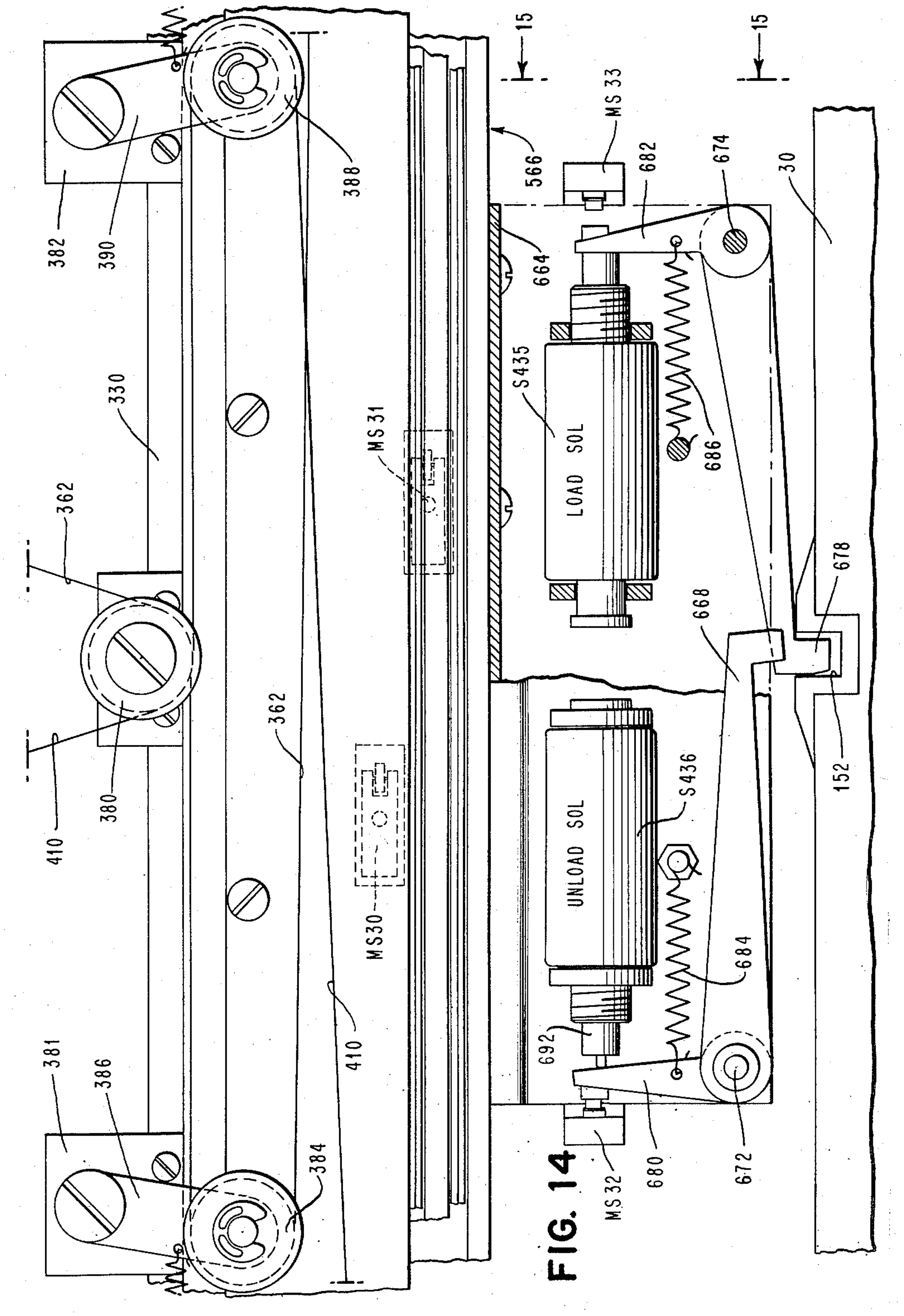
Figure 16:
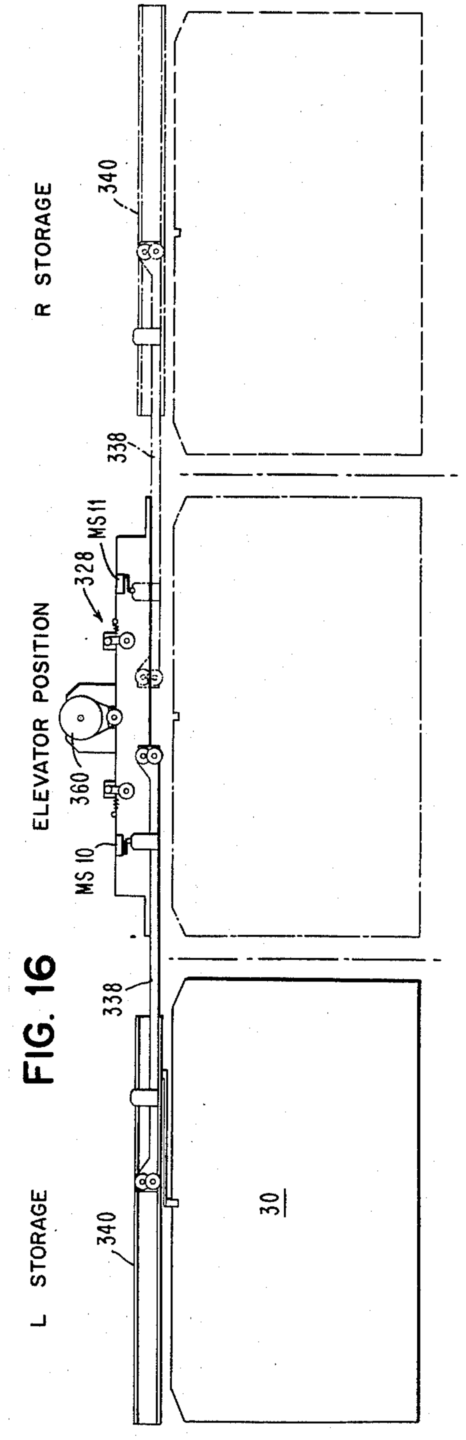
Figure 17:
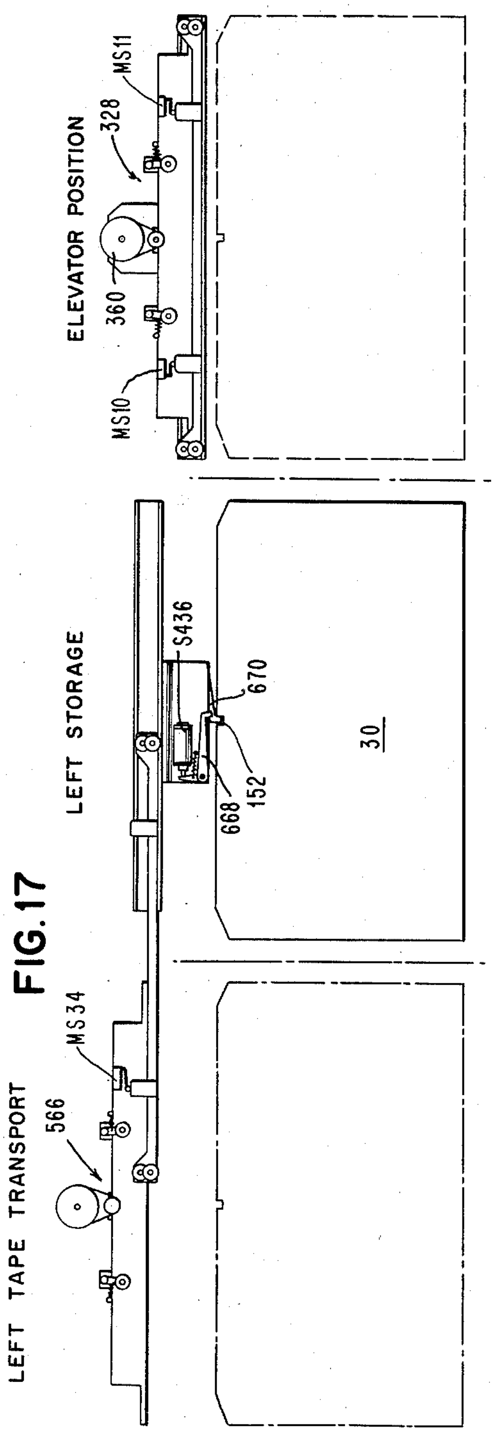
Figure 18:
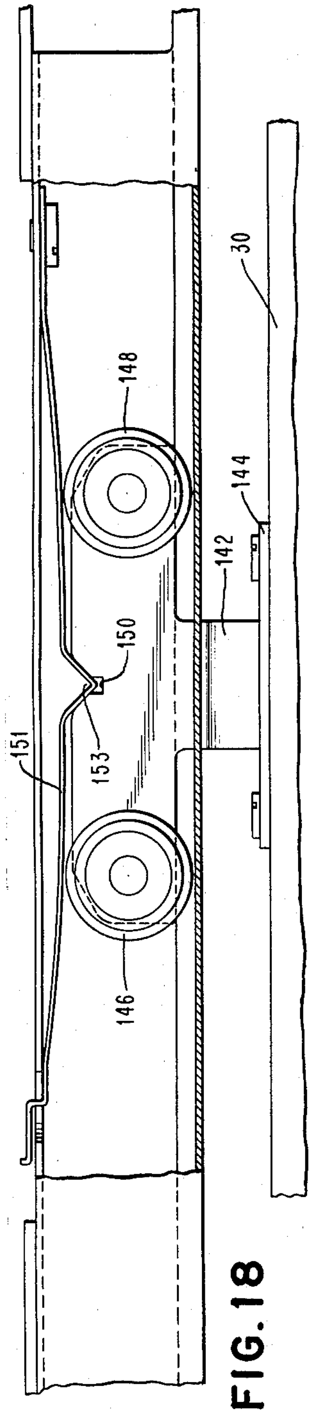
Figure 18A:
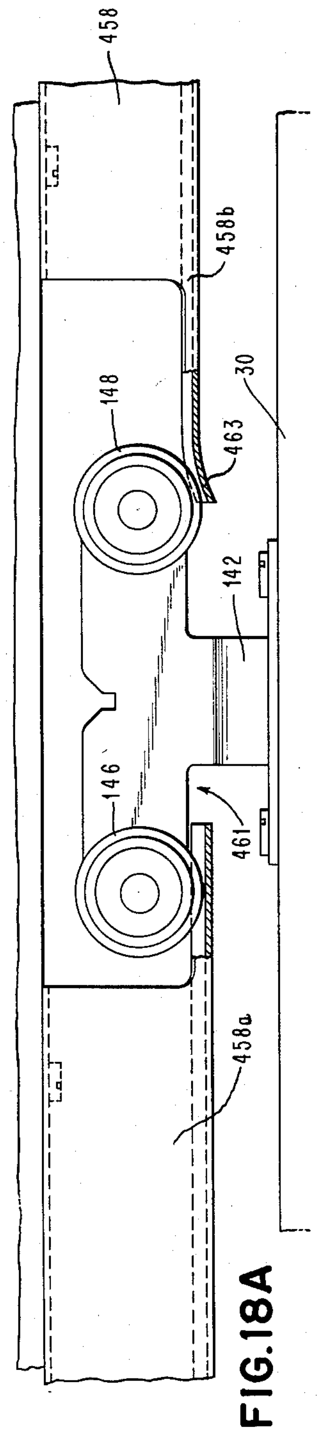
Figure 18B:
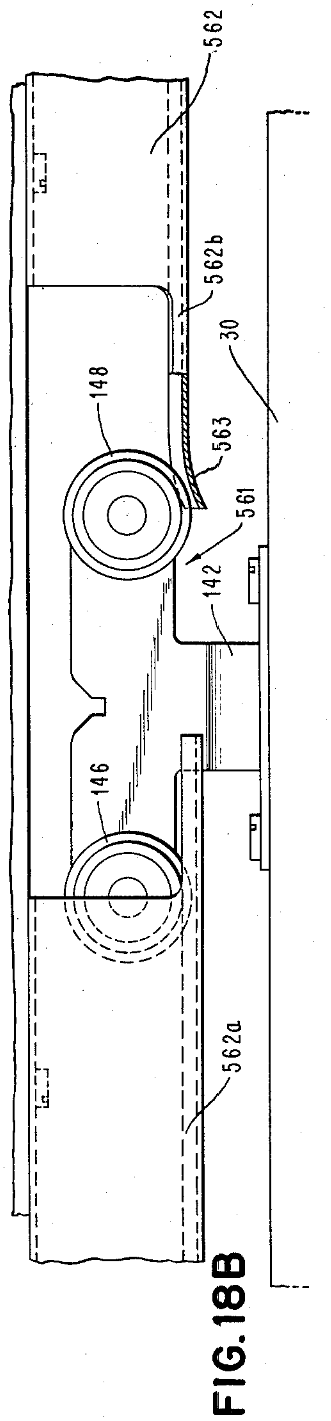
Figure 19:
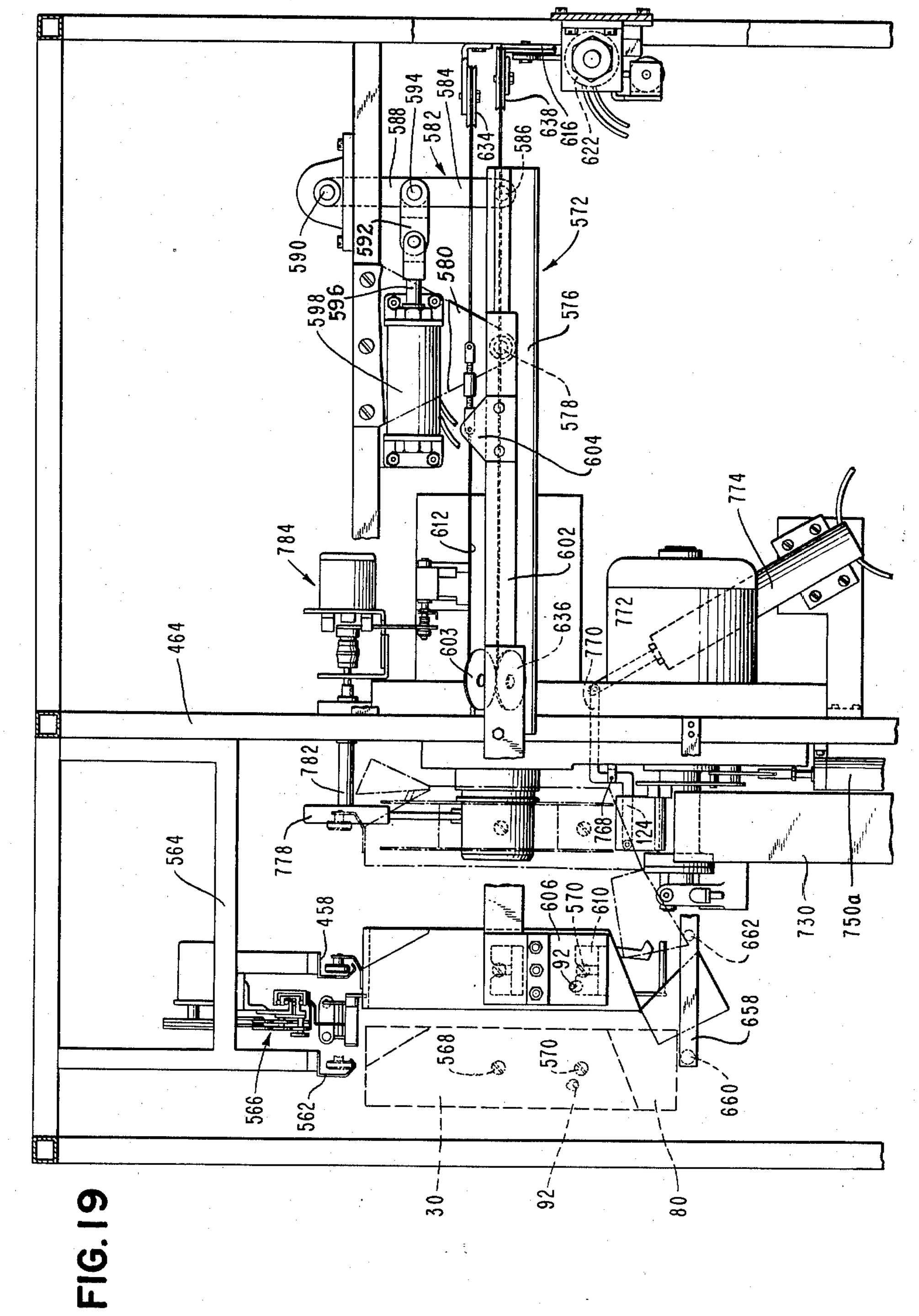
Figure 20:
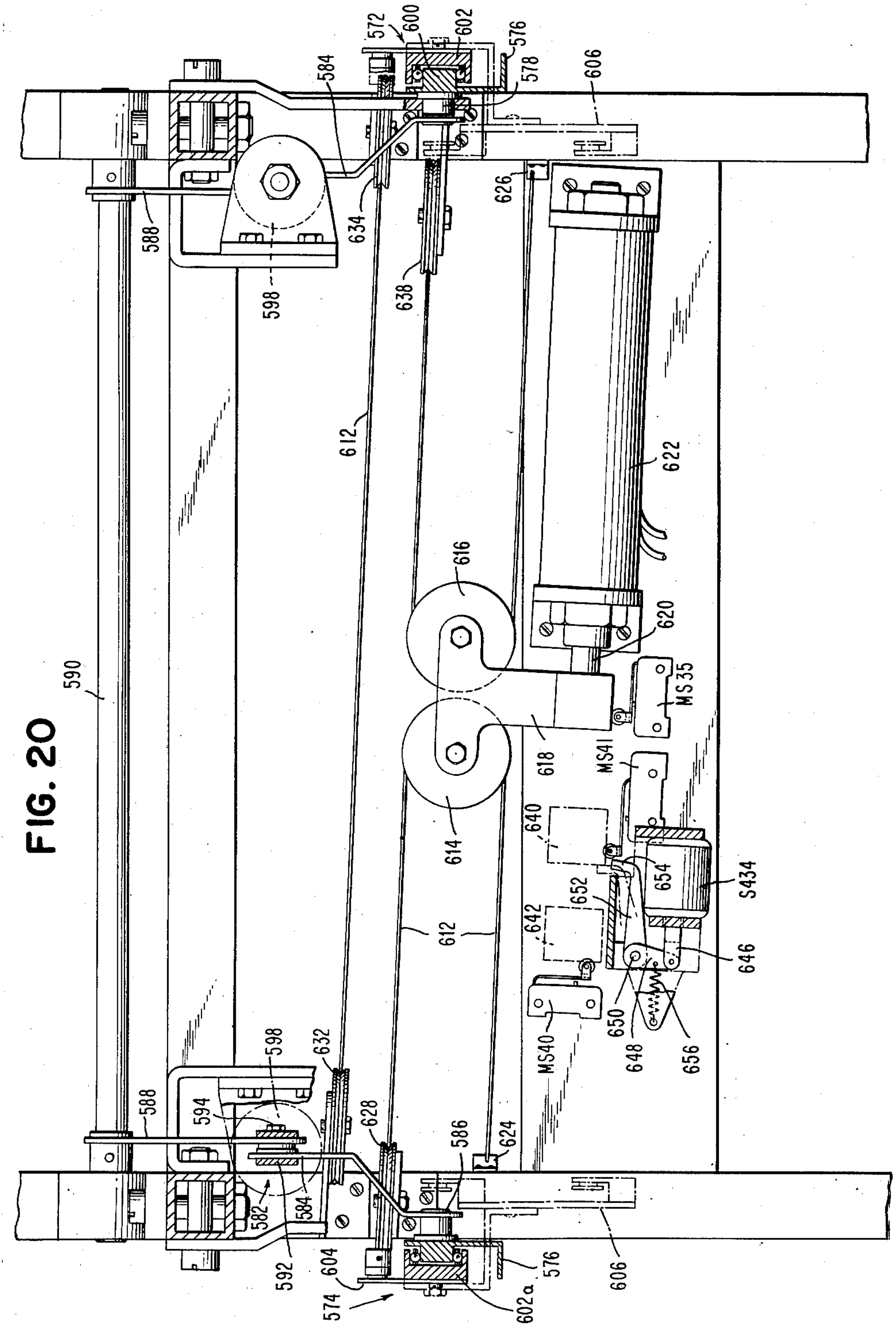
Figure 20A:
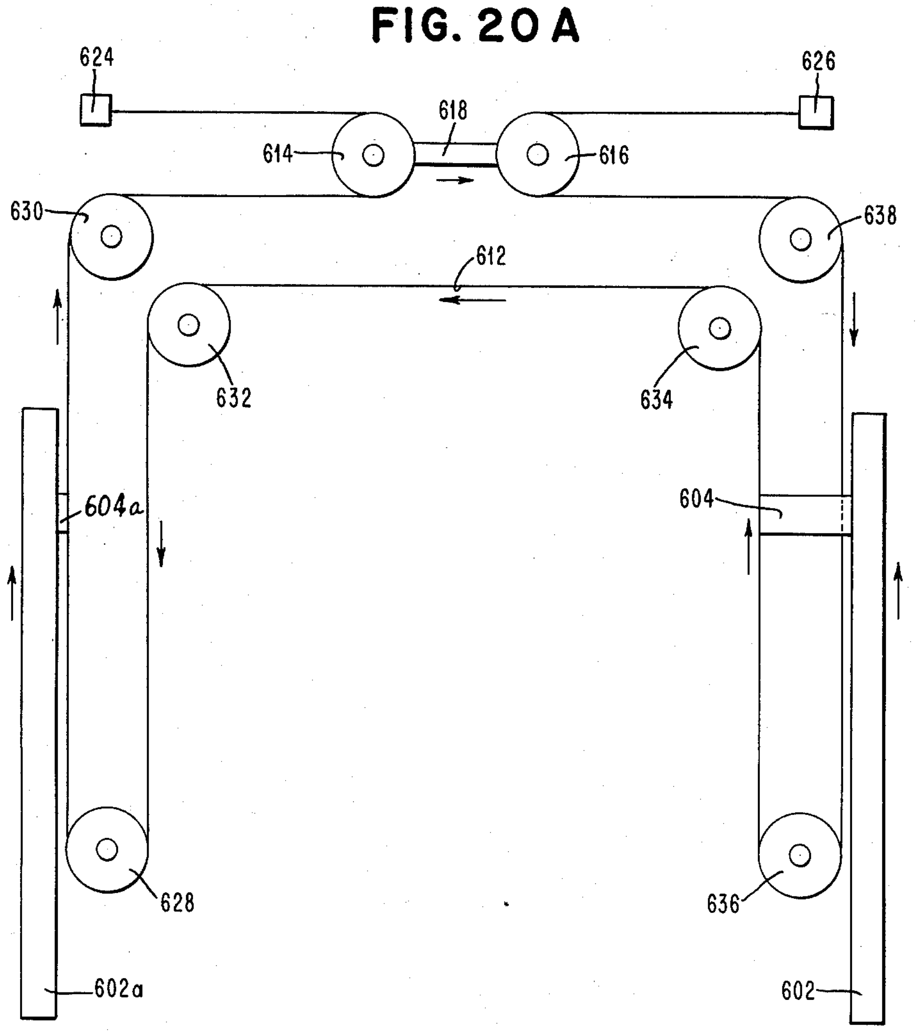
Figure 21:
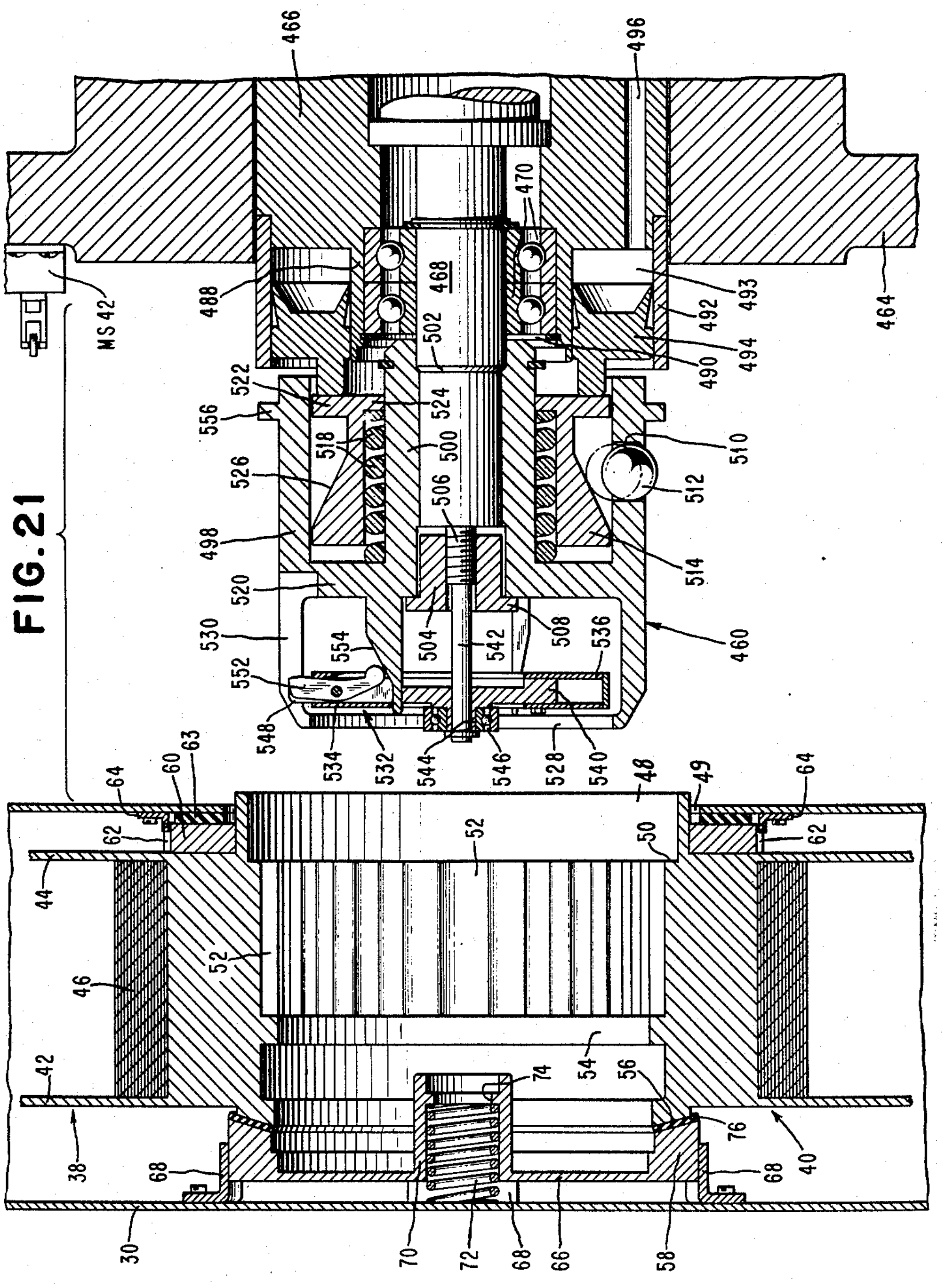
Figure 22:
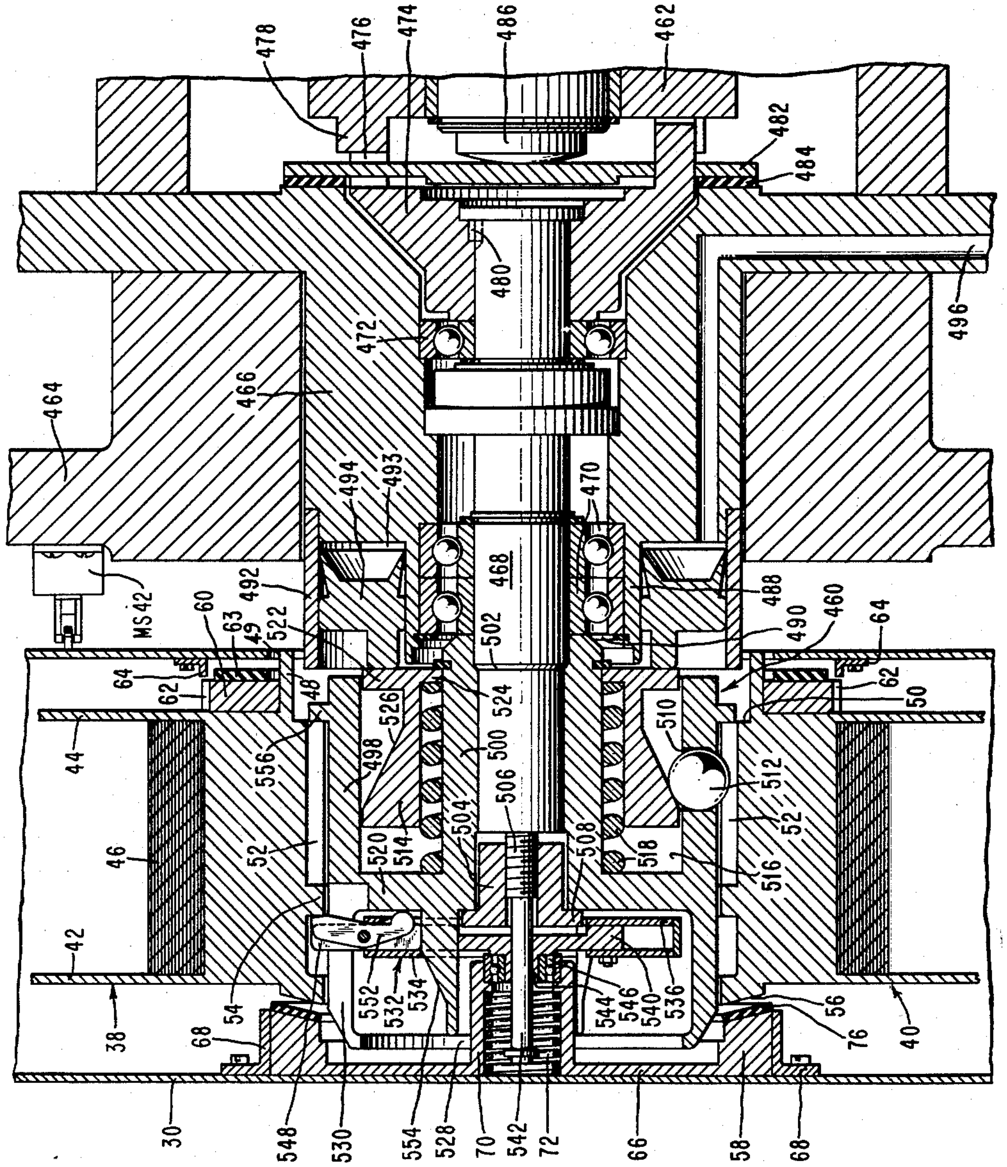
Figure 23:
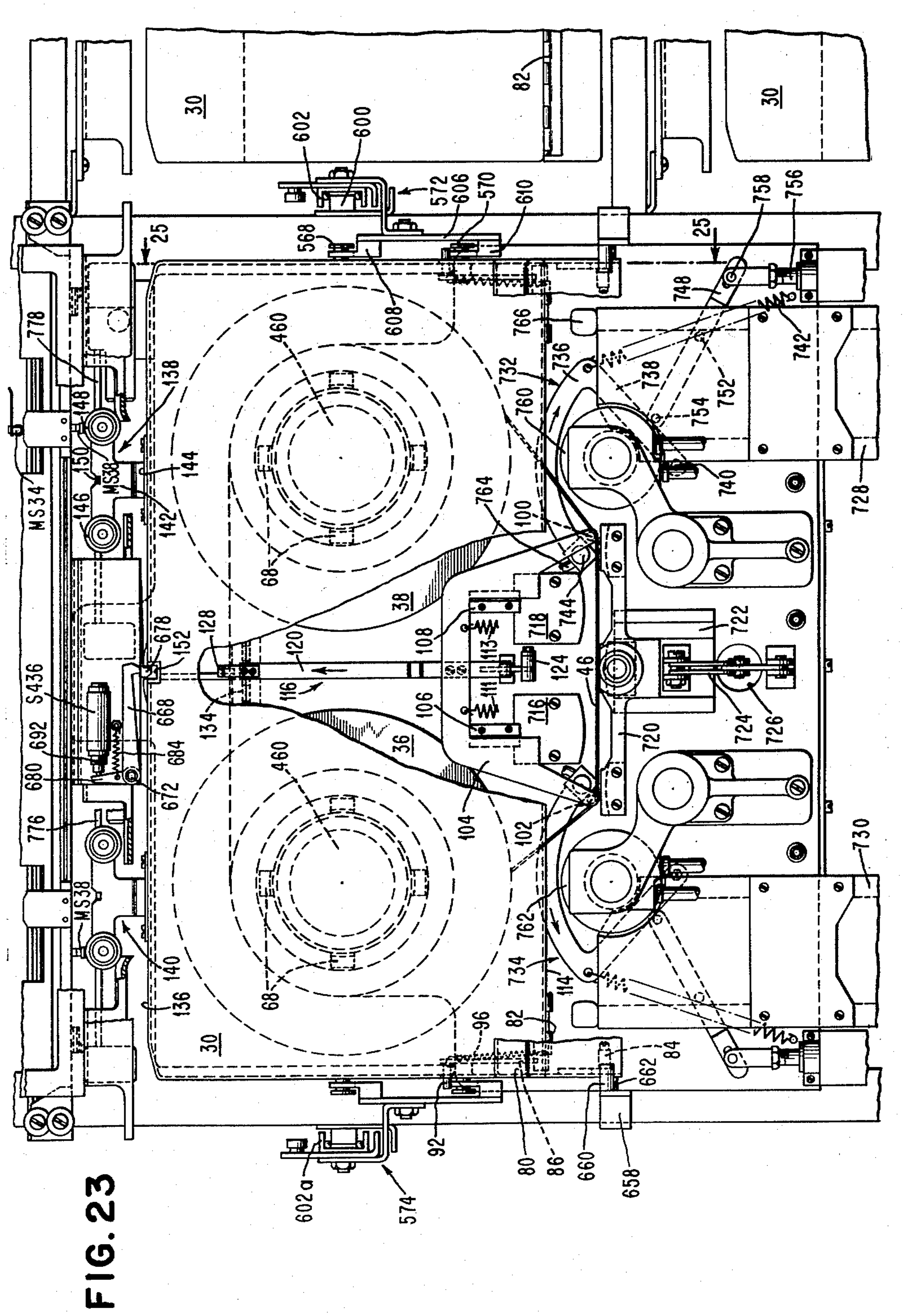
Figure 24:
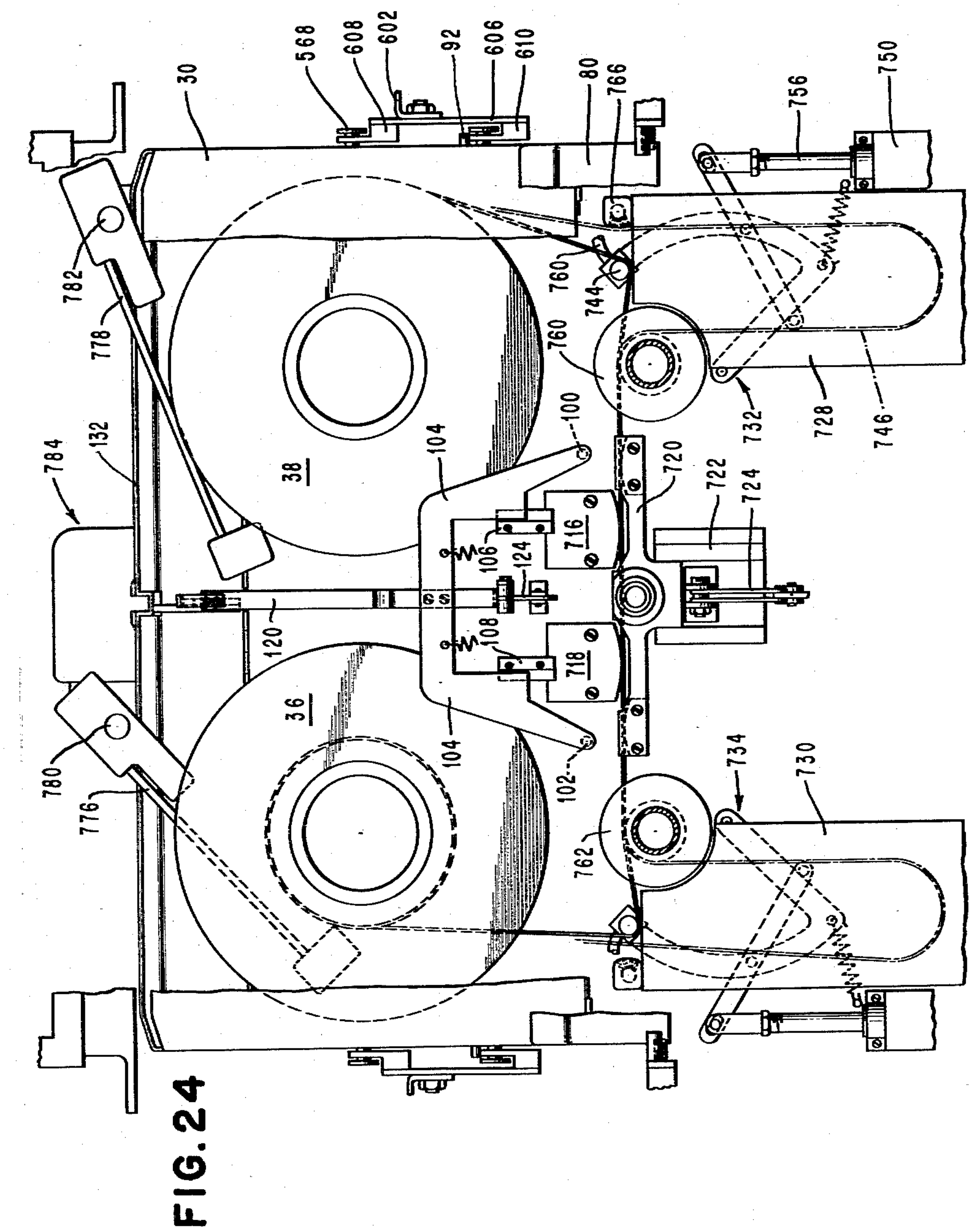
Figure 25:
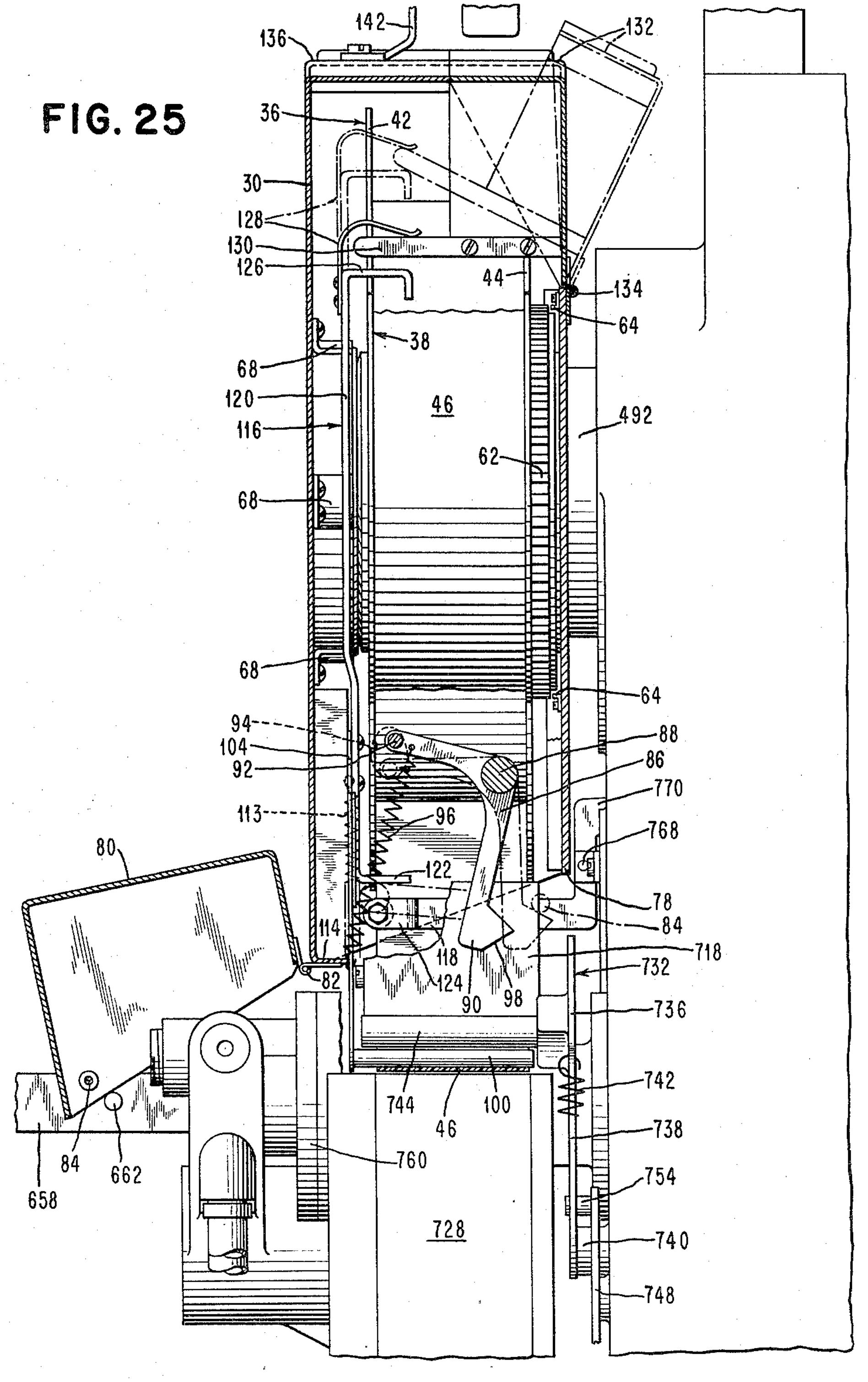
Figure 26:
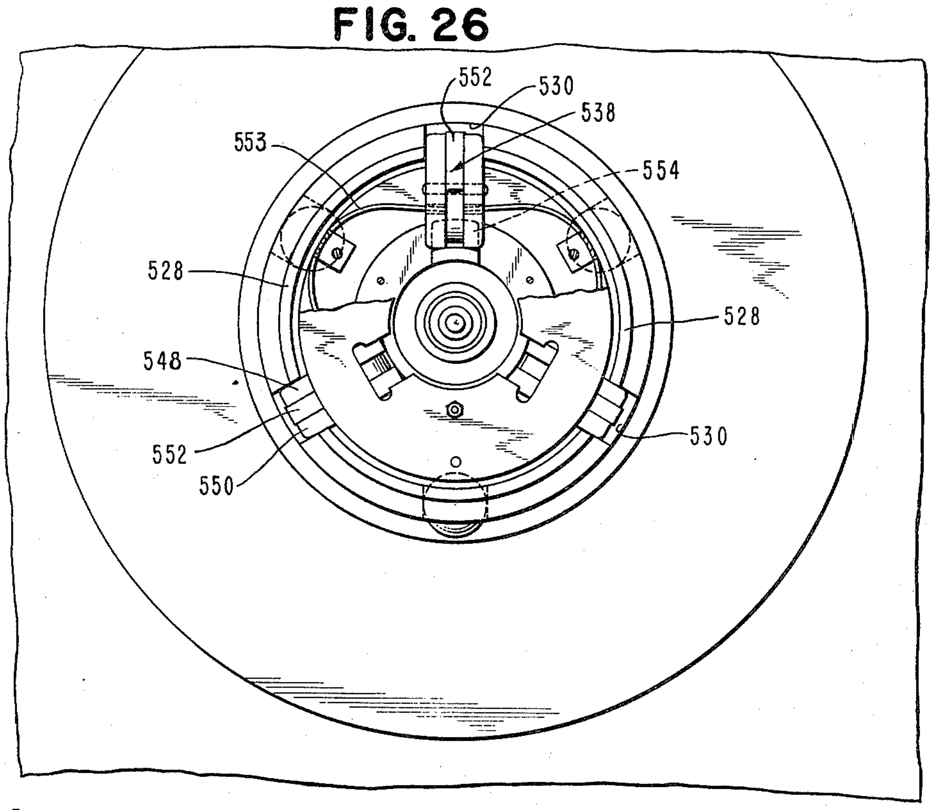
Figure 33:
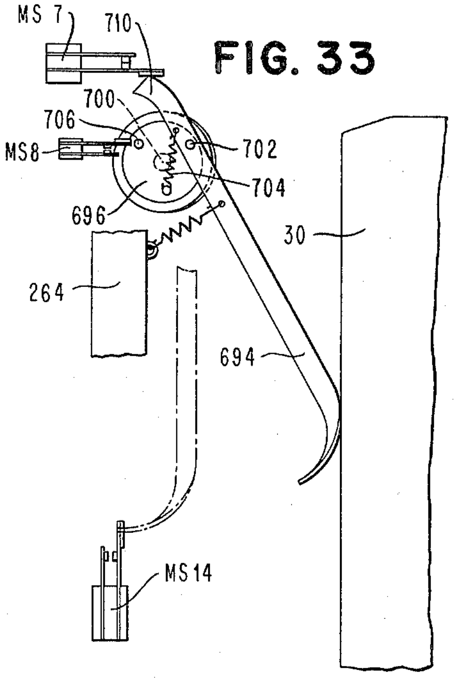
Figure 34:
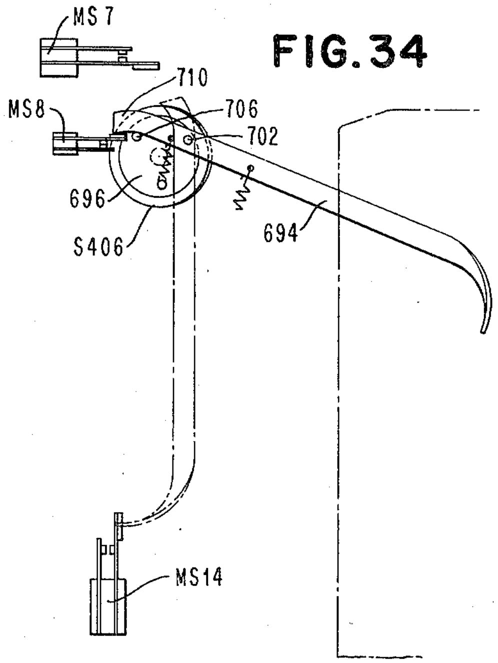
Figure 35:
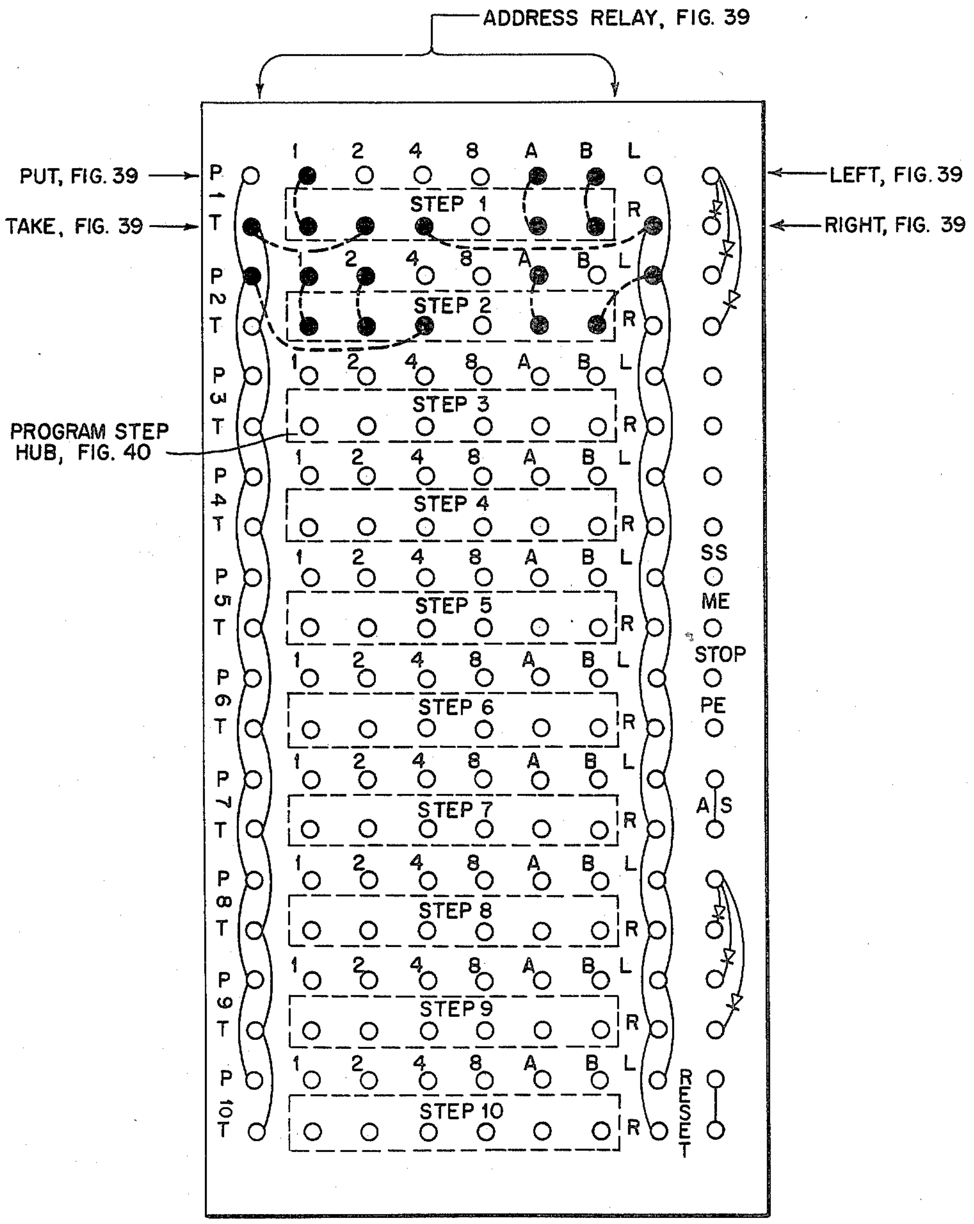
Figure 36:
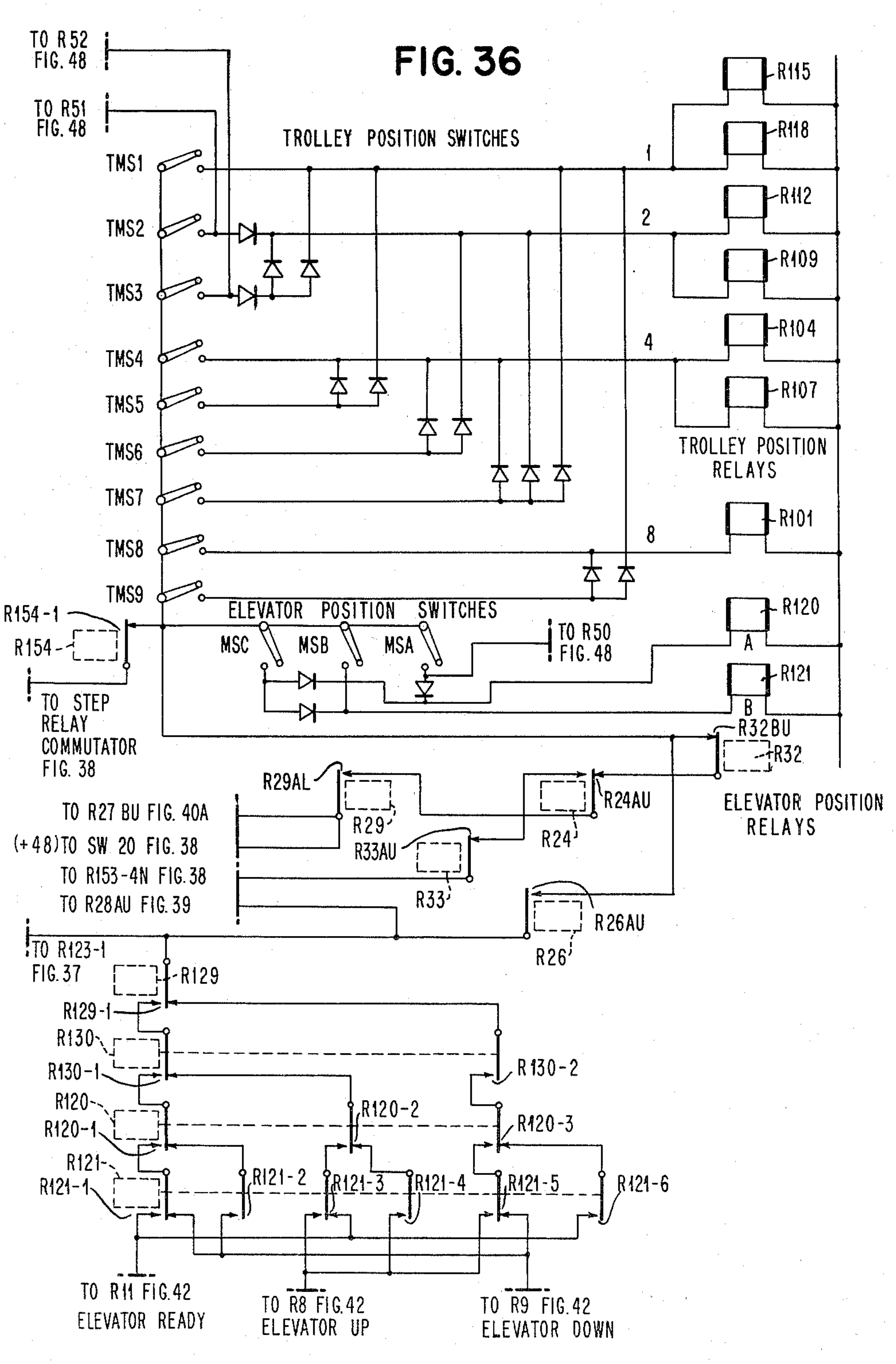
Figure 37:
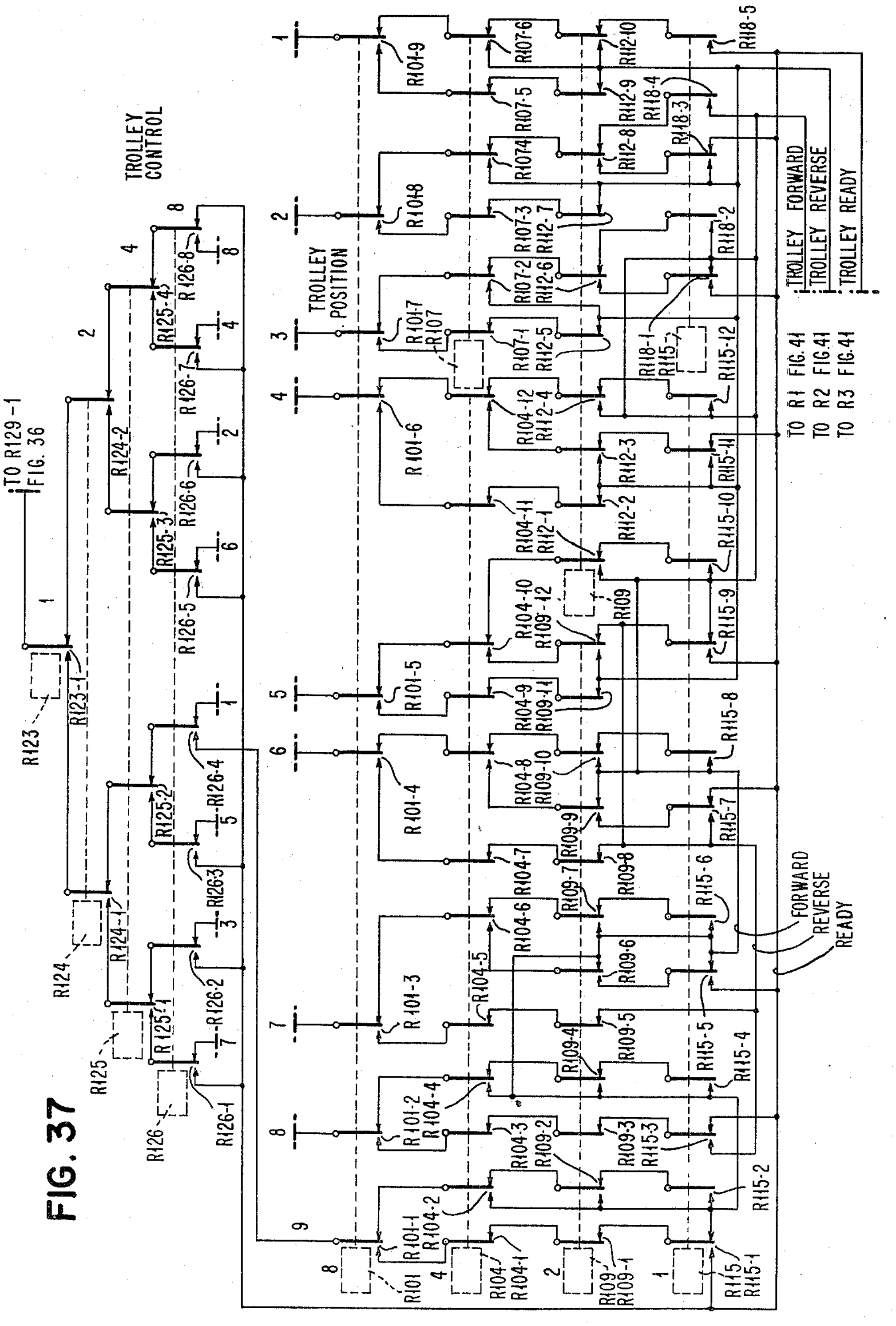
Figure 38:
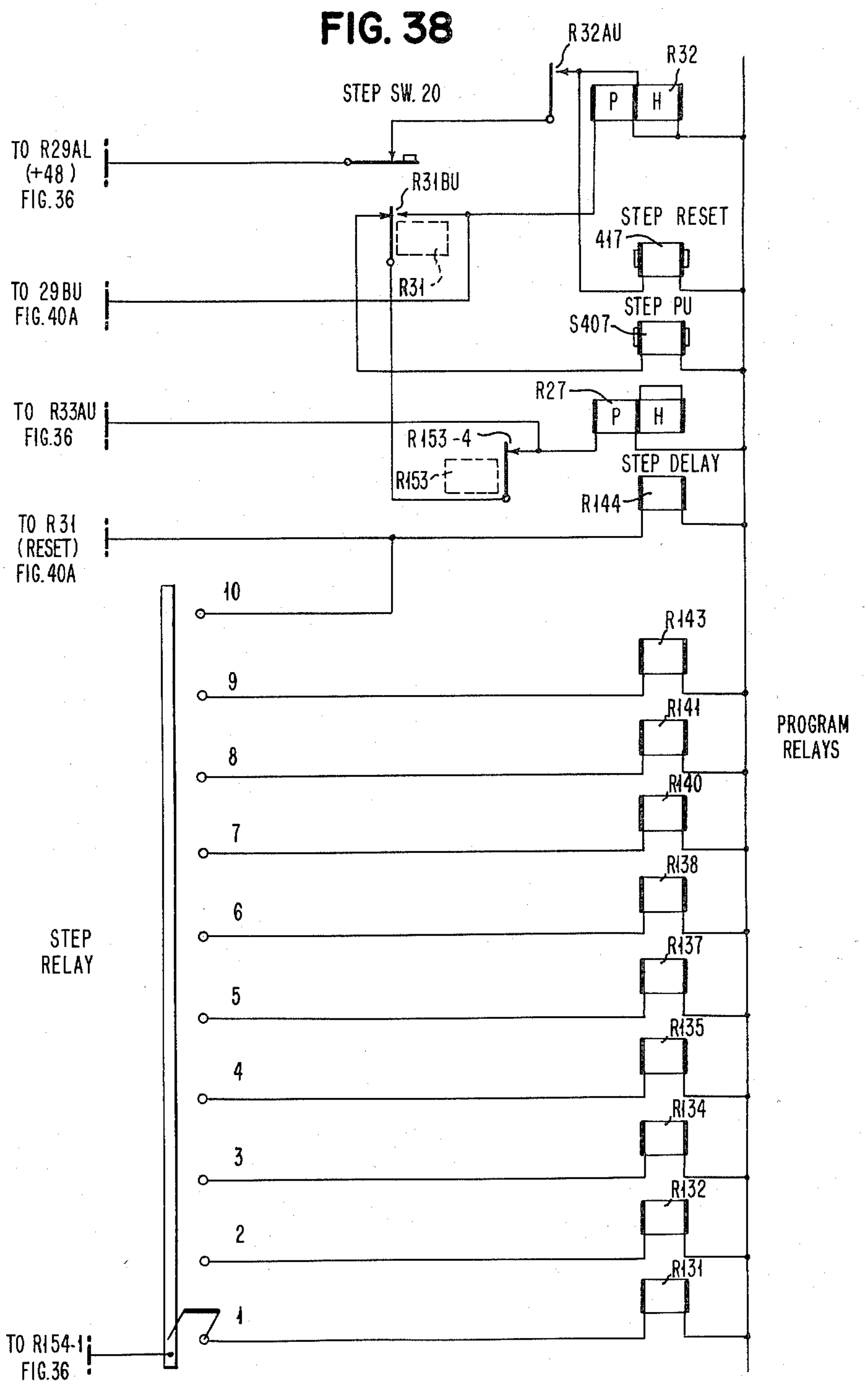
Figure 39:
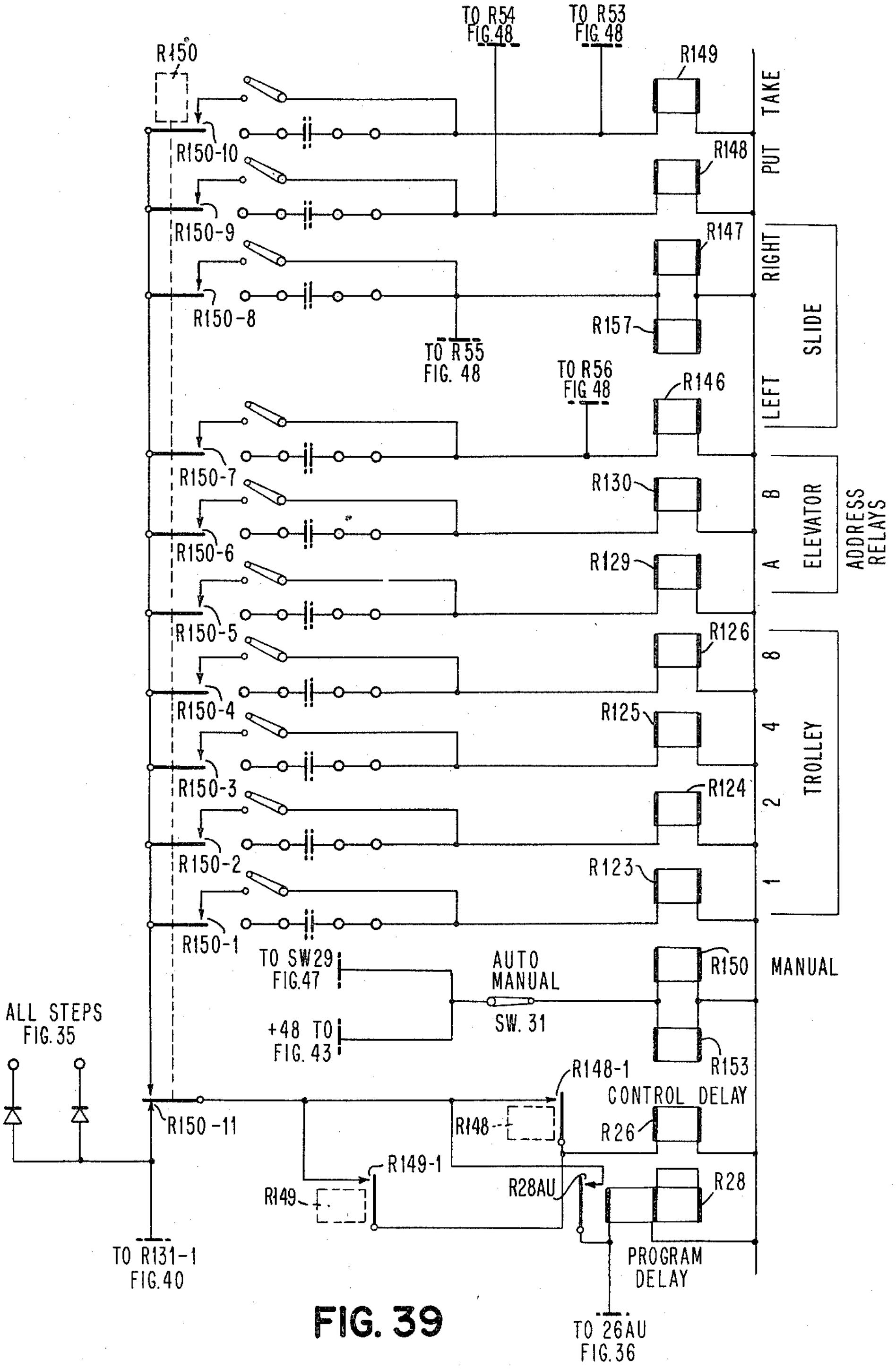
Figure 40:
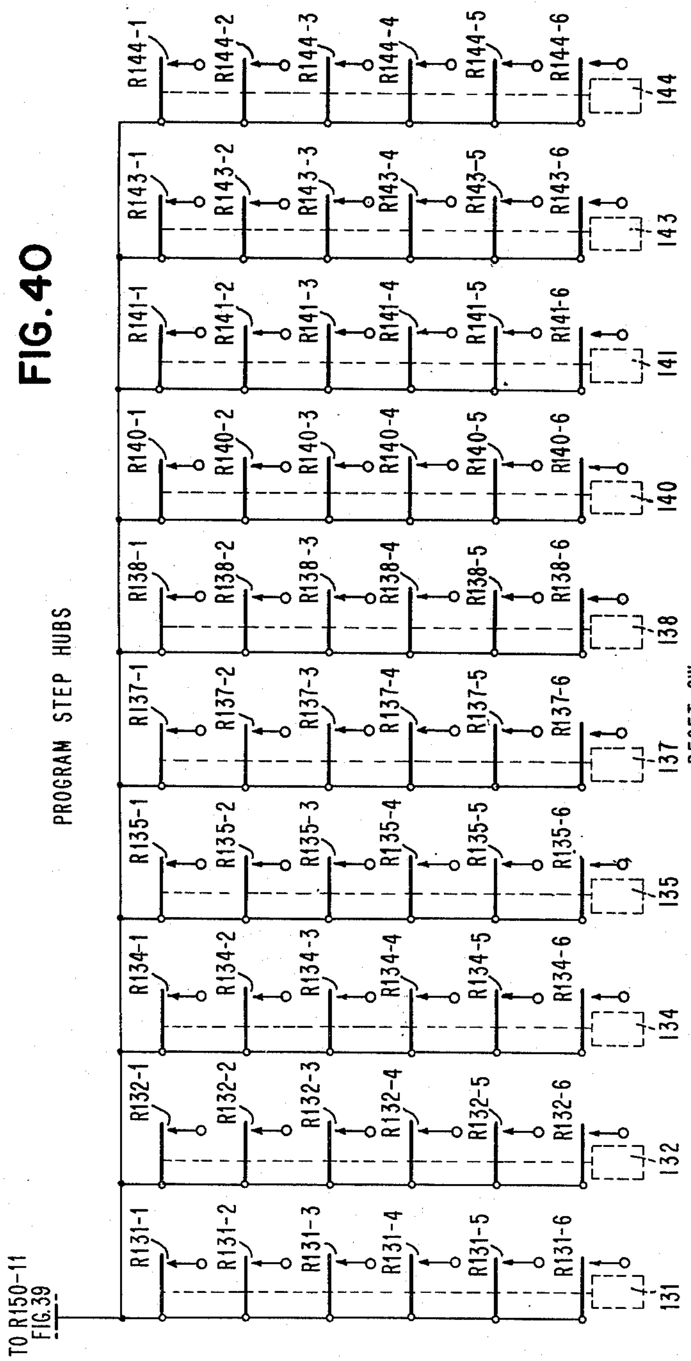
Figure 40A:
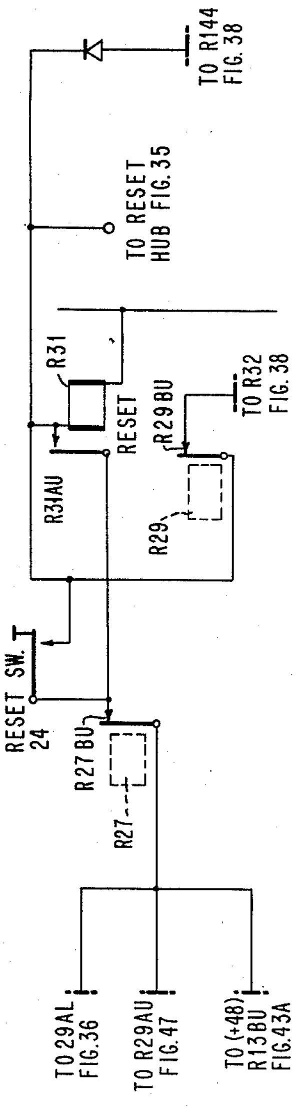
Figure 41:
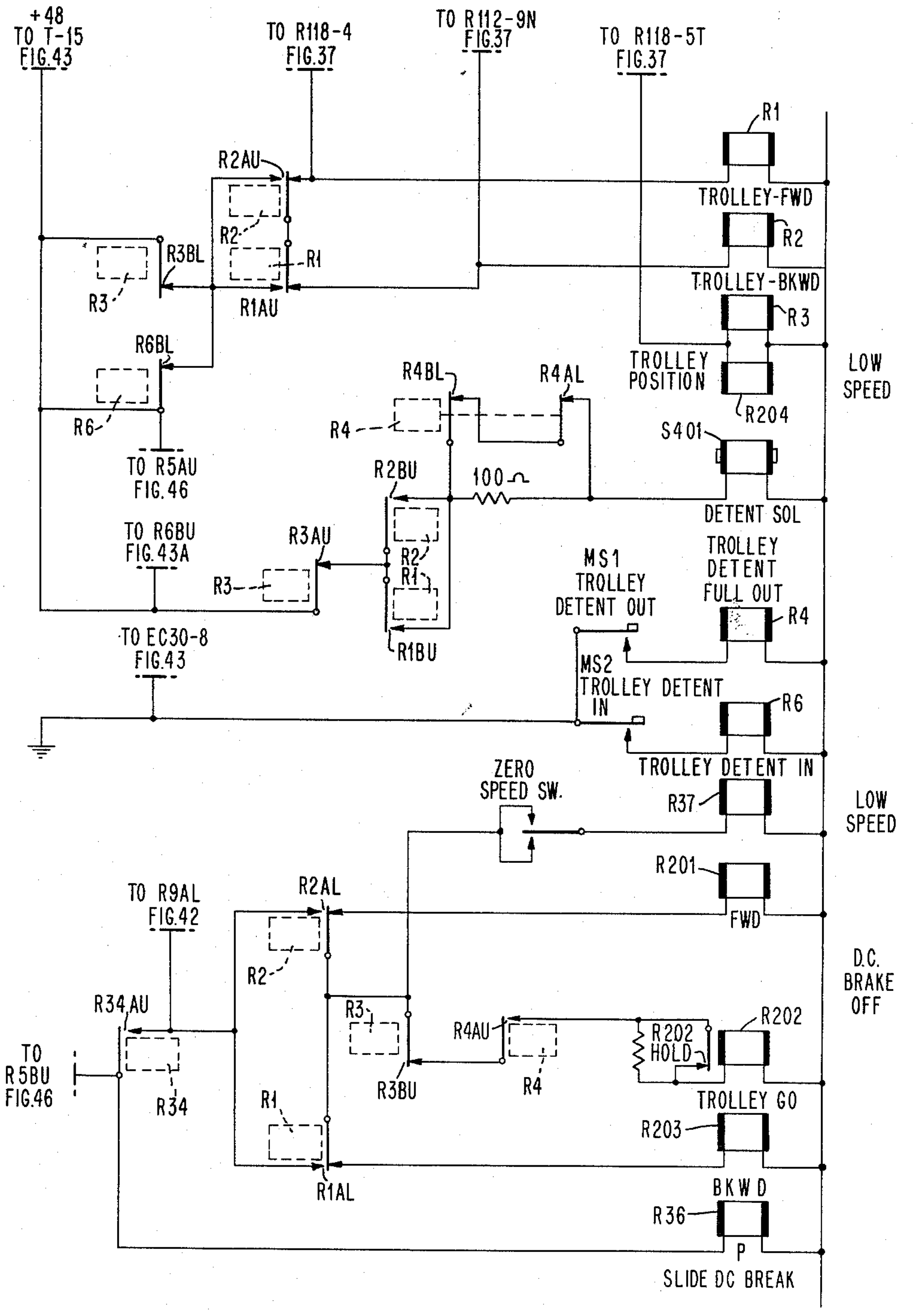
Figure 42:
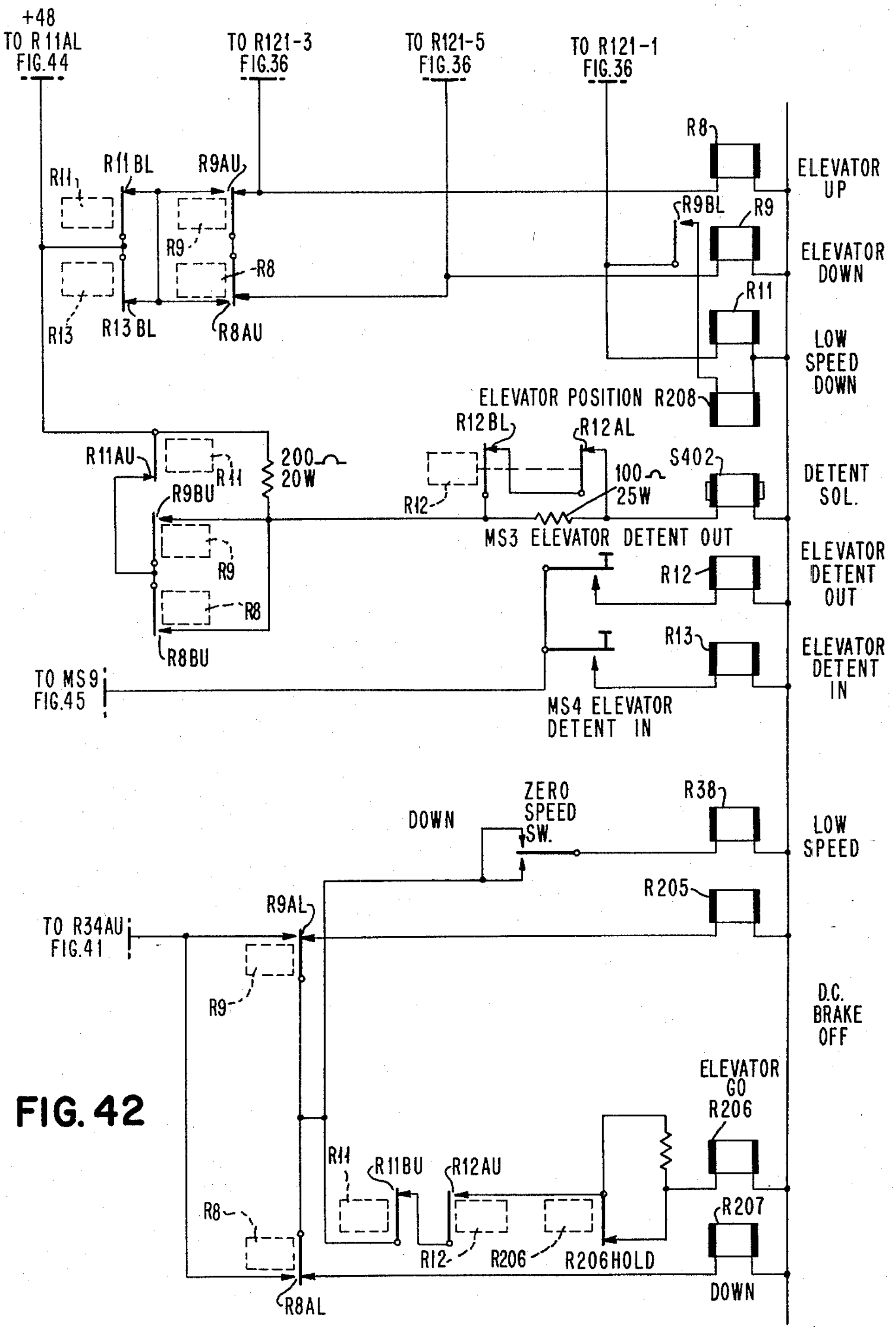
Figure 43:
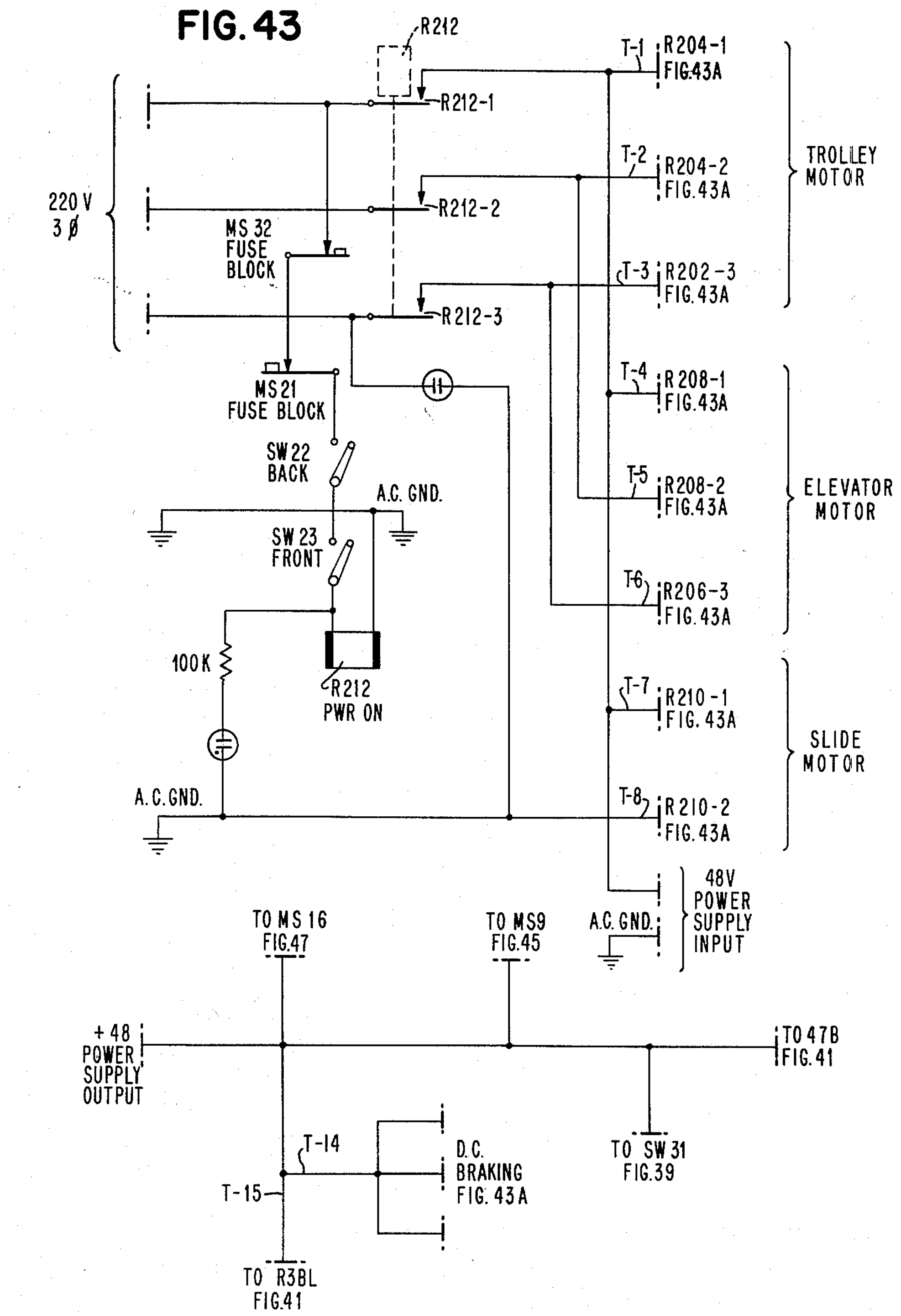
Figure 43A:
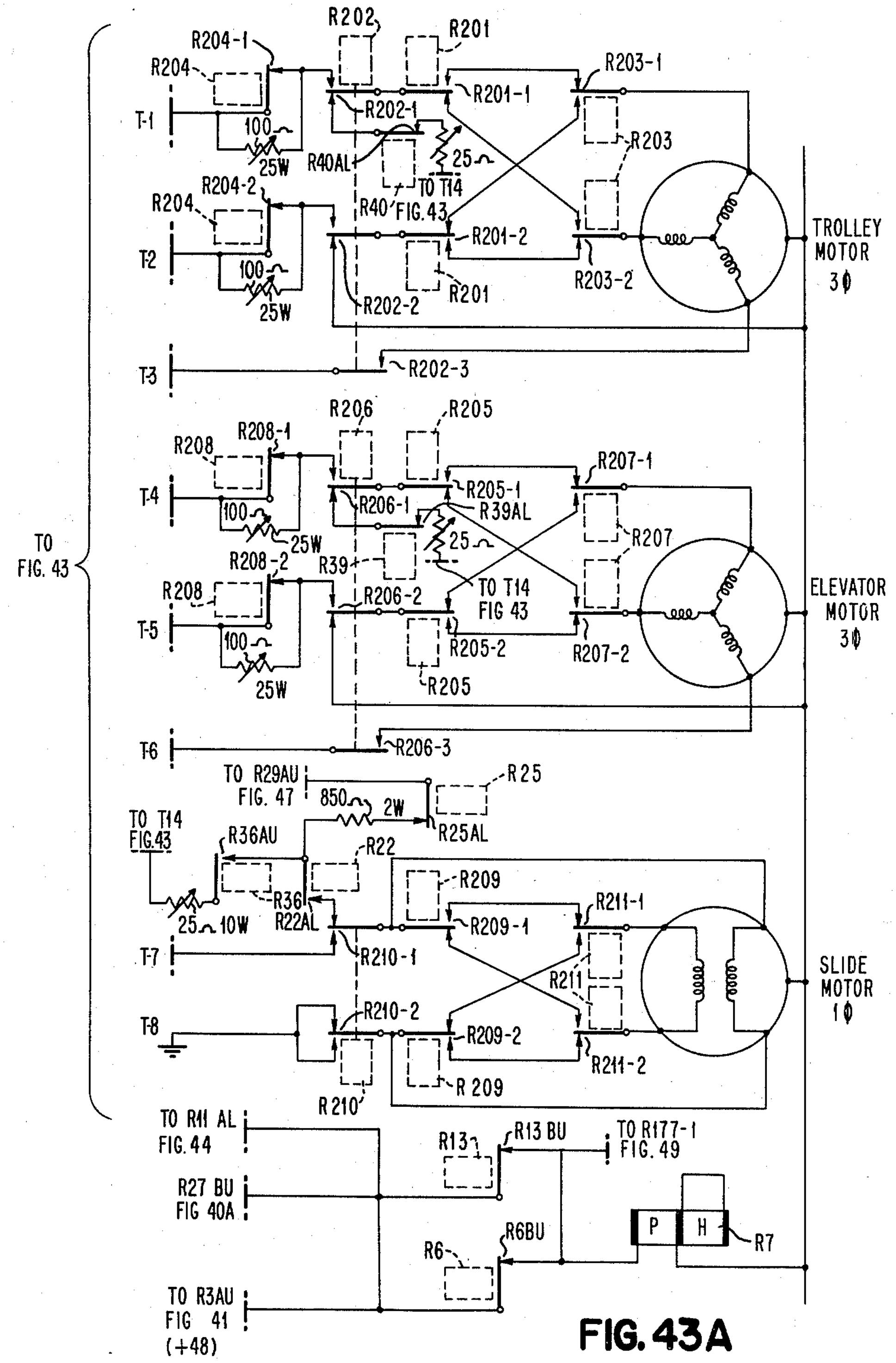
Figure 44:
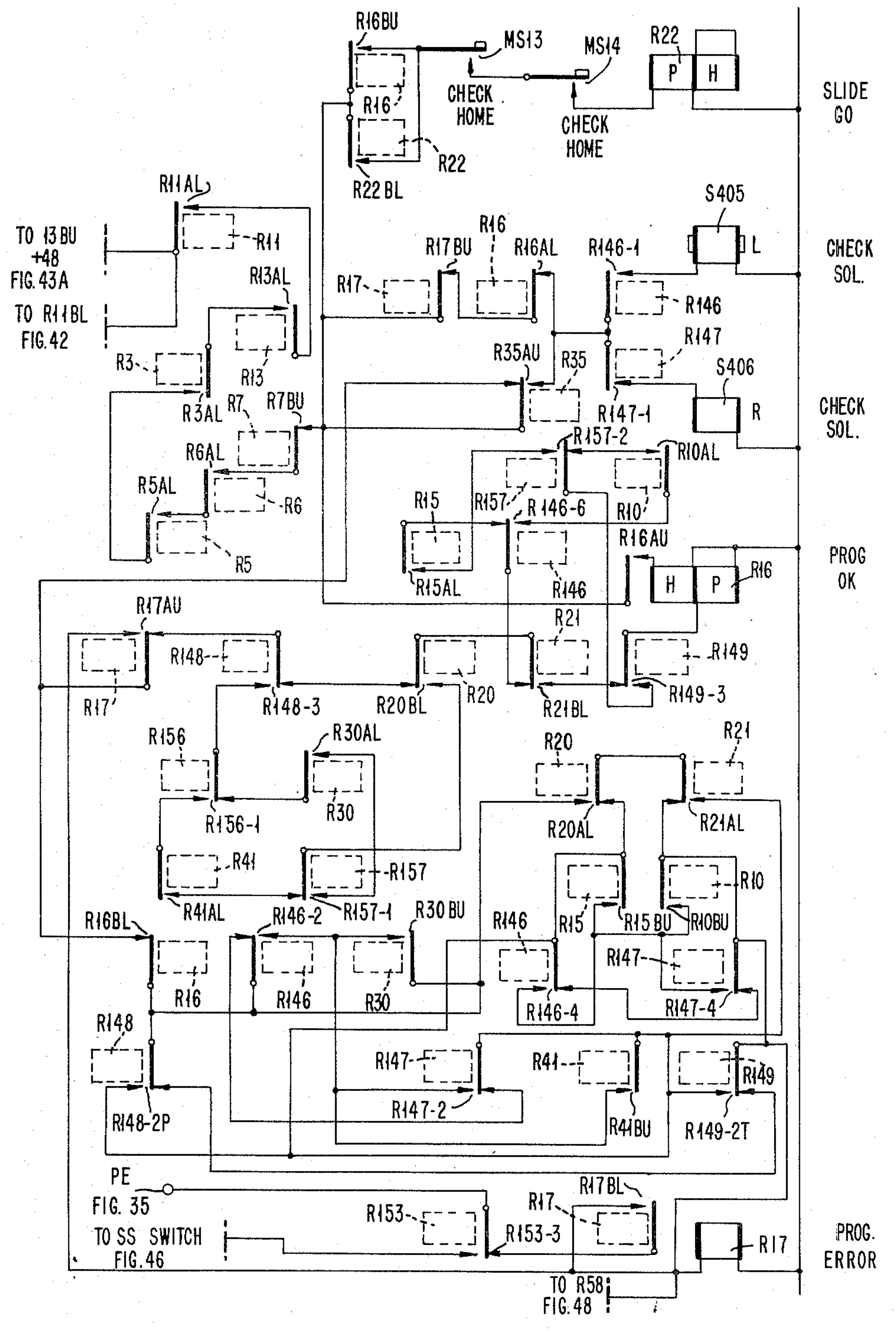
Figure 45:
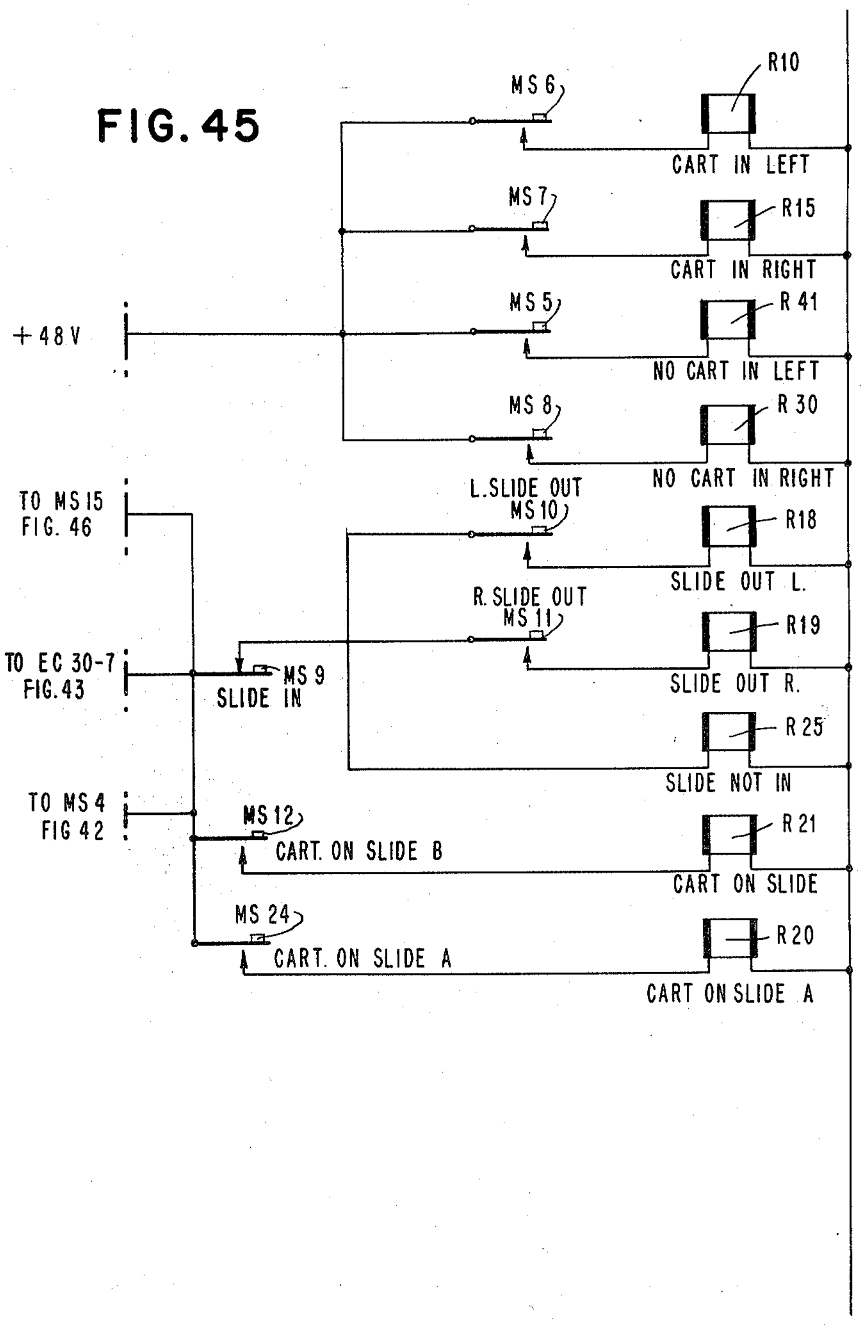
Figure 46:
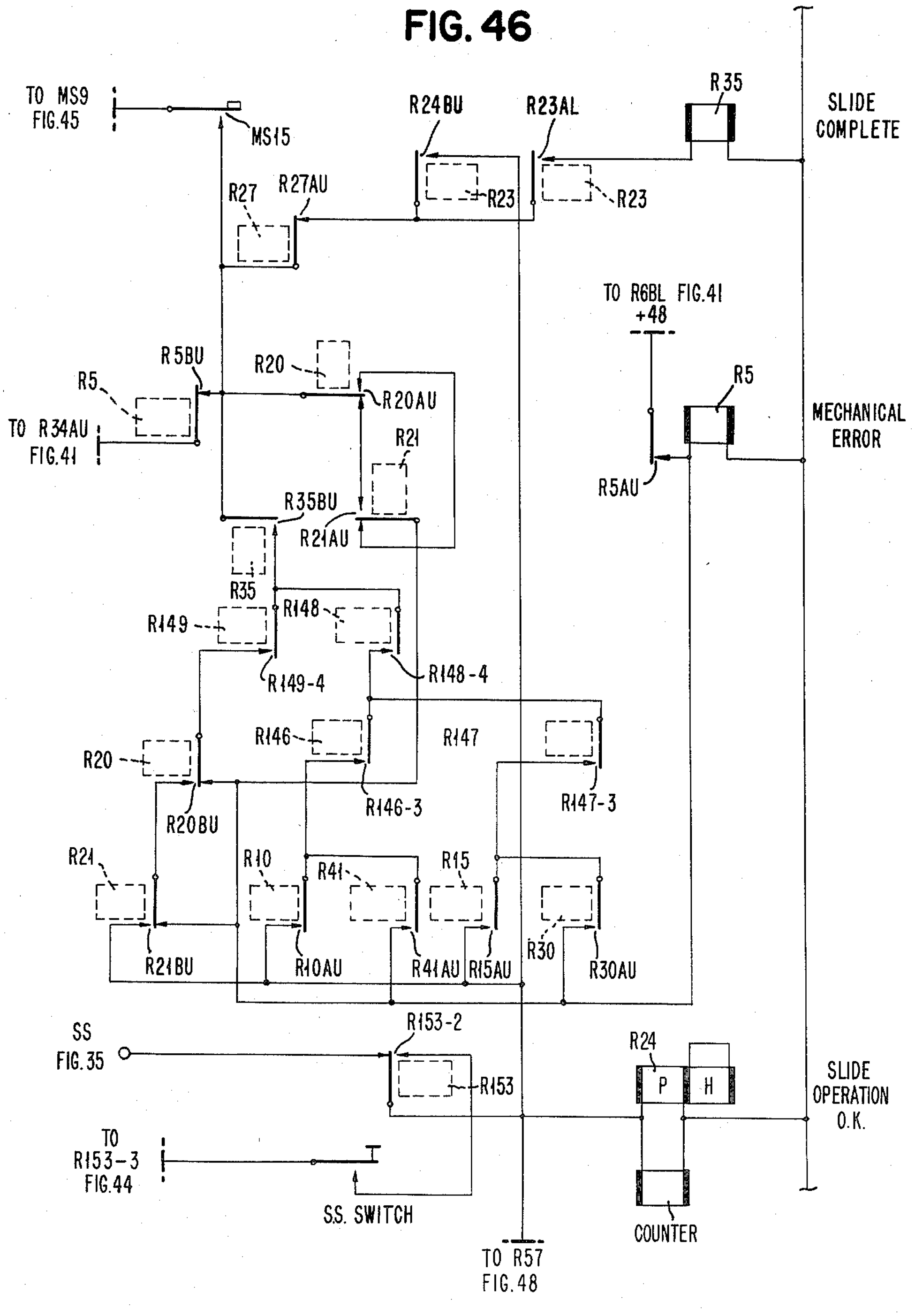
Figure 47:
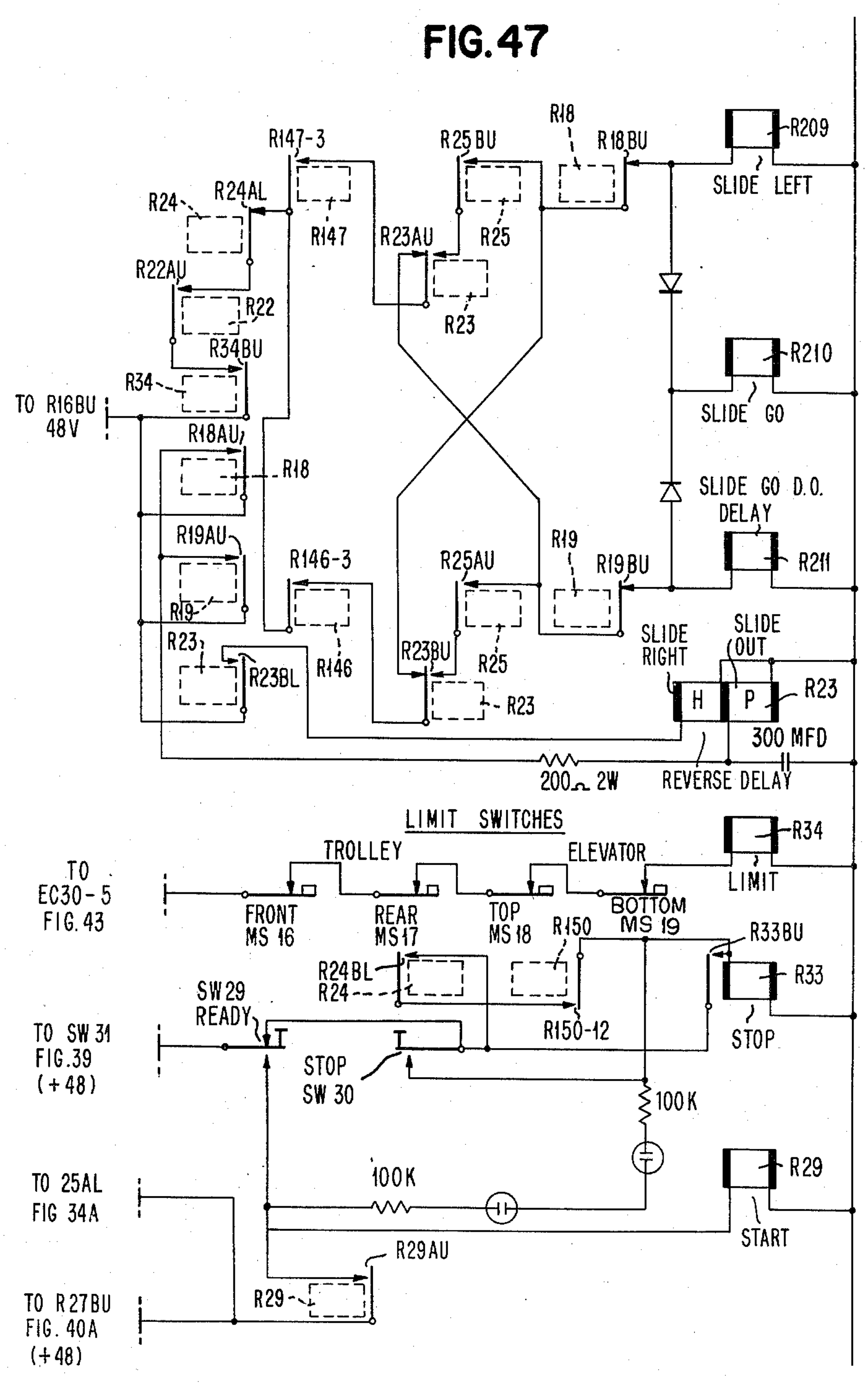

Figs. 3 and 3A, taken together, comprise a vertical sectional view through carriage and elevator mechanism in association with a tape cartridge storage unit;

Fig. 4 is a plan view, partly in section, of carriage track and detent mechanism;

Fig. 5 is a front elevational view of a reel cartridge elevator;

Fig. 6 is a face view of reel cartridge slide mechanism associated with the reel cartridge elevator;

Fig. 7 is a view taken from the end of Fig. 6;

Fig. 8 is a view on line 8—8 of Fig. 7;

Fig. 9 is an enlarged view of the reel cartridge detent mechanism of Fig. 8;

Fig. 10 is a schematic view of the control tapes associated with the slide mechanism of Fig. 6;

Fig. 11 is a perspective view of certain of the slide mechanism of Fig. 6;

Fig. 11A is an enlarged sectional view through the slides of Fig. 12;

Fig. 12 is an enlarged view of the slide mechanism and the controls therefor;

Fig. 13 is an enlarged sectional view taken on line 13—13 of Fig. 8;

Fig. 14 is an elevational view with parts broken away to show underlying mechanism of a reel cartridge detent mechanism associated with the tape transport unit;

Fig. 15 is an enlarged sectional view taken on line 15—15 of Fig. 14;

Figs. 16 and 17 are schematic views showing reel cartridge slide positions;

Fig. 18 is an enlarged view of reel cartridge wheels associated with a supporting track;

Figs. 18A and 18B illustrate details of the reel cartridge track sections associated with the tape transport unit, the views being fragmentary front elevations, partly in section;

Fig. 19 is a side elevational view of a tape transport mechanism;

Fig. 20 is a view, partly in section, taken on a vertical plane near the back of the tape transport unit of Fig. 19;

Fig. 20A is a schematic view of the reel cartridge retrieving arms and control cable associated with the tape transport unit;

Fig. 21 is a sectional view through tape transport spindle and the hub portion of a tape reel and its cartridge;

Fig. 22 is a sectional view corresponding to Fig. 21 showing, however, the tape reel loaded upon the reel drive spindle of the tape transport mechanism;

Fig. 23 is a front elevational view of the upper portion of a tape transport mechanism having a reel cartridge loaded on the spindles thereof, parts of the cartridge being broken away to show underlying structure;

Fig. 24 is a view corresponding generally to Fig. 23 showing, however, the record tape threaded for operation in elements of the tape transport;

Fig. 25 is a sectional view on line 25—25 of Fig. 23;

Fig. 26 is a front view of a reel spindle;

Figs. 27 through 32 are schematic views showing various positions of a reel cartridge during loading and unloading thereof upon the spindles of the tape transport;

Figs. 33 and 34 show the position of cartridge sensing arms associated with the reel cartridge elevator;

Fig. 35 is a control panel comprising part of the electrical control system;

Fig. 36 is the electric circuit for indicating present position of trolley and elevator;

Fig. 37 is a relay point network associated with the trolley position circuit of Fig. 36 for indicating the direction and status of the trolley;

Fig. 38 is a diagrammatic representation of the program relay circuits;

Fig. 39 is a diagrammatic representation of trolley and elevator address relay circuits;

Fig. 40 is a diagrammatic representation of program step hubs;

Fig. 40A is a diagrammatic representation of the reset circuit;

Fig. 41 is a diagrammatic representation of the trolley motor control circuits;

Fig. 42 is a diagrammatic representation of the elevator motor control circuits;

Figs. 43 and 43A are a diagrammatic representation of the energizing circuits for the trolley, elevator and cartridge slide motors;

Figs. 44, 45 and 46, taken together, are a diagrammatic representation of the cartridge checking circuits;

Fig. 47 is a circuit diagram related to the cartridge slide control circuits; and Figs. 48 through 52, taken together constitute the electrical control circuit for the cartridge loading mechanism associated with the tape transport unit.

Figure 1:
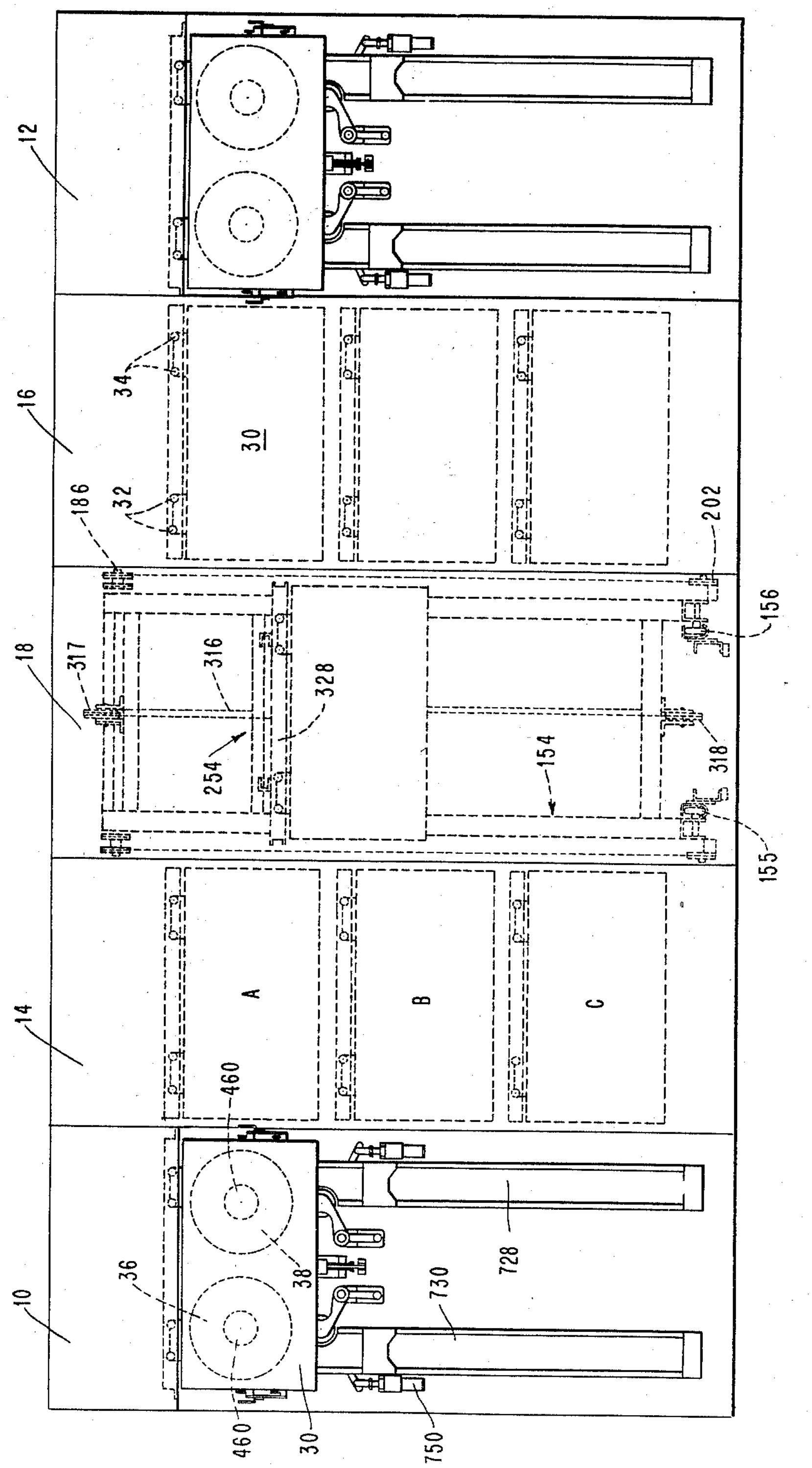
Fig. 1 is a front elevational view of the tape cartridge handling system herein, showing an exemplary arrangement of a plurality of modular units.

Fig. 1 illustrates the arrangement of a plurality of tape transports in conjunction with a plurality of tape cartridge storage units and a tape cartridge transporting and loading unit. Specifically, a pair of tape transport units 10 and 12 are arranged in alignment with a pair of tape cartridge storage units 14 and 16. Between the storage units 14 and 16 is a tape cartridge transporting and loading mechanism 18.

The tape cartridge storage units 14 and 16 are each adapted to hold a plurality of tape cartridges such that the cartridge transporting and loading mechanism 18 may locate a tape cartridge, withdraw it from its storage compartment and transport it to a track along which it may be transported in a lateral direction to either of the tape transports 10 or 12.

The tape cartridge storage units 14 and 16 comprise more or less rectangular open frames composed of front corner uprights 20, rear corner uprights 22 and suitable horizontal bracing members 24. As best seen in Figs. 3 and 3A, the tape cartridge storage units are divided into a plurality of levels, herein shown as 3. The size of the storage units can be varied to provide any desired number of storage compartments, and for purposes of illustration, the first two levels from below are shown herein to contain eight storage compartments while the upper level has six storage compartments, reserving the first two positions for cartridge transfer operations. Each of the cartridge storage levels has a plurality of monorail tracks 28, each of which is adapted to hold a reel cartridge 30. Reference to Fig. 1 will show that the reel cartridges 30 are provided with two pairs of rollers 32 and 34 by which the cartridges are suspended from the tracks 28 of the storage compartments. The tracks 28 are open-ended such that a reel cartridge 30 can be placed upon the tracks 28 or removed therefrom at either end. This adapts the mechanism for movement of cartridges laterally to a tape unit adjacent thereto or laterally to a tape unit remote therefrom by use of the cartridge transporting and loading mechanism.

The nature of the tape reel cartridge can be ascertained by reference to Figs. 21, 23, 24 and 25. In Fig. 23, a cartridge 30 is shown disposed in operative relationship with certain reel driving and tape processing mechanism of a tape transport unit which will be explained in greater detail at a point hereinafter. As shown in Fig. 23, however, the cartridge 30 is a relatively flat rectangular casing adapted to hold a pair of tape reels 36 and 38.

As shown in Fig. 21, the reels adapted for the cartridges 30 include a hub portion 40 from which extend a pair of radial webs 42 and 44 between which a coil of record tape 46 may be reeled. The hub 40 includes an annular flange 48 which is adapted to extend through a hub aperture 49 in one of the side walls of the cartridge 30. Inwardly of the flange 48 is a shoulder 50 which is adapted to cooperate with a portion of a tape reel drive spindle when the cartridge is positioned on a tape transport unit. The hub 40 has internal flutes 52 defined at one end by an annular ridge 54. The outer face of the hub 40 has a surface 56 with which is engaged a reel retainer 58. Surrounding the annular flange 48 and fixed to the hub 40 is an annular gear 60 having uniformly spaced teeth 62 about the periphery thereof. Fixed to the inner wall of the cartridge 30 is a friction annulus 63 against which the outer face of the annular gear 60 is adapted to rest. Extending inwardly from the inner face of the cartridge wall are a plurality of L-shaped lugs 64 which are so positioned as to enter between a pair of teeth 62 of the annular gear 60 when the reel is seated in the cartridge with the annular flange 48 thereof extending through the hub aperture in the cartridge wall. The position of the reel is maintained in the cartridge 30 by reel retainer 58 which is in the form of a disk 66 guided for axial movement on a plurality of guide flanges 68. The axis of the disk 66 is formed as a hollow inwardly projecting hub 70 adapted to receive a compression spring 72. The compression spring bears at one end against a collar 74 formed on the inside of the inwardly projecting hub 70 and at the other end against the adjacent wall of the cartridge 30. The spring tends to press the disk 66 inwardly such that a clamping face 76 will engage the surface 56 of the reel hub. By this means the reel is maintained against movement within the cartridge 30. The manner in which the hub of the reel cooperates with a reel driving spindle of the tape transport will be fully explained at a later point.

Further reference to Fig. 25 will show that the cartridge 30 has an open bottom 78 with which cooperates a closure section 80 adapted to swing about a transverse hinge 82. The open bottom of the cartridge provides access for the tape reels 36 and 38 and also access to the tape running between the reels 36 and 38 when the cartridge is associated with a tape transport unit, as will be described hereinafter. The closure section 80 has an inwardly extending stud 84 at each end thereof, each respectively adapted to be engaged by a latch member.

Fig. 25 shows one latch member 86 and since both latch members are identical, an understanding of the latch member of Fig. 25 will serve as an understanding of both. The latch member 86 is adapted to rotate about a pivot pin 88 such that a lower hooked end 90 may be swung into interposing relationship with the stud 84. The latch member 86 is in the form of an inverted L and has at its upper end a pin 92 which extends laterally through an elongated aperture 94 formed in the end wall of the cartridge 30. A spring 96 normally biases the latch member 86 about its pivot pin 88 in a counterclockwise direction, so that the latch member 86 tends to engage the stud 84. When the closure section 80 is open, as shown in Fig. 25, rotation thereof about its hinge 82 and into its cartridge closing position results in the camming of the latch member 86 in a clockwise direction by reason of contact between the stud 84 and a camming surface 98 on the latch member. The manner in which the latch member 86 is automatically operated to release the closure member 80 will be developed in greater detail at a point hereinafter.

When a pair of reels 36 and 38 is positioned in the cartridge 30, the record tape 46 extending between the two reels is engaged at spaced points by tape guide pins 100 and 102. These pins extend laterally from the free end of an inverted generally U-shaped yoke 104, which is mounted on an inner wall of the cartridge for limited movement in a vertical direction. As best seen in Fig. 23, the yoke 104 is mounted to slide in a vertical direction by a pair of guide members 106 and 108. Downward movement of the yoke is limited by engagement thereof with the upper ends of the guide members 106 and 108. The yoke is normally biased into its lower position by means of a pair of springs 111 and 113 which are connected between the yoke 104 and an inturned flange 114 of the cartridge, as best shown in Fig. 25. The tape guide pins 100 and 102, therefore, maintain a length of the tape 46 in such position that it registers with the gap between a pair of read/write heads and a tape guide, which is to be explained in greater detail hereinafter.

Attached to the yoke 104 is a bar 116 which has a portion 118 extending downwardly from the point at which it is attached to the yoke 104, and a relatively longer portion 120 which extends upwardly from said point of attachment. The downwardly extending portion 118 of the bar 116 has an inturned foot 122 (Fig. 25) which is engaged by an operating lever 124 carried by the frame of the tape transport mechanism. More will be said of the nature and operation of the operating lever 124 hereinafter.

As best seen in Fig. 25, the upper portion 120 of the bar 116 has an inturned end 126 and has attached thereto a spring finger 128 which overlies the inturned end 126 such that a lever 130 can be engaged between the inturned end 126 and the overlying spring finger 128. The upper wall of the casing is split to form a movable closure section 132 adapted to swing outwardly about a hinge 134. The closure section 132 has attached thereto the lever 130, such that when the bar 116 is moved upwardly, the inturned end 126 thereof will rotate the lever 130 and thereby open the closure section 132 to the dotted line position, as shown in Fig. 25. Conversely, when the bar 116 is moved downwardly, the spring finger 128 of the lever assembly will engage the upper face of the inwardly extending lever 130 and rotate the closure section 132 about its hinge 134 whereby the cartridge is closed at the top.

A fixed top wall 136 of the cartridge 30 has attached thereto a pair of dual caster assemblies 138 and 140, as best seen in Fig. 23.

As shown in greater detail in Fig. 18, the caster assemblies include a T-shaped supporting bracket 142 having a base flange 144 by which they are attached to the upper wall 136 of the reel cartridge. The head of the bracket provides a mount for a pair of caster wheels 146 and 148. The head of the bracket 142, intermediate the caster wheels 146 and 148, is provided with a notch 150 adapted to engage a cartridge locating detent 151. The cartridge locating detent 151 is in the form of a downwardly bowed spring having formed therein a detent rib 153 which is adapted to enter the locating notch 150 of the caster assembly. The detent spring 151 intersects the path of the caster assembly bracket 142 and the same is slightly compressed as the bracket 142 passes under the spring until the notch 150 registers with the detent rib 153 at which time the spring will maintain the cartridge in its proper lateral position within its storage compartment. Located at the center line of the top wall of the cartridge is a groove 152 adapted to be engaged by cartridge detenting mechanism by which the cartridge is moved along the trackway.

The cartridge transporting mechanism includes a carriage or trolley 154 (Fig. 1) which is adapted for movement along a pair of rails 155 and 156. The carriage 154 is a generally rectangular framework consisting of posts 158 suitably tied together by structural members 160 and 162. Extending inwardly of the lower end of the corner posts 158, as best seen in Fig. 4, are wheels 164 which are adapted to engage the rails 155 and 156. It is apparent, therefore, that the carriage mechanism 154 can be moved along the rails 155 and 156 such that the front face thereof can be registered with a selected tier of cartridges in the storage compartments of the tape cartridge storage units 14 and 16.

Figure 2:
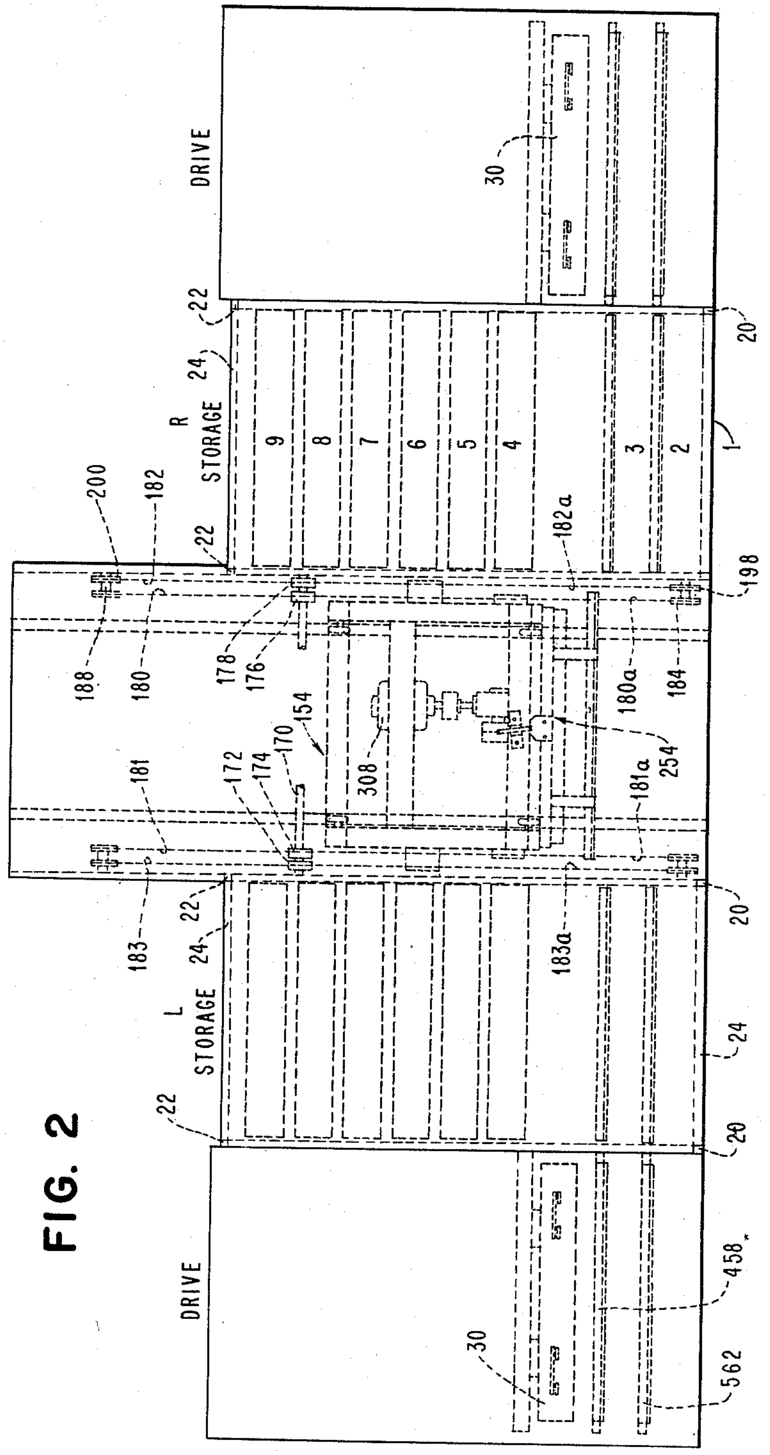
Fig. 2 is a plan view of the system shown in Fig. 1.

Movement of the carriage 154 along the rails is achieved by means of driving cables, the nature of which is best seen in Figs. 3 and 3A. Suspended from the top of the loader mechanism frame is a motor 166, which by way of a variable speed transmission device 168, also suspended from the top of the loader frame, drives a shaft 170. As best seen in Fig. 2, the shaft 170 extends transversely across the top of the loader frame and is mounted in suitable bearings at opposite ends thereof. The shaft 170 has fixed thereto four grooved cable drums 172, 174, 176 and 178 (Fig. 2). One end of each of a pair of steel cables is attached to and wound about each of the drums and the opposite end of each of the cables is attached to the carriage mechanism 154. Four of the cables 180, 180*a*, 181 and 181*a* (Fig. 2) are attached to the upper end of the carriage mechanism and the remaining four cables 182, 182*a*, 183 and 183*a* are attached to the lower end or base of the carriage mechanism, so that movement imparted to the carriage by way of the cables is uniformly controlled.

Figs. 3 and 3A will show the head cables 180 and 180*a* and the base cables 182 and 182*a* at one side of the carriage. The other set of cables is similarly arranged at the other side of the carriage, as indicated in Fig. 2. The cables 180 and 180*a* may be presumed to be the cables associated with the cable drum 176 of Fig. 2, whereas the cables 182 and **182*a* may be presumed to be associated with the cable drum 178** of Fig. 2.

As shown in Fig. 2, the cable **180*a* is trained about the cable drum 176 and from thence it extends about a guide pulley 184 mounted for rotation on a stub shaft 186 extending inwardly from the frame of the loader. In like manner, the cable 180 also extends about a guide pulley 188 at the rear of the loader frame; the guide pulley 188 being mounted for rotation on a stub shaft 190 extending inwardly from the loader frame at the rear thereof. The end of the cable 180*a*, at the front end of the loader frame, is brought back around the guide pulley 184 and is attached to a fixture 192 attached to an upper rail 194 of the carriage frame. The end of the cable 180, passing around the guide pulley 188, is attached to a similar fixture 196 connected to the carriage rail 194. It will be observed that the ends of the cable 180 are overlapped by the distance at which the fixtures 192 and 196 are spaced on the rail 194 of the carriage structure. This permits the face of the carriage to be moved forwardly beyond the face of the loader frame. The cable 182, which is wound on the cable drum 178 (Fig. 3), passes about a rotary guide wheel 200 mounted for rotation on the stub shaft 190. After passing over the rotary guide 200, a cable 182 is brought to the bottom of the loader frame where it passes about a guide wheel 204, as shown in Fig. 3A. The guide wheel 204 is mounted for rotation on a stub shaft 208 extending inwardly from the loader frame. After the cable 182 passes about the guide 204, the end thereof is attached to a fixture 212 which is attached to a carriage bottom rail 214. The cable 182*a* attached to the drum 178 passes about guide wheels 198 and 202, and the end thereof is attached to a fixture 210 carried by the bottom rail 214. As in the case of the head cables 180 and 180*a*, the base cables 182 and 182*a*** are also overlapped.

It can be seen from the foregoing, therefore, that as the shaft 170 is rotated, the cable drums thereon are rotated and control movement of the respective cables. Specifically, as the shaft 170 is rotated, the cable drums 176 and 178 are rotated in unison with the result that the cables are uniformly driven, the respective drums and cable guides being of the same diameter. When the shaft 170 is rotated in a counterclockwise direction, for example, the carriage 154 will be moved to the rear on the rails 155 and 156 by reason of force applied to the cable fixtures 196 and 212. By the same token, when the cable drums are rotated in a clockwise direction, the carriage 154 will be moved forward on its rails by reason of the force applied to the cable fixtures 192 and 210, respectively. As stated, the cable arrangement described above in reference to Figs. 3 and 3A is duplicated at the opposite side of the carriage 154, as indicated in Fig. 2 of the drawings.

A pair of crossties 215 and 216 mounted in the base of the carriage 154 constitutes a support for a rotary trolley detent solenoid S401, as shown in Fig. 4. A rotating core 220 of the trolley detent solenoid S401 has fixed thereto an operating lever 222 having diametrically disposed ends. The trolley detent solenoid S401 is adapted to operate a toggle link system which comprises a latch mechanism for locating the carriage 154 in alignment with a selected cartridge storing tier in the adjacent cartridge storing units. Pivoted to the crosstie 215 is a lever 224 and pivoted to the crosstie 216 is a similar lever 226. The levers 224 and 226 are respectively connected to the operating lever 222 by means of links 228 and 230. Springs 232 and 34 are attached to the pivoted connections between the links 228 and 230 and the operating lever 222. The opposite ends of these springs are fixed respectively to the crossties 216 and 215, whereby the springs tend to rotate the operating lever 222 in a clockwise direction, as viewed in Fig. 4. The levers 224 and 226 include laterally extending latch heads 236 and 238 which are adapted to enter locating notches 240 in oppositely disposed detent plates 242 and 244. The detent plates 242 and 244 are respectively disposed inwardly of the carriage rails 155 and 156, being fixed in the base of the loader frame and having the inwardly facing notches 240 spaced along the length thereof such that each oppositely disposed set of notches, when engaged by the latch heads 236 and 238, will locate the face of the carriage in proper alignment with a cartridge track.

The face frame of the carriage 154, and specifically the upright corner posts 246 and 248 thereof, have attached thereto respective vertical track members 250 and 252 on which an elevator structure 254 is mounted for movement. By reference to Fig. 5, it will be seen that the elevator structure 254 is an open framework consisting of transverse cross members 256, 258 and 260 attached at their respective ends to uprights 262 and 264. Mounted on the upright structure 262 is a pair of wheels 266 and 268. A similar pair of wheels 270 and 272 is mounted on the upright structure 264. The wheels 266 and 270 are located outwardly beyond the wheels 268 and 272 respectively such that they will respectively engage under inturned flanges 274 and 276 (Fig. 4) of the track structures 250 and 252. The inset wheels 268 and 272 at the bottom of the elevator frame are adapted to engage respectively with outwardly facing track flanges 278 and 280 (Fig. 4). It can be seen, therefore, that the elevator 254 can be raised and lowered along the track structures 250 and 252, such that it can be moved into registration with a selected level of cartridge storage, or otherwise positioned for the manipulation of reel cartridges, as to be described more fully at a later point herein.

The elevator 254 has mounted thereon a rotary elevator detent solenoid S402 to the core 284 to which is attached an operating lever 286 having diametrically extending ends constituting part of a pair of toggle links. The toggle links include levers 288 and 290 pivoted respectively on the transvere elevator frame members 258 and 256. These links are respectively pivoted to the operating lever 286 by means of links 292 and 294. The levers 288 and 290 include laterally extending latch heads 296 and 298, respectively, which are adapted to enter locating notches in oppositely disposed latch plates 300 and 302, which are fixed to the forward corner posts 246 and 248 of the carriage structure. Sets of latch plates, such as the plates 300 and 302, are located along the corner posts 246 and 248 of the carriage structure at the several operating levels at which the elevator must be stabilized for the manipulation of a reel cartridge at that particular level. The core 284 of the elevator detent solenoid S402 is normally biased in a clockwise direction by means of a pair of springs 304 and 306 attached respectively to opposite ends of the operating lever 286. The spring 304 has its opposite ends fixed to the transverse cross member 256, while the spring 306 has its opposite end fixed to the transverse cross member 258. Tension of the springs 304 and 306, therefore, serves to project the latch heads 296 and 298 outwardly such that they will enter oppositely disposed notches in the latch plates 300 and 302. Energization of the elevator detent solenoid S402 will serve to retract the latch heads 296 and 298.

The vertical movement of the elevator 254 along its guiding tracks is controlled by a cable attached to the bottom and top of the elevator frame. Figs. 3 and 3A together will illustrate the nature of the cable arrangement. Mounted within the carriage frame is an electrical motor 308, which by way of a speed reduction gear 310, drives a grooved cable drum 312 mounted to rotate with the drive shaft 314 of the speed reduction device 310. A cable 316 is trained about the drum 312 and the same is brought about a grooved guide wheel 317, mounted on the top to the carriage frame, and also about a second grooved guide wheel 318 (Fig. 3A) mounted at the bottom of the carriage frame. The diameter of the cable guide wheels 316 and 318 is sufficiently large to permit the forward run of the cable 316 to clear the face of the carriage frame. After the cable 316 is brought about the cable guides 317 and 318, one end thereof is attached to a cable anchor 320 at the top of the elevator frame, while the opposite end is attached to a flange 322 at the bottom of the elevator frame.

It can be seen from the foregoing that when the motor 308 is energized, the cable drum 312 will be rotated with the result that the cable 316 will either elevate or lower the elevator 254, depending on the direction in which the cable drum 312 is rotated.

Extending forwardly from the transverse cross member 256 of the elevator structure (Figs. 3, 7 and 13) is a supporting structure 324 which is adapted to support a cartridge track 326 and a cartridge slide assembly 328. The track 326 is an open-ended track which extends across the upper part of the elevator. In structure it corresponds to the tracks 28, heretofore described in connection with the cartridge storage units.

The cartridge slide structure is best illustrated in Figs. 6, 7, 11, 12 and 13. As shown in Fig. 13, for example, the supporting structure 324 includes a forwardly projecting flange 330 to which the cartridge slide assembly 328 is attached by means of an angle bracket 332. The slide assembly 328 includes a support 334 which has an inturned base flange 336 upon which is mounted an inner channel shaped slide member 338 and an outer channel shaped slide member 340.

The base member 336 and the slide members 338 and 340 have appropriate grooves in confronting faces of their oppositely disposed webs for receiving anti-friction balls 346 carried in sets by ball cages 348, 350, 352 and 354. The slide members 338 and 340 can be projected laterally in both directions, such that they can be extended from the position shown in Fig. 6, where they are in collapsed condition, to extend across either the storage unit 14 or the storage unit 16 depending on the direction in which the slides are operated (Figs. 16 and 17).

Fig. 16 is a diagrammatic illustration of the manner in which the carriage slide assembly 328 can be controlled to manipulate reel cartridges in a lateral direction both to the right and to the left of the elevator position. This figure represents a pair of reel cartridge storage units, indicated as left storage and right storage, operatively associated with an intermediate elevator position. When the carriage slide assembly 328 is brought into alignment with a reel cartridge 30 in the right storage unit, for example, the slide assembly mechanism is operated to project the inner and outer slide members 338 and 340 to the right such that a reel cartridge detent 418 carried by the outer slide member 340, can engage the groove 152 in the top wall of the cartridge 30. When such engagement is effected, the carriage slide assembly 328 will be reversely operated to withdraw the cartridge 30 from its compartment in the right cartridge storage unit and transport the same along its supporting track and transfer it to the elevator track. In this position, the elevator and carriage mechanism may be operated to align the cartridge with a designated storage address for storage of the cartridge either in the right storage unit or in the left storage unit.

In the illustration of Fig. 16, it is assumed that the cartridge is being transferred to the transfer tracks of the left storage unit. The elevator and carriage are, therefore, so positioned as to align the elevator track and the transfer track of the left storage unit, and the carriage slide assembly 328 is controlled to project the inner and outer slides 338 and 340 thereof to the left, as shown in Fig. 16. When the cartridge 30 has reached its proper position, the detent mechanism illustrated in Fig. 18 will accurately locate the cartridge in its proper position within the left storage unit. Thereupon, the cartridge detent 418 is withdrawn from the cartridge notch 152 and the slide assembly 328 is again controlled to retract the slides 338 and 340 into their telescoped position on the elevator frame, such as shown at the left in Fig. 17.

Each end of the slide members 338 and 340, as well as the base member 336, has a stop 356 extending upwardly from the ball races thereof. By reference to Fig. 11A, it can be seen that the stops 356 are of such height that they can pass each other without interference. However, the thickness of the ball races, race 348 for example, is such that the races will engage the stops and limit relative movement of the respective slides. It can be seen, therefore, that the length of the several ball races in the slide assembly will determine the lateral distance to which the slides can be extended. Since the slides 338 and 340 are substantially as long as the width of the elevator 254, the maximum possible extension, therefore, would be substantially twice the length of the slides. However, out of consideration for strength and stability, the ball races limit relative movement between the outer and inner slides and the inner slide and the base 336 to not substantially more than one-half the length of the slides.

A system has been provided for projecting the slides of the slide assembly in either direction by means of a reversible motor 357, which is mounted on the forwardly projecting flange 330, as shown in Figs. 6 and 7. The motor 357 has a rotor shaft 358 on which is mounted a grooved drive wheel 360 about which is trained a steel slide driving tape 362. The driving tape 362 is arranged in respect to the several slides, as shown in Fig. 10. The bottom flange of the inner slide member 338 has attached thereto brackets 364 and 366. These brackets as shown in Fig. 6, are located at the respective ends of the inner slide member 338. The brackets 364 and 366 carry respective inner tape guide wheels 368 and 370 and respective outer tape guide wheels 372 and 374.

The upright support 334 of the inturned base flange 336 has a pair of forwardly extending anchor pins 376 and 378 located near the opposite ends of the flange. Directly under the shaft 358 of the motor 357 and attached to the flange 330, is a tape guide wheel 380 which has a pair of axially spaced tape guide grooves therein. Also mounted on the flange 330, by means of mounting brackets 381 and 382, is a pair of articulated tape guide wheels 384 and 388, each having a single groove therein. The tape guide wheel 384 is articulated on the mounting bracket 381 by means of a pivot finger 386, and the tape guide roller 388 is articulated on the mounting bracket 382 by means of a pivot finger 390. The guide wheel 384 is biased to the left as seen in Fig. 6 by means of a spring 392, while the guide wheel 388 is biased to the right as seen in Fig. 6 by a spring 394. A bearing stud 397 serves to mount a grooved guide roller 398, as shown in Fig. 6; and as shown in that figure, the grooved guide roller 398 is mounted rearwardly of the guide roller 368 and at the same end of the slide. While specific reference has been made to the three rollers at one end of the slide, as shown in Fig. 7, it will be understood that a third roller 399 is also mounted at the opposite end of the slide to rotate on a stub bearing 399*a*.

The bottom flange of the outer slide channel 340 has attached thereto, and near the opposite ends thereof, a pair of forwardly projecting drive tape anchors 402 and 404. Fig. 10, which is a diagrammatic illustration of the manner in which the drive tapes are trained about the several drive pulleys, will serve to illustrate the manner in which the tapes are arranged. In this figure, a pair of control tapes 406 and 408 serve to control the center slide of the slide assembly. The tape 362 is adapted to drive the slide to the left, while a tape 410 is adapted to drive the slide to the right.

The center slide control tape 406 has one end attached to the pin 378 which extends forwardly from the slide assembly frame. This tape is trained about the grooved guide wheel 372, which is the outer wheel at the left end of the center slide channel. Upon turning about the guide wheel 372, the tape is brought back where it is fixed to the tape anchor 404, being the anchor carried at the right end of the outer slide.

The center slide control tape 408 is fixed at one end to the stud 376 extending forwardly at the left hand of the slide assembly frame. The tape 408 is then passed about the guide wheel 374, which is the outer guide wheel at the right end of the inner slide. From this point, the tape 408 is turned back where it is fixed to the tape anchor 402 at the left end of the outer slide channel. These two tapes control the movement of the center slide channel.

Tapes 362 and 410, as stated, control projection of the slides, respectively, to the left and to the right of their center position.

In Fig. 10, the tape drum 360 and the grooved tape guide wheel 380 have been split and halves thereof have been separated in the interest of maintaining a legible diagrammatic representation of the control tape course. The tape 362 has one end attached to the tape drum 360 and is brought about the drum in a clockwise direction where it passes about the inner groove of the guide wheel 380. From this point, the tape 362 is brought forward where it passes about the guide wheel 384, mounted on the slide assembly frame. From this point, the tape again is brought back where it is passed about the reel guide wheel 399 carried by the inner slide. From thence the tape is again brought upon itself where it passes about the inner guide wheel 368 of the inner slide channel. From thence the tape is brought to its anchor point on the tape anchor 404, extending forwardly from the outer slide channel.

The control tape 410 has one end attached to the outer groove of the tape drum 360 and is brought about that drum in a counterclockwise direction where it passes through the outer groove of the guide wheel 380 and thence to the right about the guide wheel 388 mounted on the inner slide channel. After passing about the guide wheel 388 the tape is brought forward where it is trained about the guide wheel 398 carried at the left end of the intermediate slide channel. From this point, the tape is turned back and passes about the guide wheel 370 carried by the right end of the intermediate slide channel. From this point, the tape proceeds forward once more where its end is anchored in the tape anchor 402 of the tape anchor bracket extending forwardly from the outer slide channel.

It can be seen, therefore, that as the motor 357 is operated in a counterclockwise direction, the control tape 362 will be reeled up on the tape drum 360, such that its opposite end which is attached to the tape anchor 404 will pull the outer slide channel to the left, as viewed in Fig. 10. At the same time, the tape 410 is being unreeled from the tape drum 360 such that tension on the tape anchor 402 is relieved. Reversal of the motor 357 will result in tension on the control tape 410, such that the outer slide channel to which the control tape anchor 402 is attached will be drawn to the right, as viewed in Fig. 10. By the same token, rotation of the tape drum in the stated direction will release control tape 362, so that the outer slide channel may operate under the influence of tape 410.

From what has been said, it can be seen that the carriage 154 can be moved along the rails 155 and 156 in either direction by controlled operation of the drive motor 166, that the elevator 254 can be raised and lowered along the face of the carriage 154 by selectively energizing the motor 308 in either a forward or a reverse direction, and that the slides 338 and 340 can be projected either to the left or to the right by selectively energizing the motor 57 in either a forward or a reverse direction.

It will be evident from the foregoing, therefore, that the tape loading mechanism can be registered with a tape cartridge stored in any of the storage positions and that with proper cartridge control mechanism, the cartridge can be loaded onto the elevator of the loader mechanism for transport to either a different storage position or to a processing position in connection with either one of the tape transport units. The slide assembly also constitutes a base on which is mounted the cartridge control mechanism, as to be described in the following.

By reference to Fig. 13, it will be seen that a cartridge control assembly 412 is mounted on the rear face of the outer slide 340. This assembly is shown in greater detail in Figs. 8 and 9. These figures show a cartridge engaging lever 414 mounted for rocking movement on a stud 416 which extends from the rear face of the outer slide channel 340. The lever 414 has a downwardly extending finger 418 which is adapted to enter the groove 152 which is formed in the top wall of the cartridge 30, as previously stated. The lever 414 is so located at the rear face of the slide 340 as to be positioned exactly at the mid-point of the slide. This adapts the finger 418 of the lever 414 for cooperation with the cartridge slot 152 whether the slide mechanism is projected laterally to the left or to the right of its center position.

The lever 414 is normally maintained in elevated position, as shown in Fig. 9, by means of a spring 420, and a crown wheel 422 keyed to a shaft 424, is adapted to engage a raised surface 426 about mid-way of the length of the lever 414 for depressing the finger 418 into the cartridge groove 152. When the crest of a crown on the wheel 422 engages the surface 426 of the lever 414, the lever 414 will be depressed against the tension of the spring 420 to such an extent that the finger 418 of the lever 414 is engaged in the groove 152 of the cartridge 30, as shown in Fig. 8. The crown wheel 422 is operated through the agency of a star wheel 428 which is also fixed to the shaft 424 such that when the star wheel is rotated, the shaft 424 and the crown wheel 422 are rotated in unison therewith. The star wheel 428 has twice as many points as the crown wheel has crowns with the result that the star wheel must be operated twice in order to operate the crown wheel 422 once. The operating agency for the star wheel 428 consists of a pair of operating levers 430 and 432. The operating lever 430 has an elongated slot 434 by means of which the lever is mounted for reciprocating movement in respect to a guide stud 436. The lever is further guided for movement by means of a grooved eccentric 438 which may be rotated about an axis 440 to adjust the elevation of the lever 430. The lever 430 has a nose portion 442 which is adapted to engage between points of the star wheel 428 and the lever is normally biased to the left as viewed in Fig. 9 by means of a spring 444. The operating lever 442 at the right in Fig. 9 is exactly the same as to form and mounting, as described in reference to the operating lever 430, with the exception that the lever 442 is reversed such that its nose 446 engages the points of the star wheel 428 in an opposite quadrant. Either lever 430 or 432, when reciprocated, will rotate the star wheel 428 the distance of one of its points. A detent 448, pivoted on a pivot stud 450 and biased into detent operation with the crown wheel by a spring 452, is provided to stabilize movement of the crown wheel.

The ends of the operating levers 430 and 432 are adapted to engage fixed pins 454 (Fig. 9) at the far ends of the cartridge storage unit tracks, such that upon encounter of one of the pins 454, the lever so encountering a pin will be projected forward as shown by the lever 430 in Fig. 9. Such forward projection causes the nose 442 of the lever to engage a point of the star wheel 428 so that the star wheel and the crown wheel (422) will be rotated.

The illustration of Fig. 9 presumes that the slide assembly has deposited a reel cartridge 30 at a storage address located in a storage unit at the left of the carriage unit. During such transport movement of the cartridge 30, the finger 418 of the lever 414 was reposed in the slot 152 of the cartridge. Upon contact of the fixed stud 454 in the cartridge trackway, the lever 430 is projected to the right as viewed in Fig. 9, and the star wheel and associated crown wheel are thereby rotated such that the crown in contact with the lever surface 426 is removed from interposing position whereby the lever 414 is released, the lever 414 is raised by the spring 420 and the finger 418 thereof is lifted from the cartridge slot 152. With the lever 414 in raised position, and the operating lever 432 in the retracted position, as shown in Fig. 9, the slides of the slide assembly can now be retracted, the position of the elevator and its carriage can be changed, and the slides of the slide assembly can now be projected to the right, for example, such that the end of the operating lever 432 will encounter a stud 454 (Fig. 9) on the cartridge storage track at the right of the carriage mechanism the moment the finger 418 of the lever 414 is in registration with the groove 152 of a reel cartridge at the new address. Thereupon, the lever 432 will be projected forwardly against the tension of its spring 456 and the star wheel associated with the crown wheel will be rotated to bring a crown into contact with the lever protuberance with the result that the finger 418 will engage in the cartridge groove. Under these conditions, the slides of the slide assembly can be retracted with the result that that cartridge 30 will be transported along its storage track and will be deposited on the track 326 associated with the elevator mechanism.

When a cartridge 30 is laterally shifted to the inner one of the two front tracks in the upper level of the left storage unit, as shown in Fig. 2, it is in a position from which it may be carried into alignment for mounting the reels thereof on their respective drive spindles 460 and 462, as shown in Fig. 23. When in the loading position of Fig. 19, the hubs of the reels are in alignment with their respective spindles, as shown in the case of the reel hub and spindle of Fig. 21.

The spindles, of which the spindle 460 of Figs. 21 and 22 is typical, are rotated by hydraulic motors of which a fragment 462 is shown in Fig. 22. The frame 464 of the tape transport mechanism is suitably apertured to receive a journal structure 466 in which the drive spindles are mounted.

In Fig. 22, the spindle structure is organized about a stepped drive shaft 468 which is mounted for rotation in a plurality of anti-friction bearings 470 and 472. At its inner end, drive shaft 468 has splined thereto a cone-shaped clutch head 474, having teetch 476 adapted to engage corresponding teeth 478 of the hydraulic drive 462. The clutch head 474 is fixed to the shaft 468 by means of a key 480, such that the shaft 468 will be rotated whenever the clutch head 474 is rotated.

A brake spider 482 carries a friction annulus 484 externally of the clutch head 474 and in juxtaposition to a braking surface of the journal structure 466. The brake disk and its spider 482 are free to move in an axial direction and are normally somewhat spaced from the journal surface, but may be projected into braking contact with the surface by operation of a fluid pressure plunger 486, such that the shaft 468 may be brought to a controlled halt.

By reference to Figs. 21 and 22, it can be seen that the journal structure 466 has formed thereon a forwardly projecting sleeve 488 in which the ball bearing assemblies 470 are positioned. Inward movement of a ball bearing 470 is avoided by the shouldered junction of the sleeve 488 with the journal body 466, and movement of the bearing structures in the opposite direction is limited by a lock ring 490. Concentrically surrounding the sleeve 488 is a larger sleeve 492 which is mounted on the journal body 466 to form an annular chamber 493. Within the chamber 493 is an annular piston 494 which can be driven to the left, as viewed in Figs. 21 and 22, by admitting fluid under pressure to the chamber 493 from a suitable source by way of a fluid passage 496.

Splined to the free end of the drive shaft 468 is a spindle clutch head 498. The head 498 has an internal hub 500 which is adapted to embrace a reduced end of the drive shaft 468, the head being splined to the drive shaft such that it will rotate therewith. Inward movement of the clutch head 498 is limited by contact of complementary shoulders 502 in the shaft 468 and at the inner end of the hub 500. A flanged lock nut 504 is threaded onto the thread portion 506 of the drive shaft 468; a flange 508 of the lock nut being driven into contact with a face at the outer end of the hub 500. At points circumferentially spaced about the wall of the head 498 is a plurality of ball seats 510, one of which is shown in Fig. 21. The ball seats 510 are adapted to receive hub locking balls 512 such that when the balls 512 are projected outwardly in a direction radial of the shaft axis, a sufficient circumference of the balls 510 will project beyond the wall of the head 498 to engage in corresponding flutes 52 in the reel hubs.

The projection of the balls 512 and the maintenance thereof in projected position is under control of a spring-pressed cam sleeve 514, mounted for limited reciprocating movement in the annular chamber 516, formed between the outer wall of the hub 500 and the inner wall of the outwardly spaced concentric head 498. The cam sleeve 514 is spring pressed into ball camming position by means of a heavy coil spring 518 which surrounds the hub 500 and bears at one of its ends against a face wall 520 of the head 498. The cam sleeve 514 has a pair of oppositely extending flanges 522 and 524 formed at the inner end thereof. These flanges serve to guide the cam sleeve 514 for reciprocation along the hub 500. The inwardly extending flange 524 also constitutes an abutment for the opposite end of the spring 518 while the outwardly extending flange 522 receives the thrust of the annular piston 494 when the same is forced forward under fluid pressure.

It can be seen from the foregoing that the spring 518 will urge the cam sleeve 514 to the right in Fig. 21 and that an inclined face 526 of the cam sleeve will contact the balls 512 and project them outwardly in a radial direction. Release of the balls 512 follows movement of the cam sleeve 514 to the left, as viewed in Fig. 21, and such movement is brought about by projecting the annular piston 494 against the outer face of the cam sleeve flange 522.

Extending forwardly from the face wall 520 of the head 498 is a plurality of wall members 528 which are spaced from each other by gaps 530 (Fig. 26). The wall members serve to mount a reel latching assembly 532. The reel latching assembly 532 comprises a pair of oppositely disposed plates 534 and 536, which form between them cavities for mounting a plurality of sliding reel dogs 538. The plates 534 and 536 are carried by and are spaced from each other by a disk member 540 which is mounted for slide movement on a reduced end 542 of the drive shaft 468. The disk 540 and a shaft surrounding hub 544 on which is mounted a bearing race 546.

Each reel latching dog assembly 538 consists of three members. Specifically, two assembly driving fingers 548 and 550 (Fig. 26) receive between them and have pivoted thereto a latching dog 552. Each of the three reel latching assemblies 538, shown in Fig. 26, is interconnected by a spring member 553 by means of which the latching assemblies are held in retracted position, such as shown in Fig. 21.

When the latch mounting assembly 532 is positioned at the outer end of the wall sections 528, as shown in Fig. 21, the tip of the reel latch 552 and the associated latch drivers 548 and 550 will be wholly within the head 498, and the inner ends of the drivers 548 and 550 will be in contact with an axially disposed surface of the wall sections 528. However, if the entire assembly 532 is driven inwardly, the inner ends of the latch drivers 548 and 550 will travel along an inclined surface 554 of the wall sections 528, such that the drivers 548 and 550 together with the reel latch dog 552 will be driven outwardly in a radial direction through the gap 530 between adjacent wall sections 528 (Fig. 26). The projected position of the latch and the drivers can be viewed in Fig. 22.

When the relative position of reel cartridge 30 and driving spindles 460 is changed from that of Fig. 21 to that of Fig. 22, the reel dogs 552 will engage the internal circumferential rib 54 of the reel hub structure. Continued reference to Fig. 22 will show that the balls 512 are seated in the flues 52 formed internally of the reel hubs. The balls 512 in engagement with the flutes 52 of the reel serve to impart rotary motion to the reels whenever the drive shaft 468 is rotated, while the dogs 552 in engagement with the internal annular rib 54 of the reel hub will serve to maintain the reels axially located on the drive spindles, this position being determined by abutment of the reel flutes 52 with an upstanding shoulder 556 formed in the periphery of the head 498. Reference to Fig. 22 will also demonstrate that the cartridge carried spring 72 is effective to move the reel latch assembly 532 inwardly to its reel latching position.

In mounting the reels on their respective spindles, the cartridge 30 is moved toward the tape drive frame 464 with the axis of the reel hubs in alignment with the axis of their respective reel spindles. As the mounting movement proceeds, the shoulder 50 of the reel hub will engage the spindle rib 556 such that further axial movement of the reels is halted. Further movement of the reel cartridge 30 in an inward direction will serve to displace the reel cartridge case inwardly, while the reels remain stationary. This further movement of the reel cartridge case serves to disengage the fingers 64 from the teeth 62 of the gear 60, and also brings about disengagement of the friction annulus 62 and the confronting wall of the cartridge 30.

In the meantime the annular shoulder 74 of the spring hub 70 has engaged the anti-friction bearing assembly 546 carried by the disk 540 such that the reel latch assembly 532 is pushed inwardly as previously described. Continued movement of the reel cartridge case serves to compress the spring 32 until the head 66 rests against the inner face of the cartridge wall. The initial position is that shown in Fig. 21, while the final position is that shown in Fig. 22. Continued reference to Fig. 22 will show that the friction annulus 76 is separated from the confronting wall 56 of the reel hub. Thus, the reels are now free to rotate within the cartridge 30.

It remains to be seen how the reel cartridge 30 is moved toward and away from the tape drive frame, as explained above. In Fig. 19, the cartridge 30 is loaded to the tape frame from the track 458 and cartridges are unloaded from the tape frame by depositing them on a retrieving track 562. These tracks 458 and 562 and associated mechanism are mounted on a frame 564 which extends forwardly of the tape transport frame 464 and above the reel drive spindles.

The unloading track 458 and the retrieving track 562 are constructed as shown in Figs. 18A and 18B, respectively. The illustrated construction permits a cartridge being removed from the spindles of the tape transport unit to be passed directly through the loading track 558 for deposit on the retrieving track 562. The construction also provides for guiding the cartridge between track sections and for detenting the cartridge in its proper position on both of the tracks associated with the tape transport unit.

Figs. 18A and 18B illustrate the respective track areas normally associated with one of the cartridge caster fixtures 142. It will be understood that the construction of these track sections at the location of the second cartridge caster fixture is the same. The retrieving track 458, as shown in Fig. 18A, is composed of spaced track sections 458*a* and 458*b* which provide between them a gap 461 which is wide enough to permit the stem of the cartridge caster fixture 142 to pass freely therethrough. Therefore, a cartridge disposed on the loading track 458 can be transferred to the retrieving track 562 by mere transverse movement. In actual operation of the system, the cartridge when removed from the spindles of the tape transport unit is moved outwardly with the stems of the reel cartridge caster brackets 142 in alignment with the track gaps 461 and with the reel cartridge sufficiently elevated so that the caster wheels 146 and 148 are slightly higher than the troughs of the respective track sections 458*a* and 458*b*. This permits the cartridge to be passed directly through the loading track 458 for deposit on the retrieving track 561 as shown in Fig. 18B.

The retrieving track 562 is also composed of a pair of spaced track sections 562*a* and 562*b*. The gap 561 existing between the track sections 562*a* and 562*b* is so proportioned that the caster wheel 146 and the stem of the caster track 142 will abut the track section 562*a* if the transfer mechanism should tend to carry the cartridge too far. The gap 561 in the retrieving track 562 as well as the gap 461 of the loading track 458 provide a detenting structure by means of which the reel cartridges are properly located along the length of the respective tracks. It was shown in respect to Fig. 18 that a detenting spring 151 is employed to detent the reel cartridges when they are located on the tracks of the storage units. Similar detenting springs cannot be successfully employed in conjunction with the loading track and the retrieving track associated with the tape transport unit for the reason that, in respect to these tracks, the cartridge is also moved transversely. Therefore, the track structure at the gaps 461 and 561 of Figs. 18A and 18B, respectively, together with the corresponding track structure at the second gap of each track are designed to locate the cartridges in their proper position along the length of the tracks. It will be noted that the outer track sections 463 and 563 of Figs. 18A and 18B, respectively, are curved downwardly at the free ends thereof. As a result thereof when the caster wheel 148 is in contact with the downwardly curved track section, and the caster wheel 146 of the other caster assembly is in contact with a similarly formed track end at the second gap of the track, the inner casters being disposed on the intermediate track section, there is a slight resistance to the movement of the cartridge in either direction such that the cartridge is effectively detented in its proper position for manipulation from track to track or into and out of loading or retrieving position.

It will be noted that the attaching flange at the confronting ends of the track sections is cut away leaving only the trough portion remaining. This facilitates the passage of the leading caster from one track section to the other. With the track flange cut back the possibility of abutment therewith by the leading caster, in the case of slight misalignment, is entirely avoided. By the time the leading caster moves into and along the bare trough section of the track, any slight misalignment is corrected, such that the caster will pass freely into the flanged section of the track.

A slide mechanism 566, which in all respects is like the slide mechanism heretofore described in reference to Figs. 6 and 10, is mounted on the support member 564 such that it operates above and between the tracks 458 and 562 of the tape transport unit. Specific description of the slide mechanism 566 is unnecessary because of the identity thereof with slide mechanism previously described. The slide mechanism 566 is adapted to manipulate reel cartridges 30 between the corresponding tracks of adjacent storage units and the tracks 458 and 462 of the tape transport unit.

The reel cartridges have laterally extending lugs 568 and 570 projected from corresponding positions in opposite end walls of the cartridges which provide means by which the cartridges can be lifted from and onto the tracks 458 and 562 and by which the cartridges can be transported to the face of the tape transport unit such that the reels therein can be mounted on their respective reel spindles.

The mechanism by which the cartridges are manipulated, as stated in the foregoing, comprises a pair of slide arrangements 572 and 574, as viewed in Fig. 20. These slide mechanisms are identical in structure such that a description of the slide mechanism 572 will serve as a description of both. In considering the specific construction of the slide mechanism 572, reference should also be made to Fig. 19. The slide mechanism 572 is composed of a tilting base channel 576, which is pivoted by means of a pivot pin 578 seated in a bearing in the lower end of a mounting bracket 580. The rear end of the channel 576 is supported by a toggle mechanism 582 consisting of a link 584 which is pivoted at one end 586 to the channel 576. A second link of the toggle mechanism 588 has its outer end mounted on a torsion bar 590 and has its inner end connected in common with the inner end of the lever 584 to an operating link 592, the connection being by means of a connecting pin 594. The distal end of the link 592 is connected to a rod 596 of a piston operating in a fluid pressure cylinder 598. By means of the mounting just described, the bar 576 can be tilted about its pivot point 578. The bar 576 (see also Fig. 20) has a rib 600 running along the length thereof and this rib constitutes a mount for a sliding channel 602, which is mounted thereon by means of appropriate ball bearings. Suitable stop members are provided so that the movement of the slide channel 602 is limited.

The slide channel 602 has attached thereto a bracket 604 by which an operating cable is attached for drawing the slide channel along the tilting bar 576. The forward end of the slide channel 602 has attached thereto a plate 606, which plate supports a pair of stud socket members 608 and 610. The socket members 608 and 610 have upwardly facing notches which are adapted to engage the reel cartridge studs 568 and 570, respectively, such that the reed cartridge 30 is supported by the slide structures 572 and 574 at opposite sides thereof.

Attached to the cable anchor 604 is an operating cable 612. The operating cable 612 is trained about a guide wheel system by which reciprocating motion, equal in direction and in degree, is imparted to the slides 602 and **602*a* at opposite sides of the tape transport frame. As shown in Fig. 20, the cable 612 is in engagement with a pair of guide wheels 614 and 616 which are journalled for rotation in a T-shaped yoke 618 mounted on the end of a piston rod 620 which operates in a fluid pressure cylinder 622. The fluid pressure cylinder 622 is fixed to the rear of the tape transport frame, as shown in Fig. 19. The free ends of the cable 612 are also anchored at the rear of the tape transport frame by means of brackets 624 and 626**.

The manner in which the cable 612 is arranged is diagrammatically illustrated in Fig. 20A, to which reference may be had for an easier understanding of the cable system. It will be seen in Fig. 20A that the slide members 602 and **602*a* are fixed to the cable 612, the slides having extending upwardly therefrom cable anchor plates 604 (Fig. 20A) and 604*a*, respectively, to which the cable is attached. Upon turning about the cable guide wheel 614, the cable 612 is brought laterally across the back of the tape transport frame where it engages a cable guide wheel 628 from which the cable passes forwardly to the front of the tape transport frame where it is turned back upon itself about a tape drive wheel 630. The return bight of the cable 612 is attached to the slide 602*a*, as previously stated. Returning to the rear of the tape transport frame, the cable 612 engages a guide wheel 632 and then extends laterally across the rear of the tape transport frame into engagement with a guide wheel 634. At this point the cable is again trained toward the front of the tape transport frame where it is passed about a guide wheel 636 before turning back upon itself toward the rear of the tape transport frame. The slide 602 is attached to the length of the cable lying between the forward right guide wheel 636 and a rear guide wheel 638, also located at the rear of the frame. At this point the cable is turned laterally across the rear of the tape guide frame where it is brought about the guide wheel 616, as stated, and then fixed to the anchor bracket 626**.

From the foregoing, it can be seen that movement of the guide wheels 614 and 616 under the influence of fluid pressure in the cylinder 622 will cause the cable 612 to move, with the consequence that the slides 602 and **602*a* will be moved accordingly. Assuming that the piston operated guide wheels 614 and 616 are moved to the left in Fig. 20A, for example, it can be seen that the slides 602 and 602*a* will be drawn to the rear. Movement of the guide wheels 614 and 616 to the right in Fig. 20A will cause the slides 602 and 602*a* to be projected forwardly. The fluid pressure piston 620 in Fig. 20 operates between three positions for moving the reel cartridge 30** into and out of the three positions indicated in Fig. 19.

When the reel cartridge 30 is suspended from the track 562, it is said to be in the unloading position; when the reel cartridge 30 is suspended from the track 458 it is said to be in the loading position; and when the reel cartridge is mounted on the tape drive spindles it is said to be in the loaded position. When the piston 620 of Fig. 20 is as shown in that figure, the slides 602 and **602*a* are adjusted in the cartridge loaded position. When the piston advances to a first dotted line position 640, the slides are adjusted to the loading position, and when the piston advances to a second dotted line position 642, the slides are adjusted to the unloading position. The normal position of Fig. 20 is a limit position of the operating piston as is the unloading position 642. Means must be employed, however, to assure the accurate location of the mechanism in the loading position 640 of Fig. 20. Consequently, there has been provided a solenoid operated detent which can be projected into the path of the yoke 618 for precisely limiting the piston stroke in the loading position. Attached to the rear of the tape drive frame is a solenoid S434 having a core 646 which is pivoted to a detent mechanism consisting of a lever 648 attached to a pivot shaft 650 which when rotated is adapted to rock a detent lever 652 having a detent finger 654. A spring 656 attached to the lever 648 serves to hold the detent lever 652 in its depressed position and also serves to bias the core 646 outwardly when the solenoid S434 is deenergized. However, upon energization of the solenoid S434, the core 646 thereof will be attracted with the result that the detent lever 652 will be rocked upwardly and the detent finger 654 thereof will be moved into the path of the yoke 618**.

Figures 27, 28:
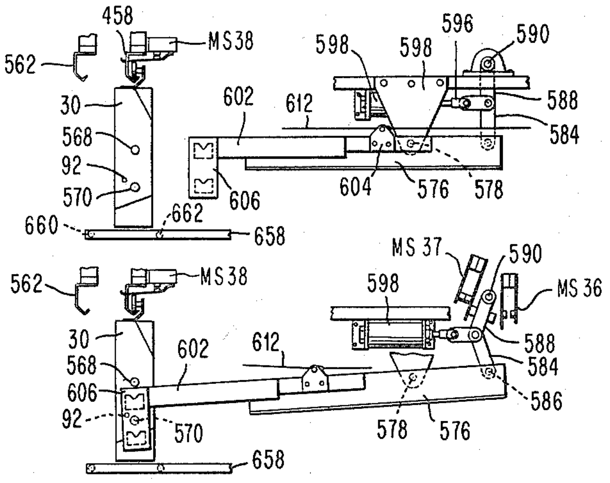
Figure 29:
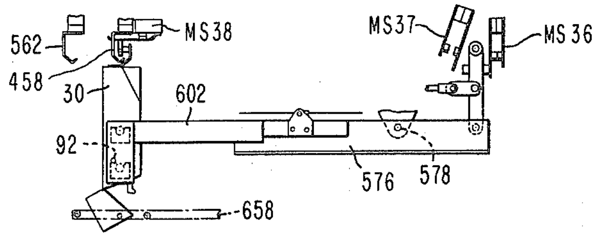
Figure 30:
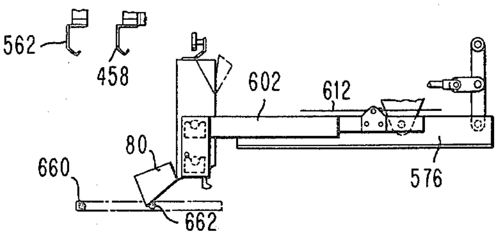

Figs. 27 through 32 represent, in more or less diagrammatic form, the six fundamental attitudes of the slides 602 and **602*a* required for the manipulation of the reel cartridges in reference to the tape transport frame. In these figures the position of the slide 602 in each case represents also the position of the slide 602*a*, it being remembered that both slides operate in unison. Fig. 27 illustrates a cartridge 30 in the loading position on track 458. The slides 602 and 602*a* are in their normal position. In Fig. 28, the slides 602, 602*a* have been extended to the loading position under the influence of the operating cable 612 and at the same time the fluid pressure motor 598 has operated the toggle link system to tilt the rail 576** downwardly such that the stud sockets on the plate 606 are in alignment with but under the respective reel cartridge studs 568 and 570. The toggle links 584 and 588 are now straightened by the fluid pressure motor 598, as shown in Fig. 29, and this serves to engage the cartridge stud sockets with the reel cartridge studs 568 and 570. At the same time, the reel cartridge 30 is lifted slightly whereby the wheels thereof are lifted free of the loading track 458. To load the reels of the cartridge on the spindles of the tape drive unit, the slides 602 and 602*a* must be retracted under the influence of the cable 612 to the position shown in Fig. 30.

Assuming now that the tape within the cartridge so loaded into the run position has been processed and it is desired to remove the cartridge from the tape transport unit and return it to a selected place in storage, the slides 602 and 602*a* will be projected forwardly under the influence of the cable 612 until the cartridge is free of the reel hubs after which the slide carries the cartridge forward to the unloading track 562. During this operation the cartridge wheel brackets pass through the slots in the loading track 458 (Fig. 31), as previously explained. After the slides 602 and 602*a* have advanced the reel cartridge 30 beyond the loading track 458 and the wheels thereof into alignment with the unloading track, the fluid pressure motor 598 is operated to drop the free end of the rails 576 such that the slides 602 and 602*a* position the wheels of the reel cartridge 30 on the flange of the unloading track 562. As seen in Fig. 32, continued tilting of the rails 567 will disengage the reel cartridge stud sockets and the slides 602 and 602*a* can now be returned to their normal retracted position and the rails 576 and the slides 602 and 602*a* are returned to a horizontal plane.

In the description of Fig. 25, and particularly in the part thereof dealing with the latch 90 for latching the bottom cartridge closure 80, it was stated that a latch such as shown in Fig. 25 is located directly inside each reel cartridge end wall and that the operating pin 92 of these latches extends through elongated apertures 94 in the reel cartridge end walls.

Figure 31:
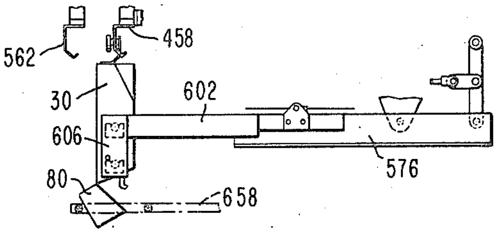
Figure 32:
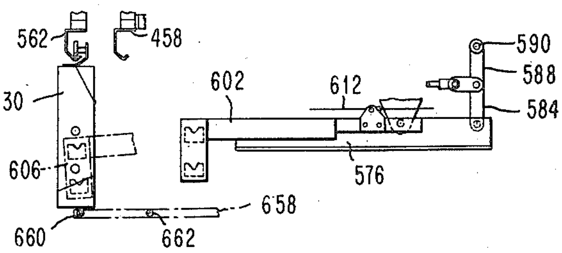

Reference to Figs. 27 through 32 in conjunction with Figs. 19 and 25 will show how the latch operating pins 92 are operated and how the bottom closure 80 of the cartridge is manipulated. As indicated in Fig. 19, the latch operating pins 92 project from the cartridge casing at a point slightly above and to the rear of the reel cartridge stud 570. The cartridge stud socket 610 has an upper edge which is adapted to engage the pin 92 as the stud socket makes engagement with the cartridge stud 570. As the pin 92 is so engaged it is moved upwardly thereby releasing the internal latch mechanism, as previously described. As shown in Fig. 19, a closure control bar 658 extends forwardly from the face of the tape drive frame and this bar carries a pair of laterally extending rods 660 and 662 which are adapted to control movement of the cartridge closure 80. When the reel cartridge 30 is in the unloading position on track 562 as shown in Figs. 19 and 31, the latch pins 92 will be engaged by the rear surface of the cartridge stud socket 610, but since in this position the closure 80 of the cartridge is over the rod 660, the closure 80 cannot open.

However, if a cartridge is engaged by the slide mechanism when the cartridge is in the loading position of track 458, as shown in Figs. 28 and 29, engagement of the stud socket 610 with the latch operating pin 92 will release the latch and the closure 80 of the cartridge will open because at this point the cartridge is located between the rods 660 and 662 such that neither rod is an impediment to the free downward movement of the closure 80.

As the cartridge is moved inwardly toward the face of the tape frame following the opening of the closure 80, the upper edge of the closure will engage the rod 662 thereby swinging the closure 80 to a fully open position as inward movement of the cartridge continues. By reference to Fig. 30, it will be seen that when the cartridge is in the loaded position, the closure 80 will be tilted open by the rod 662. As the cartridge is being returned to the unloading position on track 562, the rod 660 will engage the bottom of the closure 80 and return it to its closed position in which position it will be latched as soon as the slides 602 and 602*a* are dropped away from the cartridge lugs and the latch operating pins.

It has been stated that the slide mechanism 566 associated with the tape transport frame duplicates the slide mechanism 328 associated with the elevator. However, the slide associated mechanism for engaging the cartridge is different as may be seen by reference to Figs. 14 and 15. Attached to the bottom flange of the outer slide channel in the tape transport associated mechanism 566 is a bracket 664 which constitutes a support for a solenoid operated cartridge engaging structure. As best seen in Fig. 14, the bracket 664 has mounted thereon a pair of detent levers 668 and 670. The levers 668 and 670 are pivoted for rocking motion on pivot shafts 672 and 674, respectively, located at opposite extremities of the bracket 664 with the levers extending inwardly and toward each other so that the detent fingers 676 and 678 thereof will operate in the same plane. As best seen in Fig. 15, the levers 668 and 670 are sufficiently spaced from each other along their pivot axis that the lever 668 can engage the slot 152 in the top of a cartridge on the unloading track 562 and that the lever 670 can engage the slot 152 of a cartridge on the loading track 458. The shafts 672 and 674 are rotated through the agency of operating fingers 680 and 682, respectively. The levers 668 and 670 are normally biased downwardly into cartridge slot engaging position by respective springs 684 and 686 which are attached respectively to the operating fingers 680 and 682. An unload pick solenoid S436 is mounted on one face of the bracket 664 to control the lever 668, and a load pick solenoid S435 is mounted on the opposite face of the bracket 664 for controlling the lever 670. It may be seen by reference to the unload pick solenoid S436 in Fig. 14 that when the same is energized, a core extension 692 will be projected to the left and into operating engagement with the operating finger 680, such that the lever 668 will be held in an elevated position where it is lifted above the cartridge groove 152. If either of the solenoids is deenergized, as for example, the load pick solenoid S435 at the right in Fig. 14, its operating spring will rotate its detent lever into cartridge groove engaging position.

It is now possible to return to Fig. 17 and follow the movement of a reel cartridge 30 from the left storage unit to the loading track of the tape transport unit immediately to the left of the left storage unit.

Previously reference to Fig. 16 traced the movement of a reel cartridge from a right storage unit, through a reel cartridge carriage unit and into the left reel cartridge storage unit. At this point the slide assembly 566 of the tape transport unit is set into motion and is so controlled as to project its slides to the right such that the detent 670 carried by the outer slide of the slide assembly is positioned with its detent finger directly over the slot in the top wall of the reel cartridge 30. When this position has been achieved, the load pick solenoid S435 of Fig. 14 is deenergized such that the spring 686 will rock the detent 670 about its pivot 674 to drop the detent finger of the detent lever into the reel cartridge slot 152. After engagement has been established between the finger of the detent lever 670 and reel cartridge 30, the slide assembly 566 is again operated and controlled to retract the slides thereof to the left, as viewed in Fig. 17. This latter movement results in transfer of the reel cartridge 30 from the loading track of the left storage unit onto the loading track 458 of the tape transport. The reel cartridge is now in position for transfer from the loading position to the loaded position, as previously described in respect of Figs. 27 through 32.

Fig. 5 shows a pair of cartridge sensing arms 692 and 694 associated with the elevator 254. These arms are at the lateral extremities of the carriage. The cartridge sensing arms are identical as to structure, mounting and operation. Therefore, the description will be confined to the arm 694 and its associated mechanism. The arm 694 is carried by the face plate 696 of a rotary solenoid S406, the solenoid S406 being fixed to the face of the elevator 254. The rotary solenoids, such as the solenoid S406, used throughout the structure are commercially available devices in which the reciprocating motion of the solenoid core is converted into rotary motion of a face plate attached to the core by means of camming surfaces which translate core reciprocation into face plate rotation. The face plate 696 is attached to the solenoid core 700 and the sensing arm 694 is pivoted to the face plate 696 by means of a pivot stud 702. The sensing arm 694 is inturned at its lower end where it normally closes the points of a check home microswitch MS14 An upper extension 710 of the sensing arm is adapted to operate a cartridge in right microswitch MS7 or a no cartridge in right microswitch MS8, depending on the presence or absence of a cartridge in the space being probed by the arm 694.

The sensing arms 694 are adapted to detect the presence or absence of a tape cartridge in each of the cartridge compartments as well as in the several transport positions. When the elevator mechanism is in transverse alignment with an expected cartridge position, the cartridge sensing arm adjacent that position is oscillated by its rotary solenoid. If a cartridge is in a position being tested by the sensing arm, the arm will be limited in its movement. On the other hand, if the position is vacant, the arm will swing outwardly to its limit position. This concept is clarified in Figs. 33 and 34. If an empty carriage is directed to a reel cartridge storage position, for example, and the carriage is laterally aligned with a cartridge in such position, as more or less diagrammatically illustrated in Fig. 33, at the instant of alignment, the check solenoid S406 is energized with the result that its rotary plate 696 will rotate in a counterclockwise direction thereby swinging the cartridge sensing arm outwardly into contact with the cartridge 30. This results in the opening of the points of the check home microswitch MS14 and the closure of the points of cartridge in right microswitch MS7. During initial operation of the solenoid, the sensing arm 694 will remain in its normal position in respect to the rotary face plate 696 of the solenoid, i.e., there will be no rotation of the arm on its pivot stud 702. However, as soon as the sensing arm comes into contact with the cartridge 30 and the rotary face plate 696 continues to rotate, there will be relative movement between the arm and the face plate with the result that the upper end 710 of the arm will be carried into contact with the cartridge in right microswitch MS7, thereby closing the contacts of the switch to indicate the presence of a cartridge as expected.

Should the storage position being tested be vacant, the arm 694 will swing outwardly into the vacant space with the result that no relative movement takes place between the arm and the solenoid face plate. In this event, the upper end 710 of the cartridge sensing arm passes in an arc below the cartridge in right microswitch MS7, which is consequently then unaffected. This greater movement of the cartridge sensing arm under these conditions will then result in closure of the points of the no cartridge in right microswitch MS8, as shown in Fig. 34. In this event, operation of the no cartridge in right microswitch MS8 results in an indication that some error has been made since no cartridge is located in the storage compartment in which a cartridge was expected.

The converse of the situation described above exists when the elevator and carriage mechanism attempt to deposit a cartridge into a space already occupied by a cartridge, and that space, therefore, is not conditioned to receive the cartridge that is to be deposited. Assume, for example, that the record tape in a reel cartridge has been processed and that cartridge is to be returned to an empty storage compartment. The carriage and elevator mechanism will align the processed cartridge with the designated compartment and upon the instant of such alignment, the check solenoid S406 will be energized and swing the cartridge sensing arm 694 outwardly as before. If the sensing arm encounters a cartridge in the compartment supposed to be empty, the cartridge in right microswitch MS7 will be operated as previously described in respect to Fig. 33 and closure of the contacts thereof will indicate an erroneous operation since the compartment to which the cartridge is directed is, in fact, occupied and no room, therefore, exists for the cartridge that is being returned to storage. If, on the other hand, the storage compartment is empty, as it should be, the cartridge sensing arm will swing outwardly to its limit stop position, it will pass the cartridge in right microswitch MS7 without operating its contacts, but it will close the contacts of the no cartridge in right microswitch MS8, as described in respect to Fig. 34. Closure of these contacts can be interpreted as indicating an operative condition such that the processed cartridge can be inserted into its intended storage compartment since this compartment is empty, and, therefore, conditioned to receive the cartridge in alignment therewith.

It has been stated previously that operation of the yoke 104 in Fig. 23 presents a length of tape 46 for easy threading between magnetic tape processing heads and tape guide surfaces on the face panel of the tape transport unit.

Referring once again to Fig. 23 and also to Fig. 24, it will be seen that the tape transport unit has a pair of magnetic read/write heads 716 and 718 with which cooperates a tape guide plate 720. The tape guide 720 is mounted in a slide structure 722 and is controlled by a linkage system 724 under the influence of a fluid pressure cylinder-piston combination 726. The specific nature of the read/write heads, the tape guide plate, and a complete understanding of its operating mechanism is of no importance insofar as the present invention is concerned, except to understand that operation of the linkage system 724 will serve to lower the tape guide plate 720 to the position shown in Fig. 23, such that the length of tape between the tape pins 100 and 102 carried by the yoke 104 will readily pass between the read/write heads 716 and 718 and the tape guide plate 720 and that further operation of the linkage system will then elevate the tape guide plate 720 into operative position as shown in Fig. 24.

The tape transport unit contemplated for the system herein is a modification of the tape transport machine disclosed and claimed in James A. Weidenhammer et al. application for United State patent, Serial No. 535,052, filed September 19, 1955, which is a continuation of Serial No. 290,396, filed May 26, 1952. The tape transport unit of the present invention includes vacuum control columns of the nature disclosed and claimed in said Weidenhammer et al. application; these columns being a left vacuum column 728 and a right vacuum column 730, as shown in Figs. 23 and 24. When the tape transport unit is being conditioned for operation, the atmosphere in the columns 728 and 730 is exhausted through the bottom of the columns and the rarefied atmosphere within the columns is herein employed for threading the tape into the vacuum columns so that the entire operation of loading, threading and processing tape can be performed without manual intervention.

Tape threading mechanism is mounted in the face panel of the tape transport unit in association with each of the vacuum columns 728 and 730; this mechanism being adapted to position a length of the tape over the open upper mouth of each vacuum column whereby a loop of tape is forced into each of the columns. Specifically, the mechanism includes a pair of tape threading segments 732 and 734 respectively associated with the upper open end of the vacuum column 728 and 730. The form and operation of the tape threading segments are identical such that a description of the segment 732 associated with the vacuum column 728 will suffice as a description of both.

The tape threading segment 732 consists of a generally arc-shaped portion 736 and a generally radial portion 738. The free end of the radial portion 738 is pivoted on a pivot pin 740 which permits the entire segment to swing from the position shown in Fig. 23 to that shown in Fig. 24. A spring 742 attached to the segmen at the juncture of the radial and arcuate sections rotates the segment in a counterclockwise direction (the segment 734 being mounted in a reverse position will rotate in a clockwise direction). The segment 732 operates behnid the vacuum column 728 but the free end of the arcuate portion 736 carries a forwardly projecting tube 744 which overlies the tape 46. As stated, the inner position of the segment 732, as shown in Fig. 23, is the position occupied thereby as a cartridge is loaded on the tape drive unit. It can be seen, therefore, that if the column loading segment is permitted to swing outwardly in a counterclockwise direction under the influence of the spring 742, the projecting tube 744 will engage the inner surface of the tape 46 and will carry a length of the tape across the upper open mouth of the vacuum column 728. When a length of tape is so positioned, a loop of tape, as shown in the dot-dash lines 746, will be drawn into the vacuum column.

The threading segment 732 is operated in a clockwise direction by means of a pivot lever 748 connected to the piston rod of a fluid pressure cylinder 750. The lever 748 is pivoted on a pivot stud 752 and at its free end it carries a laterally projecting stud 754 which is in contact with the outer edge of the generally radial section 738 of the threading segment. When a piston rod 756 to which the pivot rod 748 is connected through a slot and pin connection 758 is withdrawn into its cylinder 750, the free end of the pivot lever 748 will be raised with the result that the stud 754 bearing against the section 738 of the segment will swing the segment in a clockwise direction about its pivot point 740 and against the tension of the spring 742. During the tape threading operation fluid under pressure is admitted to the cylinder 750 with the result that the piston rod 756 will be projected as shown in Fig. 24 thereby dropping the free end of the pivot rod 748 and allowing the spring 742 to rock the segment 732 in a counterclockwise direction about its pivot 740.

As the tape 46 is carried across the open mouth of the vacuum columns 728 and 730 by operation of the threading segments 732 and 734, as described, it is simultaneously brought into contact with a pair of tape drive capstans 760 and 762 which are constantly driven in opposite direction. The capstans 760 and 762 provide the motive force for driving the tape in a selected direction in respect to the read/write heads 716 and 718. Suitable means, forming no part of this invention, have been provided for selectively engaging the tape 46 with either the capstan 760 or 762, whereby drive of tape and its direction is controlled.

The tube 744 carried by the threading segment 732 is a hollow tube having a plurality of perforations in the wall thereof which faces the tape and the tube is connected by means of a flexible conduit 764 with a source of air under pressure. Whenever the tube 744 is in operative relation to the tape and air is discharged through the perforations of the tube, there will be formed an air film between the tube surface and the confronting face of the tape thereby friction that might otherwise be present is eliminated. By the same token, the top of each tape column has a tape guide 766 located at the outer edge thereof. This tape guide has a perforated inner face and is connected to a source of air under pressure whereby an air film is formed between the opposite face of the tape and the confronting face of the tape guide 766.

The position of the tape loops within the vacuum columns 728 and 730 effectively controls the motion of the tape drive spindles, as taught in the aforesaid Weidenhammer et al. application for patent, such that a loop of tape of optimum length is maintained in the vacuum columns 728 and 730, providing a reservoir of relatively slack tape upon which the tape drive capstans 760 and 762 may draw without regard to any inertia inherent in the reel drive mechanism.

Fig. 24 also discloses that the top closure section 132 of the cartridge has been opened. The manner in which the cartridge top section 132 is opened has been alluded to heretofore, particularly in the description of Fig. 25 wherein it was briefly stated that a lever 124 is operated to elevate the operating rod 120 by which the top section 132 of the cartridge is swung to its open position. Reference to Figs. 19 and 25 will show that the lever 124 is rotatable about a pivot 768 and that an arm 770 of the lever 124 extends to the rear of the tape drive face panel 464. The rearwardly extending arm 770 is connected to a piston 772 operating in a fluid pressure cylinder 774. It can be seen, therefore, that as the piston 772 is withdrawn into its cylinder 774, the lever 124 will be rocked upwardly such that the yoke 104 and the rod 120 are elevated. Projection of the piston 772 will reversely rock the lever 124, so that the yoke 104 and the rod 120 will be lowered under the influence of the springs attached thereto.

After the covered section 132 of the cartridge is opened, a pair of coil sensing arms 776 and 778 pivoted respectively on pivot pins 780 and 782 are lowered into the cartridge through the now opened top and are positioned in proximity to the tape coils on the reels within the cartridge. The arms 776 and 778 constitute elements of a photosensitive control mechanism which forms no part of the invention claimed herein. It is sufficient to state that the size of the tape coil on the respective reels is sensed thereby and that the position of the arms 776 and 778 controls a servo system 784 which controls the speed of the reel drive spindles to maintain it proportional to the size of the tape coil on the respective reels.

The operating logic of the handling and loading system herein is controlled in large part by a series of microswitches which monitor the position of the various moving elements. A full understanding of the invention will, therefore, be aided by at least a brief reference to the positon switches which are employed in the mechanical elements by which they are operated. Mention has been made heretofore of the trolley position microswitches TMS1 through TMS9 which are shown in Fig. 3A. These are the switches which sense the position and progress of the trolley 154 as it moves along its supporting rails. Reference has also been made to the elevator position microswitches MSA, MSB and MSC which sense the position of the elevator 254 as it is raised and lowered at the face of the trolley.

The trolley detent microswitches MS1 and MS2 are shown in Fig. 4 wherein the microswitch MS1 is the trolley detent out microswitch and the microswitch MS2 is the trolley detent in microswitch. It can be seen that the detents 236 and 238 will operate the microswitches MS1 and MS2 respectively as the operating solenoid S401 is energized and deenergized. The elevator structure, as shown in Fig. 5, has a similar set of microswitches for indicating the position of the elevator detents 296 and 298. When the elevator detents are withdrawn from their respective detenting notches, the elevator detent out microswitch MS3 is closed. Conversely, when the detents 296 and 298 are in the detenting notches, the elevator detent in microswitch MS4 will be closed.

It has been pointed out that the cartridge checking arms 694 operate a group of microswitches which indicate the presence or absence of a cartridge at any given position. The operation of the checking arms was described in reference to Figs. 33 and 34 which illustrate the cartridge in right microswitch MS7, the no cartridge in right microswitch MS8 and the check home microswitch MS14. It will be understood that a similar set of microswitches is located at the left end of the elevator where the no cartridge in left microswitch MS5, the cartridge in left microswitch MS6 and the check home microswitch MS13 are operated by a cartridge sensing arm identical to that described in reference to Figs. 33 and 34.

The ultimate limit positions of the cartridge 154 at the front and at the rear of the cartridge handling unit are determined by a pair of microswitches MS16 and MS17 (Fig. 47) located, respectively, at the front and rear of the cartridge handling frame. When the carriage is at the front of the cartridge handling frame, it will abut the trolley limit front microswitch MS16 and provide an indication that the trolley has reached a limit position at the front of the cartridge handling unit. By the same token, when the carriage closes the trolley limit rear microswitch MS17, it provides an indication that the carriage has reached its limit position at the rear of the cartridge handling unit. A similar set of switches is also provided for sensing and indicating the position of the elevator as it reaches its limit of travel at the top of the carriage and also its limit of travel at the bottom of the carriage. Thus, it can be seen by reference to Fig. 5 that the elevator limit top microswitch MS18 is positioned on the top of the carriage frame such that it will be closed by contact therewith by the elevator frame 330 when the elevator is in its ultimate position at the top of the carriage. A similar elevator limit bottom microswitch MS19 (Fig. 47) is mounted on the bottom of the carriage frame in such position that it will be closed by contact of the elevator frame when the elevator is in its lower limit position.

Fig. 5 also discloses the left slide out microswitch MS10 which is also illustrated in Fig. 17 together with the right slide out microswitch MS11 with which it operates in concert to provide indications of the position of the slide mechanism. Fig. 5 also illustrates the location of a cartridge in slide microswitch MS17. It can be seen, therefore, that the right, left and home positions, of the slide 338 are sensed and an indication of the positions is thereby provided for utilization in the control circuits.

A generally similar set of microswitches is used on the tape loading unit to provide the necessary indications of the position of tape cartridge and tape cartridge manipulating elements. Thus, in Fig. 14 the tape slide center microswitch MS30 and the tape slide home microswitch MS31 are operated by the position of the tape slide mechanism 566 which is associated with the tape reel cartridge loading unit.

It has been heretofore stated that the unload solenoid S436 and the load solenoid S435 operate to engage cartridges for transport to and from the face of the tape reel cartridge loading unit. To provide an indication of the condition of these solenoids and consequently of the position of their respective cartridge engaging fingers 668 and 670, a pair of microswitches MS32 and MS33 which are respectively the unload pick arm microswitch and the delivery pick arm down microswitch, are operatively associated respectively with the elements 682 and 680 upon which the unload solenoid and the load solenoid operate. Thus, the unload pick arm microswitch MS32 is operated by the element 680, while the delivery pick arm down microswitch MS33 is operated by the element 682. In addition to the tape slide center microswitch MS30 and the tape slide home microswitch MS31, the slide mechanism 566 of the cartridge transporting slide associated with the tape transport unit includes a slide out microswitch MS34 as shown at the left in Fig. 17. When the slide arm is projected to the left as viewed in Fig. 17, the slide out microswitch MS34 is closed to give an indication of the fact.

Three microswitches indicating the attitude of the cartridge handling arms 602 and 602a are located at the back of the tape reel loading unit, as shown in Fig. 20. It will be recalled that the tape reel cartridge must be shifted into and out of three basic positions as shown in Fig. 19; these being the cartridge loaded position, the cartridge load position and the cartridge unload position. Thus, the tape unit arms in microswitch MS35, the out discharge microswitch MS40 and the out mount microswitch MS41, shown in Fig. 20, provide an indication of the longitudinal position of the cartridge handling arms 602 and 602a in respect to the face panel of the cartridge transport unit. A pair of microswitches MS36 and MS37 provides an indication of the elevation of the cartridge handling arms 602 and 602a.

Reference to Fig. 29 will show that the tape unit arms up microswitch MS36 will be closed by the link 588 when the cartridge handling arms 602 and 602a are in their upper position. The tape unit arms down microswitch MS37, as shown in Fig. 28, will be closed when the cartridge handling arms 602 and 602a are tilted downwardly as shown in that figure.

Fig. 23 discloses a pair of cartridge up microswitches MS38 which are closed by contact by the caster assemblies of a cartridge whenever a cartridge is in the elevated position, as shown in Fig. 29 for example. This microswitch is utilized to indicate the fact that a cartridge is properly located above the track into which it is to be set when being manipulated by the cartridge handling arms 602 and 602a. Finally, cartridge mount microswitch MS42, as shown in Fig. 22, senses the fact that a tape reel cartridge is mounted on the spindles of the tape transport unit.

*Control circuits for handling cartridges in storage unit*

As illustrated herein, the trolley and elevator mechanism is adapted to operate on four instructions. These are store, fetch, take and put. The instruction to store a cartridge will cause the cartridge handling mechanism to approach one of the tape transport units, take a cartridge off the discharge track and return it to a storage location in the storage unit. A fetch instruction will cause the cartridge handling mechanism to take a cartridge from a storage location and make it accessible to the loading mechanism of the tape transport unit. The take instruction will cause the cartridge handler to take a cartridge from a storage location and hold it on the elevator slide, and finally the put instruction will cause the cartridge handling mechanism to deliver a cartridge already on the elevator slide to a designated address. By utilizing the take and put instructions in proper combinations, cartridges can be shifted from one storage location to another simply on the basis of two addresses furnished by the control system.

It is contemplated that the mechanism herein will find its greatest utility when used as an adjunct to an electronic computer or an electronic data processing machine. Systems of this kind will include computer or data processing units capable of emitting instruction signals to which the cartridge handling mechanism will respond. Control of the system herein may, on the other hand, be under the influence of a program tape, or the like. A number of control signal sources will suggest themselves to those skilled in the art and for purpose of simplified illustration, the system herein is shown to be controlled through the medium of a pluggable control panel shown in Fig. 35. Reference to Fig. 35 will show the presence of ten program steps or levels providing capacity for instructions sufficient for the complete processing of five cartridges since two program steps or levels are required for a complete operation which includes the withdrawal of a cartridge from a storage location, its delivery to the tape transport unit and its return to a storage location following the processing of the tape in that particular cartridge.

Associated with each of ten rows of program step hubs are corresponding rows of address and function hubs.

By reference to Fig. 39, it will be seen that four trolley control relays R123 (Trolley Address 1), R124 (Trolley Address 2), R125 (Trolley Address 4) and R126 (Trolley Address 8), comprising a binary coded arrangement, are provided to control the position to which the trolley or carriage is driven. A pair of relays R129 (Elevator Address A) and R130 (Elevator Address B), when used singly or in combination, determine to which of its three vertical positions the elevator will be driven. Relays R146 (Left Slide), R147 (Right Slide) and R157 (Right Slide) control the direction of elevator slide movement and relays R148 (Put) and R149 (Take), respectively, indicate whether the operation is one for returning a cartridge to storage or whether it is one for obtaining a cartridge from storage. Each of the foregoing relays can be energized by applying a pulse from any one of ten plug hubs connected to the relay coils; one of the hubs of each relay being located at each program step or level in the control panel of Fig. 35. Associated with each row of relay hubs is a row of program step hubs (Figs. 35 and 40) controlled by program step relays R131 through R144, inclusive (Fig. 38). It will be noted that each relay has six points and six control hubs, which is the number shown in connection with each program step in Fig. 35. The program step relays R131 through R144 are energized sequentially; the hubs controlled by the relay R131 being those associated with program Step 1; the hubs controlled by the points of relay R132 being those associated with program Step 2, etc. It can be seen, therefore, that the various address and function relays can be wired selectively to produce different control patterns at the various program levels.

For purpose of illustration, let it be assumed that the cartridge handling mechanism is to be instructed to go to storage location 9CR which is the last storage slot in the lower storage tier in the storage unit at the right of the cartridge handling carriage. The system is to be further instructed to withdraw a cartridge from storage location 9CR and to deliver the same to position 3AL which is a forward access position at the top of the cartridge storage unit located at the left of the carriage and in position where it is accessible to the tape transport mechanism adjacent thereto. For purpose of this operating routine, a program Step 1 hub will be wired to the associated hub in the circuit of trolley address relay R123, and another of the program step hubs will be wired to the hub in the circuit of the trolley address relay R126. These trolley address relay hubs represent respectively the binary digits 1 and 8 and, therefore, condition the trolley address control circuit to drive the trolley to the 9th storage tier. The ultimate position of the elevator will be controlled by wiring a program step hub to the associated control hub of the elevator address relay R129 and a second program step hub to the associated control hub of the elevator address relay R130. Relays R129 and R130 when energized, in combination, will control movement of the cartridge elevator into the C position; i.e., into alignment with the lower row of storage compartments.

The cartridge slide mechanism carried by the elevator must also be instructed to operate toward the right in order to take a cartridge from the storage unit at the right of the carriage. Therefore, one of the program step hubs will be wired to the associated hub common to the right slide relays R147 and R157, which cause the slide to be projected to the right. Since a take operation is to be performed, a program step hub is wired to the associated hub of the take relay R149. This then conditions the system to run the elevator and carriage to the proper storage location, i.e., location 9CR where it will withdraw a cartridge from the designated location and load it into the elevator.

After the cartridge has been loaded on the elevator, the system must furnish a delivery address and instructions as to the disposition of the cartridge. Therefore, the program step hubs controlled by the program step relay R132 in Step 2 must be wired to the appropriate associated control hubs.

As shown in Fig. 35, a program step hub is wired to one of the control hubs in the circuit of the trolley address relay R123, and another of the program step hubs is wired to a control hub of the trolley address relay R124. The binary sum for which these relays stand is 3. This results in trolley control necessary to drive it to trolley position 3. A program step hub at Step 2 is wired to a control hub of elevator address relay R129, which controls elevator operation into location A. Since the elevator must divest itself of the cartridge when it reaches position 3AL, it must be conditioned to perform a put operation by wiring a program step control hub of Step 2 to a hub of the put relay R148 and finally since the cartridge is to be deposited to the left of the elevator position, a program step hub is wired to a control of the left slide relay R146.

It can be seen from the foregoing that a series of operations can be set up on the control panel of Fig. 35 and that the number of such operations, controllable through the medium of the control panel, is limited only by the size of the panel.

Assuming that the control panel has been wired, as explained above, a ready switch 29 (Fig. 47) is operated with the result that the start relay R29 is energized.

If it is assumed that the elevator at this moment is located at position 2A, a trolley position microswitch TMS2 (Fig. 36) will be closed. This trolley position microswitch is one of the series of nine trolley position microswitches located along the trolley track, as shown in Fig. 36. With trolley position microswitch TMS2 closed, current is conducted through the normally open but now closed points R29AL of the start relay. The circuit is continued through normally closed points R24AU of the slide OK relay, through normally closed points R32BU of the step reset relay and into the common bus of the trolley position microswitches TMS1 through TMS9.

Since the trolley position microswitch TMS2 is closed, an impulse is transmitted to the trolley position relays R109 and R112, which are wired in parallel. The lines controlled by the trolley position microswitches TMS1 through TMS9 constitute a diode OR circuit network by means of which the closure of a given trolley position microswitch will translate the present decimal trolley position into its binary equivalent.

The pulse passing through normally closed points R32BU of the step reset relay (Fig. 36) is also conducted to the normally closed points R154–1 of the manual relay through which it passes to the step relay commutator in Fig. 38. Assuming that the commutator is in the first position, program step relay R131 will be energized thus closing its points and supplying power to the program step hubs (Figs. 35 and 40) for the first program step.

The pulse passed from the normally closed point R32BU of the step reset relay (Fig. 36) to the common of the microswitches TMS1 through TMS9 is also delivered to the common of the elevator position microswitches MSA, MSB and MSC. The elevator position microswitches MSA, MSB and MSC are those associated with the track of the elevator as shown in Fig. 5. While the trolley position switches TMS1 through TMS9 provide an indication of present trolley position, the elevator position microswitches MSA, MSB and MSC provide an indication of present elevator position. Since it is assumed that the elevator is in its A position, the elevator microswitch MSA is closed and this results in the energization of elevator position relay R120 (Fig. 36).

By reason of the closed trolley position switch TMS2 and the closed elevator position switch MSA, the mechanism has an indication both of present trolley and elevator locations. This indication is necessary since it constitutes a reference point for further trolley and elevator movement. The same pulse utilized to energize the trolley position and the elevator position relays is also taken from normally closed points R32BU (Fig. 36) of the step reset relay and is transmitted through normally open but now closed points R26AU of the control delay relay to the energizing circuit of the program delay relay R28 (Fig. 39). The program delay relay R28 has a shorted coil so that its picking action is retarded. This assures the positive prior energization of the trolley and elevator position relays.

After the trolley and elevator position relays have been energized, as described heretofore, closure of points R28AU (Fig. 39) of the program delay relay permits a pulse to pass through normally closed points R150–11 of the manual relay to the closed points of the program step relay R131 (Fig. 40). This results in the application of power to the first level of the program step hubs and results in the energization of the take relay R149, the right slide relay R147, the elevator address A and B relays R129 and R130, respectively, and the trolley address relays R123 and R126.

As indicated above, any instruction must include a put or a take command. Therefore, the points R28AU (Fig. 39) of the program delay relay which has just been energized after a delay due to its shorted coil, transmit a pulse by way of normally closed points R150–11 of the manual relay through the points R148–1 or R149–1, depending on whether the put relay R148 or the take relay R141 has been energized. In this case, the pulse will be transmitted through normally open but now closed point R149–1 of the take relay to energize the control delay relay R26. When the control delay relay R26 is energized, its points R26AU (Fig. 36) will transmit current impressed on the normally closed points R32BU of the step reset relay by reason of the closed elevator position microswitch MSA and the current so transmitted is fed into a relay point network whose output is an indication of the direction the elevator must move to reconcile its present position with the ultimate position of the program instruction. The relay points of the relay point network are those involving both present and intended elevator positions. Bearing in mind that the elevator address relays R129 and R130 are energized as a result of a control panel instruction, and that the present elevator position relay R120 is energized as a result of the closed elevator position switch MSA, a path is established through the relay point network to indicate the direction that the elevator must move to travel from its present position to its intended position. Under the conditions described, a circuit is established (Fig. 36) through normally closed points R129–1 of elevator address A relay, through now transferred points R130–1 of elevator address B relay, through now transferred points R120–1 of elevator position relay R120, through normally closed points R121–1 of elevator position relay R121 and thence into the common output, indicating that the elevator must be moved down to achieve its instruction position. The pulse so conducted is taken to energize the elevator down relay R9 (Fig. 42).

It should be noted that elevator and trolley movement is an operation that is performed in parallel. The elevator down relay R9 is held up through R8AU normally closed, its common points R9AU and normally closed points R11BL of the elevator position relay or the R13BL points of the elevator detent in relay which are connected to a 48 volt source. As the elevator goes down, the relay point network of Fig. 36 may be reanalyzed as the moving elevator closes the elevator microswitch MSB to provide a second pulse to the elevator down relay R9. This latter function is not, however, essential since this relay is already energized and has a holding current impressed thereon.

As soon as the elevator down relay R9 is energized, a circuit is established from a 48 volt source to the normally closed points R11AU (Fig. 42) of the elevator position relay, the now closed points R9BU of the elevator down relay, and through the normally closed points R12BL and R12AL of the elevator detent out relay to energize the elevator detent solenoid S402. The circuit of the elevator detent solenoid S402 has a 200 ohm, 20-watt resistor connected in parallel across the points R11AU and R9BU such that some amount of current is constantly fed to the elevator detent solenoid S402 to keep the solenoid slightly energized and thereby prevent the elevator detent from becoming loose.

In Fig. 42, the elevator detent out microswitch MS3, which is now closed, will transmit current to the elevator detent out relay R12. As soon as the elevator detent out relay R12 is energized, the power circuit to the elevator detent solenoid S402 is broken by opening of the points R12AL of the elevator detent out relay. Under these conditions a smaller amount of power is fed to the elevator detent solenoid S402 by way of the 200 ohm, 20-watt resistor. The elevator detent in relay R13 (Fig. 42) is deenergized because the elevator detent in microswitch MS4 is open.

Current is conducted from a 48 volt line via closed slide complete microswitch MS15 (Fig. 46) to normally closed points R5BU of the mechanical error relay. This circuit is continued to points R34AU (Fig. 41) which are closed by the limit relay R34 (Fig. 47) energized by reason of the closed trolley and elevator limit microswitches MS16, MS17, MS18 and MS19 (Fig. 47). The closed point R34AU (Fig. 41) of the limit relay feeds power to parallel normally open points R9AL and R8AL (Fig. 42) of the elevator down and elevator up relays. Inasmuch as the elevator down relay R9 (Fig. 42) was energized as previously stated, the circuit is closed between its points R9AL (Fig. 42) to the common conductor and through it to points R11BU of the elevator position relay which are normally closed, to points R12AU which are closed by the elevator detent out relay R12, previously mentioned. This results in energization of the elevator go relay R206, which effectively powers one phase of the three-phase elevator motor. At the same time, because the points R8AL of the elevator up relay are not transferred, a circuit is also established from the points R9AL of the elevator down relay via the common line to the normally closed points R8AL of the elevator up relay to energize the down relay R207, which effectively powers the remaining two phases of the elevator motor.

The elevator motor being energized, now drives the elevator down until the elevator in passing the elevator position microswitch MSB closes the elevator position microswitch MSC with the result that elevator position relays R120 and R121 are energized and relay points R120–1 and R121–1 thereof (Fig. 36) are transferred to the normally open side with the result that a circuit is established through the relay point network whereby a pulse is transmitted to energize the ready position relay R11 (Fig. 42). This provides an indication that the elevator is down at the C position.

As previously stated, the operation of the elevator and the carriage is in parallel. Therefore, as the elevator controls are operated, as above described, the trolley controls function at the same time to position the trolley at the intended position. The pulse which passed points R26AU (Fig. 36) of the control delay relay to points R129–1 of the elevator address A relay also is transmitted to the points R123–1 (Fig. 37) of the trolley address 1 relay. It will be recalled that the trolley address 8 relay R126 and the trolley address 1 relay R123 were energized to indicate address 9 to which the trolley is to be moved. Trolley position relay R112 and trolley position relay R109 were also energized by reason of the closed trolley position microswitch TMS2 (Fig. 36). By reason of these energized relays, the relay point network of Fig. 37 is conditioned such that a pulse is passed through the normally open but now closed points R123–1 of the trolley position 1 relay, and from thence through normally closed points R124–1 of the trolley position 2 relay, through normally closed points R125–2 of the trolley position 4 relay and through normally open but now closed points R126–4 of the trolley position 8 relay. This impresses a pulse on the 9 bus which leads to the common of points R101–1 of the trolley position relay R101. From this point a circuit is completed to normally closed points R104–2 of the trolley position relay R104, to normally opened points R109–2 of the trolley position relay R109 and to points R115–2 of the trolley position relay R115 which is connected through binding points as the output signal Trolley Forward which is obtained at the points R118–4 of the trolley position relay R118. This line is tied into the circuit of the trolley forward relay R1 (Fig. 41) which holds through normally closed contacts R2AU and then through its R1AU points, through points R3BL and R6BL of the trolley position relay R3 and the trolley detent in relay R6, respectively, and to the 48-volt line. Forty-eight volts are transmitted through points R3AU of the trolley position relay R3 which are now closed, through the now closed points R1BU of the trolley forward relay, and the normally closed points R4BL and R4AL of the detent full out relay to energize the trolley detent solenoid S401 (Fig. 41). This retracts the trolley detents. At this time, 48 volts are transmitted through the trolley detent out microswitch MS1 such that the trolley detent full out relay R4 is energized. The energization of this relay opens its points R4BL and R4AL thus partially breaking the circuit to the detent out solenoid S401 such that a limited amount of power is applied thereto by way of the 200-ohm resistor. At the same time, the trolley detent in relay R6 is energized as a result of the opening of the trolley detent in microswitch MS2.

From the 48-volt line there is established a circuit by way of the slide complete microswitch MS15 (Fig. 46) and the normally closed points R5BU of the mechanical error relay. This circuit is connected to points R34AU (Fig. 41) of the limit relay which is normally open but now closed and from thence to points R2AL and R1AL of the trolley backward and the trolley forward relays, respectively. Since the trolley forward relay R1 is energized, points R1AL thereof are transferred. Therefore, the circuit is continued through the common and to the normally closed points R3BU of the trolley position relay, through the normally open points R4AU of the detent full out relay, now closed since the trolley detent full out relay R4 is energized such that the trolley go relay R202 is picked up. Furthermore, a circuit is established from points R1AL of the trolley forward relay through the normally closed points R2AL of the trolley backward relay to pick up the forward relay R201. This supplies the remaining two phases of power to the trolley motor. At this point, the trolley is moving forward, i.e., from the lower numbered storage compartments toward the higher numbered storage compartments. The condition of the relay point network of Fig. 37 is reanalyzed and another pulse is applied through the trolley motor.

When position 9 is reached and as the trolley position microswitch TMS9 is closed, a circuit is established from the 48-volt line by way of the now closed points R9AL of the elevator down relay, through the normally closed points R24AU of the slide operation OK relay, through the normally closed points R24BU thereof, through the now closed trolley position microswitch TMS9 and through the two diodes connected to the trolley position microswitch TMS9 such that power is applied to the binary coded trolley position relays R101 and R118 and to the trolley position relay R115 in parallel. This provides an output notation of the fact that the trolley is now in the 9th position.

A pulse is again transmitted through the normally open but now closed points R26AU of the control delay relay and is applied to the relay point network of Fig. 37. The pulse enters the relay network at points R129–1 of the elevator address A relay and since the trolley position relays R101, R118 and R115 are energized and since the trolley address relays R126 and R123 are also energized, a circuit is established through the normally open points R123–1 of the trolley address 1 relay which are now closed and through the relay point network where the pulse is impressed on the 9 bus at points R126–1 of the trolley address 8 relay. From this point, the circuit continues through the normally closed points R104–1 of the trolley position relay R104, through normally closed points R109–1 of the trolley position relay R109, to points R115–1 of the trolley position relay R115 which are now closed, and from thence to the ready line which is jumpered to normally open points R118–1 of the trolley position relay R118 and from thence to the trolley position relay R3 (Fig. 41).

When the trolley position relays R3 and R204 are energized, the following events take place: The points R3BU thereof (Fig. 41) open and thereby drop out the trolley go relay R202. The points R202–1, R202–2 and R202–3 (Fig. 43A) of the trolley go relay R202 are now open such that power to all three phases of the trolley motor is interrupted; in other words, when the trolley go relay R202 is deenergized, it drops a phase directly off the motor and removes a phase from the crossover network (Fig. 43A) consisting of points of the conditioning relays R201 and R203.

A braking force is put on the motor by applying thereto a direct current. Forty-eight volts are transmitted from the terminal T14 (Fig. 43A), through normally closed contacts R40AL, through normally closed contacts R201–1 of the low speed forward relay R201, through normally open contacts R201–1 thereof and through normally closed contacts R203–1 of the backward relay and from thence to the trolley motor; through the trolley motor to normally closed contacts R203–2 of the backward relay, through normally open contacts R201–2 of the low speed forward relay and through normally closed contacts R202–2 of the trolley go relay to ground. This applies 48 volts direct current through the motor windings to ground and thereby provides a faster stopping action. The direct current is held on the motor until relay R37 (Fig. 41) drops out. The relay R37 will drop out when the zero speed switch, which is in the nature of a rotational speed sensing device, opens; this switch being adjusted to open at about 140 r.p.m.

As soon as the relay R37 drops out, the 48 volts applied to the common of point R1AL of the trolley forward relay, by way of the still closed points R3BU of the trolley position relay and through the closed relay points R37AU will energize the trolley go relay R202. Because R204 is energized, partial power through 100 ohm resistors is applied to the trolley motor and starts it into operation.

Energization of the trolley go relay R202 removes the direct current power from the motor with the result that the motor once again begins to drive the trolley. As soon as the motor begins driving, the speed thereof picks up the zero speed switch (Fig. 41) which picks up the relay R37 and drops out the trolley go relay R202. The trolley is now moved into home position by intermittent pulses through the zero speed switch.

The trolley detents are held out by the detent solenoid S401 (Fig. 41) which is energized through normally open points R1BU of the trolley forward relay and normally closed points R3AU of the trolley position relay. When the trolley position relay R3 is energized, the detent solenoid S401 is deenergized by reason of the fact that the points R3AU of the trolley position relay R3 are opened. The trolley detents slide on the rails until they drop into the detent slots. This results in closure of the trolley detent in microswitch MS2 and energization of the trolley detent in relay R6 (Fig. 41). Points R6BL of the trolley detent in relay are now opened. With the trolley in position, the trolley position relay R3 is energized and held by the trolley position microswitch MS9, which is closed by the arrival of the trolley in its intended position. The trolley forward relay R1 is now deenergized. Upon deenergization of the trolley forward relay R1, the energizing circuits of the trolley go relay R202 and the trolley forward relay R201 are broken at points R1AL of the trolley forward relay such that motor action ceases. At this point, the trolley is in position and the elevator through a similar action of switching between alternating and direct current is also in position so that the cartridge slide can go out to pick up a cartridge.

Relay points R204–1 and R204–2 open and cause three phases to pass through the 100 ohm resistors. From this point on, full line voltage is never applied to the motor. This causes a flatter motor acceleration and allows the zero speed switch time delay and thereby prevents sharp fluctuations in motor velocity.

With the elevator and trolley in position, the trolley detent in microswitch MS2 (Fig. 41) and the elevator detent microswitch MS4 (Fig. 42) will be closed with the result that the trolley detent in relay R6 (Fig. 41) and the elevator detent in relay R13 (Fig. 42) will be energized. This results in the opening of the normally closed points R6BU of the trolley detent in relay and the points R13BU (Fig. 43A) of the elevator detent in relay. When this happens, the relay R7 is dropped out which indicates that both the elevator and trolley are in proper position. If either the trolley detent in relay R6 or the elevator detent in relay R13 had not been energized, the relay R7 would remain energized. There is a shorted coil on the relay R7 which stores enough energy to hold the relay up for about 30 milliseconds in the event that either the elevator or the trolley is driven beyond its intended position such that the slide operation is not initiated in case of the failure mentioned.

Since the operation for which the system has been programmed is one in which a cartridge is to be taken from a storage address, a check must be instituted to determine that a cartridge is present at the prescribed location, specifically in storage location 9CR, according to the example supposed. If no cartridge is present, the operation must be terminated. For this purpose, 48 volts are transmitted through the normally open points R11AL (Fig. 44) of the elevator position relay R11, through the normally open points R13AL detent in relay, through the normally open points R3AL of trolley position relay, through normally closed points R5AL of the mechanical error relay, through the normally open points R6AL of the trolley detent in relay and the normally closed points R7BU of the relay R7 (Fig. 43A). This applies power to the cartridge checking control network. Consequently, power is applied to the normally closed points R17BU of the program error relay, the normally closed points R16AL of the program OK relay, and through the normally open but now closed points R147–1 of the right slide relay to the right check solenoid S406. This is a Leadex rotary solenoid which operates the sensing arm 694 of Fig. 5. The sensing arm is swung outwardly with the possibility of closing one of two microswitches. A cartridge in right microswitch MS7 (Fig. 45) when closed provides an indication that a cartridge is present in the storage slot at the right of the elevator and a no cartridge in right microswitch MS8 provides an indication that no cartridge is contained in the storage slot at the right of the elevator. Assuming that a cartridge is in the slot at storage address 9CR, when the sensing arm 694 swings outwardly, the cartridge in right microswitch MS7 will be closed. Therefore, a circuit is established from the 48 volt line (Fig. 45) through the cartridge in right microswitch MS7 to energize the cartridge in right relay R15. A circuit is established from points R35AU (Fig. 44) of the slide complete relay through normally closed points R17AU of the program error relay, through normally closed points R148–3 of the put relay, through normally closed points R20BL of the cartridge on slide A relay, through normally closed points R21BL of the cartridge on slide relay, through normally closed points R146–6 of the slide left relay, through normally open points R15AL of the cartridge in right relay, now closed, through normally open points R157–2 of the right slide relay and through normally open points R149–3 of the take relay to the program OK relay R16.

When the program OK relay R16 is energized, it opens its normally closed points R16AL (Fig. 44) and thereby interrupts the power to the check solenoids. This results in a return of the cartridge sensing arms to their normal position. The program OK relay R16 then holds through its point R16AU. In addition, 48 volts are transmitted through the normally open points R7BU (Fig. 44) and the normally open points R16BU (Fig. 44) of the program OK relay to the check home microswitches MS13 and MS14. These are the switches that are closed when the cartridge sensing arms are in their normal position. Closure of the check home micro-switches MS13 and MS14 results in the application of power to the slide go relay R22. This is the relay that provides an indication that a slide operation is now in order.

Voltage is brought through the closed points R34BU (Fig. 47) of the limit relay, through the normally open points R22AU of the step reset relay, the normally closed points R24AL of the slide operation OK relay, the normally open points R147–3 of the right slide relay, the normally closed points R23AU of the slide right relay and through the normally closed points R19BU of the slide out right relay to pick up the slide go delay R211 as well as the slide go relay R210 which is energized by way of a diode connection.

The slide drive motor (Fig. 43A) is a single phase motor with two windings and the slide go relay R210 conditions a circuit that supplies power to one of the motor windings, while the slide go delay relay R211 conditions a circuit to power the other motor winding. The operation of the slide motor drives the slide out to the right until the position of the slide is recognized by opening of the slide in microswitch MS9 (Fig. 45). This microswitch is closed as long as the slide is more than 3 inches from its home projected position. As a result, 48 volts are transmitted to the right slide out microswitch MS11 which is closed when the slide reaches its extreme limit of travel. Closure of the right slide out microswitch MS11 energizes the slide out right relay R19. When the slide out right relay R19 is energized, it opens its R19BU points (Fig. 47) with the result that the slide go relay R210 and the slide right relay R211 are deenergized, thereby stopping the slide motor whereupon the slide coasts to the slide detent.

Forty-eight volts are taken from the common of points R34BU (Fig. 47) of the limit relay and this voltage is passed through the normally open points R19AU of the slide out right relay to the pick coil of the slide out relay R23 by way of a 200 ohm resistor and a 300 mfd. condenser in parallel. The large condenser permits the system to settle after it has come up, and also permits reversing of the single phase motor which cannot be done in flight.

When the pick coil of the slide right relay R23 is energized through the resistance-capacitance action, the slide motor will be reversed. With the slide right relay R23 energized, 48 volts are conducted through the points R34BU of the limit relay, through the normally open points R22AU of the slide go relay, through the normally closed points R24AL of the slide operation OK relay, through the normally open points R147–3 of the right slide relay, through the normally open points R23AU of the slide right relay, through the normally open points R25BU of the slide not in relay which are now closed by reason of operation of the slide in microswitch MS9, and through the normally closed points R18BU of the slide out left relay to energize the slide left relay R209. At the same time, the slide go relay R210 is energized by way of the diode connection. This conditions the circuits for operation of the cartridge slide to the left which carries the slide back to its home position on the elevator chassis. The left movement of the slide continues until the slide in microswitch MS9 is operated and drops out the slide not in relay R25. Since the contacts R23AU (Fig. 47) of the slide right relay are transferred and the slide not in relay R25 is dropped out, power to the motor system is cut when the slide is about 3 inches from the home position, from which point the motor coasts until the slide center microswitch MS15 (Fig. 45) is closed. Now 48 volts are transmitted through the closed slide center microswitch MS15, through the normally closed contact R5BU of the mechanical error relay, through contacts R34AU (Fig. 41) of the limit relay to pick up the relay R36.

Forty-eight volts direct current are brought from the terminal T14 (Fig. 43A) through a 25 ohm potentiometer, through normally open points R36AU, through normally open points R22AL of the slide go relay, through normally closed points R210–1 of the slide go relay which are closed by reason of the slide go relay R210 being deenergized when the slide was within 3 inches of its home position, through the R209–1 common point of the slide left relay, through point R211–1 of the slide go delay relay and through the motor to the normally closed points R211–2, to the common of points R209–2 of the slide left relay and through normally closed points R210–2 of the slide go relay go ground. The direct current so applied brakes the slide motor and stops it in the home position.

Forty-eight volts are also conducted through the slide complete microswitch MS15 (Fig. 46), through normally closed points R27AU of the stop delay relay, through normally open points R23AL of the slide right relay, now closed, to energize the slide complete relay R35. A circuit extends between points R27AU (Fig. 46) of the step delay relay and points R35BU of the slide complete relay along which a pulse is conducted to normally open points R149–4 of the take relay, normally open points R20BU of the cartridge on slide A relay and normally open points R21BU of the cartridge on slide relay, from where it is jumpered to the pick coil of the slide operation OK relay R24 which is thereby energized. By this time, the cartridge on slide microswitch MS12 (Fig. 45) is closed, such that voltage is conducted therethrough to energize the cartridge on slide relay R21. Also, by way of the cartridge on slide A microswitch MS24, which is also closed, energizing power is delivered to the cartridge on slide A relay R20.

The first address and the first operational instruction have now been executed; that is to say, the trolley and the elevator have been driven to the storage address 9CR and the cartridge slide has been operated to engage a cartridge in the storage compartment and shifted the same from the compartment to the elevator. A new set of instructions must now be made available for the execution of the balance of the operation. The operations that are to follow will be under control of Step 2 of the control panel, which, as stated, is wired to perform a put operation which will result in the delivery of the carriage to position 2AL (forward position 2, upper elevation with movement to the left).

It was previously explained in respect to the control panel of Fig. 35 that the necessary relays for the execution of the second half of the operation have been wired. All that remains, therefore, is to step the program step relay such that the second level of program step hubs are energized with the resultant energization of the relays wired thereto.

Since the slide operation OK relay R24 is energized and its points R24AU (Fig. 36) are transferred, the circuit to the normally closed point R32BU of the step reset relay is broken. This results in the denergization of all relays that were previously picked in sequence. Power is transmitted to the normally open points R24AU (Fig. 36) of the slide operation OK relay, then through normally closed points R33AU of the stop relay and from thence to normally closed points R154–1 (Fig. 38) of the manual relay.

From the normally closed point R154–1 of the manual relay a circuit is continued through normally closed point R31BU of the reset relay to pick up program step solenoid S407. Power is also taken from the normally closed points R154–1 of the manual relay to energize the pick coil step delay relay R27. The step delay relay R27 is held to allow a full pulse to reach the program step solenoid S407. After a step delay relay R27 is energized, flow of power to the slide operation OK relay R24 (Fig. 46) is interrupted. The energizing circuit for the slide operation OK relay R24 is brought back through its normally open points R24BU (Fig. 46), through the normally closed but now open points R27AU of the step delay relay. From the 48 volt source current is conducted through the normally open but now closed points R29AL (Fig. 36) of the start relay, through the normally closed points R24AU of the slide operation OK relay, through the normally closed points R32BU of the step reset relay and through the normally closed points R154–1 of the manual relay to the step relay common (Fig. 38), thereby picking the program relay R132; it being remembered that the step solenoid S407 has advanced the program relay connection to the second step. Energization of the program relay R132 results in closure of the points thereof in the circuit of Fig. 40, such that the Step 2 program step hubs of Fig. 35 are energized. Subsequent operation will now be according to the wiring of Step 2 of the program.

Since Step 2 of the control panel has been wired for operation, as previously described, the trolley address relays R123 and R124 are energized, the elevator address relay R129 is energized, the cartridge slide control slide relay R146 is energized, and the put function relay R148 is energized.

At the outset of program Step 2, it is necessary, as it was at the outset of program Step 1, to condition the control circuits in accordance with the present position of the trolley and elevator. Consequently, since the trolley is now in the 9th position and the elevator is in position C, the present position circuits will be conditioned by closure of the trolley position microswitch TMS9 (Fig. 36) and the closure of elevator position microswitch MSC. Power coming through normally closed points R32BU (Fig. 36) of the step reset relay and through the trolley position microswitch TMS9, which is now closed, by way of the two diode lines connected to trolley position microswitch TMS9, will energize trolley position relays R101, R118 and R115. Trolley position relays R101 and R118, being the binary coded relays 8 and 1 respectively, will indicate when so energized, that the carriage is in position 9. Also, coming from points R32BU of the step reset relay, by way of the elevator position microswitch MSC and through the two diodes connected thereto, elevator position relays R120 and R121 are energized to provide an indication that the elevator is in position C.

Also extending from the closed points R32BU of the step reset relay and normally open points R26AU of the control delay relay is a circuit to the normally open point R29–1 of the analyzing network of Fig. 36. A pulse is transmitted through normally open points R129–1 of elevator position A relay, through normally closed points R130–1 of the elevator position B relay to the normally open points R120–2 of the elevator position relay R120, through normally open points R121–3 of the elevator position relay R121 to the elevator up relay R8 (Fig. 42). Also, in parallel from the common of relay point R129–1, the circuit is continued to the common of points R123–1 (Fig. 37) of the trolley address 1 relay, through the normally open side of points R123–1, through the normally open point R124–1 of the trolley address 2 relay, through the normally closed points R125–1 of the trolley address 4 relay and through the normally closed points R126–2 of the trolley address 8 relay, and to the bus 3. The bus 3 is connected to the common of point R101–7 of the trolley position relay from which the circuit proceeds by way of its open side to normally closed points R107–1 of the trolley position relay R107, and to normally closed points R112–5 of the trolley position relay R112 from which it is jumpered to the trolley backward relay R2 (Fig. 41); the signal output of the network of Fig. 37 being the signal Trolley Reverse. The foregoing controls establish the direction in which the trolley and elevator must move to deliver the cartridge at position 2A.

Upon arriving in position 3A, the delivery location must be checked to see if the location is in condition for receiving the cartridge. Upon arriving at position 3A relay R7 (Fig. 43A) is deenergized. Forty-eight volts are transmitted through normally open relay points R11AL, R13AL, R3AL, R5AL, R4AL and normally closed point R7BU (Fig. 44). This energizes the cartridge checking network. Power is transmitted through normally closed points R17BU of the program error relay, the R16AL points of the program OK relay and through the now closed point R136–1 of the program step relay to energize the left check solenoid S405. Power is transmitted from the 48 volt source by way of the no cartridge in left microswitch MS5 (Fig. 45) to energize the no cartridge in left relay R41. Power is taken from normally closed points R17BU (Fig. 44) of the program error relay, through points R35AU of the slide complete relay, normally closed, through normally closed points R17AU of the program error relay, through normally open points R148–3 of the put relay, through normally open points R156–1, through now closed points R41AL of the no cartridge in left relay, through normally closed points R157–1 of the right slide relay, through normally open points R20BL of the cartridge on slide A relay, through normally open points R21BL of the cartridge on slide relay and through normally closed points R149–3 of the take relay to energize the program OK relay R16.

Power is transmitted through normally open points R16BU (Fig. 45) of the program OK relay, through the check home microswitches MS13 and MS14 to energize the pick coil of the cartridge on slide A relay R22. The cartridge on slide A relay R22 picks slowly to allow the sensing arms of the checking solenoid to return to their normal home position.

Forty-eight volts are taken through normally open points R34BU (Fig. 47) of the limit relay, through now closed points R22AU of the slide go relay, through normally closed points R24AL of the slide operation OK relay, through normally open points R146–3 of the slide left relay, through the normally closed side of points R23BU of the slide right relay, and through the normally closed points R18BU of the slide out left relay to energize the slide left relay R209. This pulse is also taken through a diode connection to energize the slide go relay R210. Power is now delivered to the slide motor which, as seen in Fig. 43A, has two coils. The slide motor is energized from terminal T7 (Fig. 43A) by way of the transferred points R210–1 of the slide go relay and from thence through one coil of the motor and back through normally closed points R210–2 of the slide go relay to ground.

Also in parallel, from the common of points R210–1 of the slide go relay, there is an established circuit through normally open points R209–1 of the slide left relay, to normally closed points R211–1 of the slide go delay relay, through the second coil of the slide motor and back to the normally closed points R211–2 and through normally open points R209–2 of the slide left relay and to ground via normally closed points R210–2 of the slide go relay.

The slide motor continues to drive the cartridge slide to the left, until the left slide out microswitch MS10 (Fig. 45) operates and cuts the power to the motor. A circuit is established from the 48 volt source through the slide in microswitch MS9, through the left slide out microswitch MS10 (now closed) and energizes the slide out left relay R18. When the slide out left relay R18 is energized, it opens its contacts R18BU. Since these points are in the circuit of the slide left relay R209 and the slide go relay R210 (Fig. 47), these relays are deenergized when the points R18BU of the slide out left relay are open. This effectively cuts the power to the slide motor and allows the cartridge slide to coast to its detent position.

Coming off the 48 volt line by way of the common of points R34BU (Fig. 47) of the limit relay, and by way of points R19AU (Fig. 47) of the slide out left relay, normally open, is a circuit which energizes the pick coil of the slide right relay R23. This circuit is established by way of the 200 ohm resistor and the 300 m.f.d. condenser in parallel, the reason for which has previously been explained. When the slide right relay R23 is energized, the slide motor is reversed as follows: Power is taken through points R34BU of the limit relay, through the normally open point R22AU of the slide go relay, through the normally closed points R24AL of the slide operation OK relay, through the normally open point R146–3, through the normally open points R23BU of the slide right relay, through the normally open points R25AU of the slide not in relay, and through the normally closed points R19BU of the slide out right relay, such that the slide go delay relay R11 is energized as well as the slide go relay R10 which is connected in parallel by way of the diode circuit.

The slide not in relay R25 (Fig. 45) is deenergized by operation of the slide in microswitch MS9. Therefore, the R25AU points thereof (Fig. 47) are opened to their normal position such that the circuit to the slide go delay relay R211 and the slide go relay R210 are broken. At this point, the slide motor will merely coast.

The coasting of the slide motor will continue until the slide complete microswitch MS15 (Fig. 46) is closed at which time 48 volts pass therethrough and through the normally closed points R5BU of the mechanical error relay, to the common of points R34BU of the limit relay (Fig. 41), such that the slide backward relay R36 is energized.

Forty-eight volts direct current are now carried through the 250 ohm potentiometer (Fig. 43A), through the now closed points R36AU of the backward relay, through the now closed points R22AL of the slide go relay R22, and through the normally closed points R210–1 of the slide go relay R210 and one coil of the slide motor through which it passes back through normally closed points R210–2 to ground. This direct current voltage stops the motor when the slide complete microswitch MS15 is closed. At this point the cartridge sensing arm 692 (Fig. 35) will be swung out to determine that the cartridge has been, in fact, deposited in position 2A.

When the slide reach center position MS15 makes, power is transmitted through the now closed slide complete microswitch MS15 (Fig. 46), through the normally closed point R27AU of the step delay relay, through the normally open but now closed point R23AL of the reverse delay relay to pick up the slide complete relay R35.

Power is taken from the normally closed points R7BU (Fig. 44) and is transmitted through the normally open point R35AU of the slide complete relay, through the now closed point R146–1 of the left slide relay to energize the left check solenoid S405. This swings the cartridge sensing arms into cartridge checking position. Voltage on the 48 volt line is taken through the now closed cartridge in left microswitch MS6 (Fig. 45) to energize the cartridge in left relay R10.

Power is taken from the common of point R27AU (Fig. 46) of the step delay relay and is transmitted to the normally open point R35BU of the slide complete relay, which is now closed, and from thence to the now closed but normally open points R148-4 of the put relay, through normally open point R146-3 of the left slide relay, through the now transferred points R10AU of the cartridge in left relay from which it is jumpered to the slide operation OK relay R24.

In the foregoing description, it was demonstrated how the cartridge sensing arms operate when conditions are normal and as expected. Operation of the right cartridge sensing arm at storage position 9CR detected a cartridge in said position as anticipated by the instructions. Had no cartridge been present in storage location 9CR, there would have been an abnormal condition. By the same token, when the left cartridge sensing arms probed position 2A after deposit of the cartridge therein, it found that position to contain the just deposited cartridge. In this case, the absence of a cartridge at delivery position 2A would have been an abnormal condition. The circuit functions upon discovery of these two abnormal conditions can be described as follows: Had the cartridge sensing arm failed to find a cartridge in storage position 9CR, the no cartridge in right microswitch MS8 (Fig. 45) would have closed and an energizing voltage would have been transmitted therethrough to energize the no cartridge in right relay R30. As a result thereof, power coming from the common of points R17AU (Fig. 44) of the program error relay is conducted through the normally closed R16BL points of the program OK relay, through now closed points R30BU of the no cartridge in right relay, through normally open points R147-2 of the right slide relay, through normally open point R149-2 of the take relay and from thence to the program error relay R17 which is energized to indicate a program error. The program error relay R17 now holds through its normally open points R17AU. A signal is now produced at the control panel which can be utilized to stop the operation or otherwise control progress of the program.

In case the left check solenoid swings the sensing arms out and determines that position 2A is empty and that the cartridge, therefore was not deposited at position 2A, as intended, voltage is passed through the no cartridge in left microswitch MS5 (Fig. 45) to energize the no cartridge in left relay R41. It is to be remembered that this operation takes place after the cartridge slide has operated. Therefore, power at the common of points R27AU (Fig. 46) of the step delay relay is transmitted through the normally open points R35BU of the slide complete relay, through the normally open points R148-4 of the put relay, through the normally open points R146-3 of the left slide relay, and from thence through the now closed but normally open points R41AU of the no cartridge in left relay from which points the voltage is jumpered to the mechanical error relay R5. This relay provides an indication of mechanical malfunction and effectively prevents further operation until the abnormal condition is corrected.

*Cartridge mounting controls*

Operation of the automatic loader and the automatic cartridge handler must be so coordinated that the elements of the respective units do not mechanically interfere with each other as they are operated. Consequently, the system is designed such that the loading mechanism associated with the tape transport is constantly advised of the operation and position of the cartridge handling mechanism associated with the storage unit and appropriate interlocking circuits are provided which prevent the cartridge loading mechanism associated with the tape transport unit from operating when the cartridge handling mechanism associated with the storage unit is operating in such proximity to the tape transport unit as to lead to possible mechanical interference between the two. Signals are also generated during operation of the cartridge loader which suppress operation of the cartridge handler in the area of cartridge loader operation when otherwise danger of mechanical interference might exist.

Figure 48:
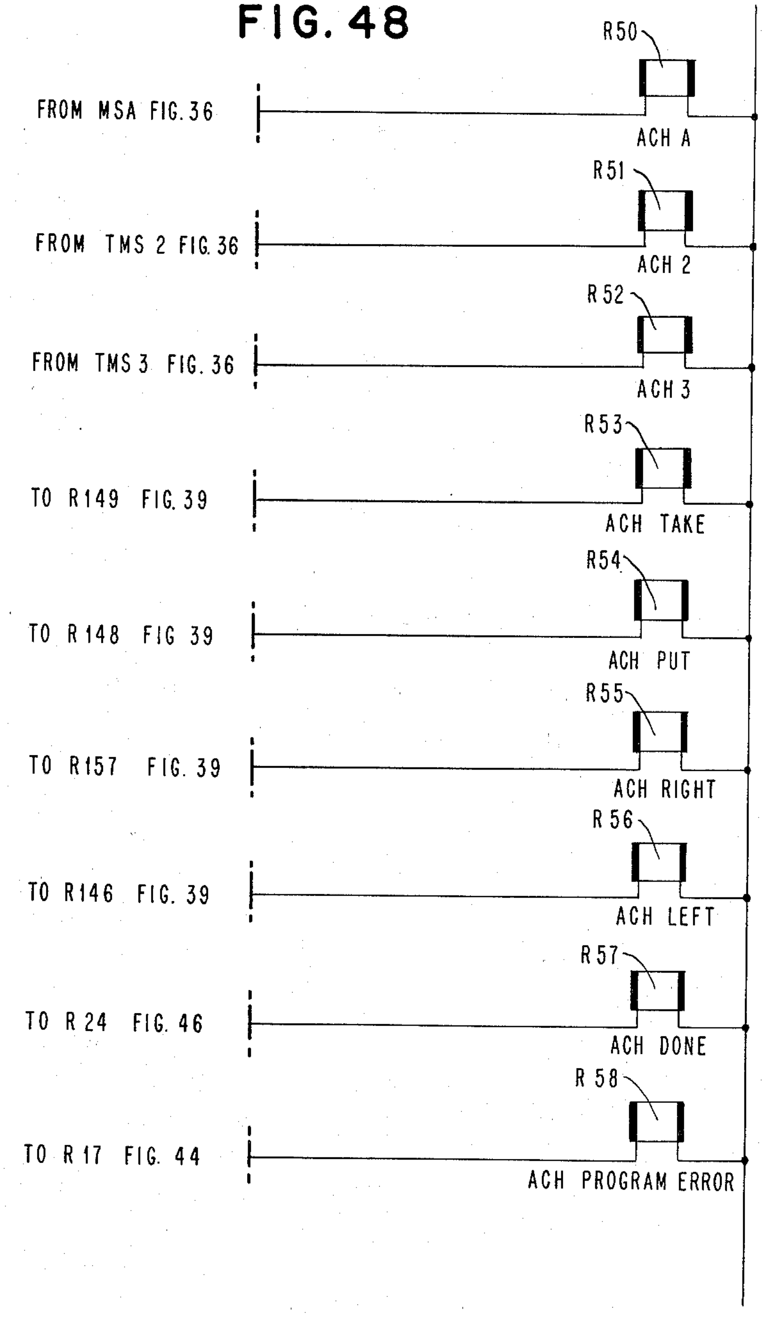

Fig. 48 discloses a plurality of relays which indicate to the automatic loader the operation and the position of the automatic cartridge handler. An automatic cartridge handler in A level relay R50 is energized when the automatic cartridge handler is operating in the top or A level. An automatic cartridge handler in position 2 relay is energized whenever the automatic cartridge handler is operating in the second slot of the cartridge handler. When the relays R50 and R51 are simultaneously energized there is provided an indication that the automatic cartridge handler is operating in the vicinity of the load slot of the automatic loader.

The automatic cartridge handler in slot 3 relay R52 is energized whenever the cartridge handling mechanism associated with the storage unit is operating in slot 3. Therefore, when relays R52 and R50 are simultaneously energized there is an indication that the automatic cartridge handler is operating in the vicinity of the discharge slot of the automatic loader.

When the cartridge handling mechanism is instructed to take a cartridge, the automatic cartridge handler take relay R53 is energized and the same result flows in respect to the automatic cartridge handler put relay R54 whenever the automatic cartridge handler mechanism is instructed to put a cartridge. Since all of the above-identified relays must function, whether the tape transport unit is located at the right or at the left of the storage module, the automatic cartridge handler right relay R55 and the automatic cartridge left relay R56 have been provided, and one or the other is selected to gate the pulses in accordance with the position of the tape transport unit in respect to the storage unit. Inasmuch as the system has been described herein as having the tape transport unit at the left of the storage unit (as viewed from the front), the automatic cartridge handler left relay R56 is utilized as a gating instrument in the illustrated embodiment.

An automatic cartridge handler done relay R57 is energized whenever the automatic cartridge handler has performed an operation in any of the areas in which physical interference might occur and has performed such operation correctly and completely. An automatic cartridge handler program error relay R58 is energized whenever the cartridge handler has been incorrectly programmed to perform an operation and the operation has, therefore, been terminated upon discovery of the program error.

Figure 49:
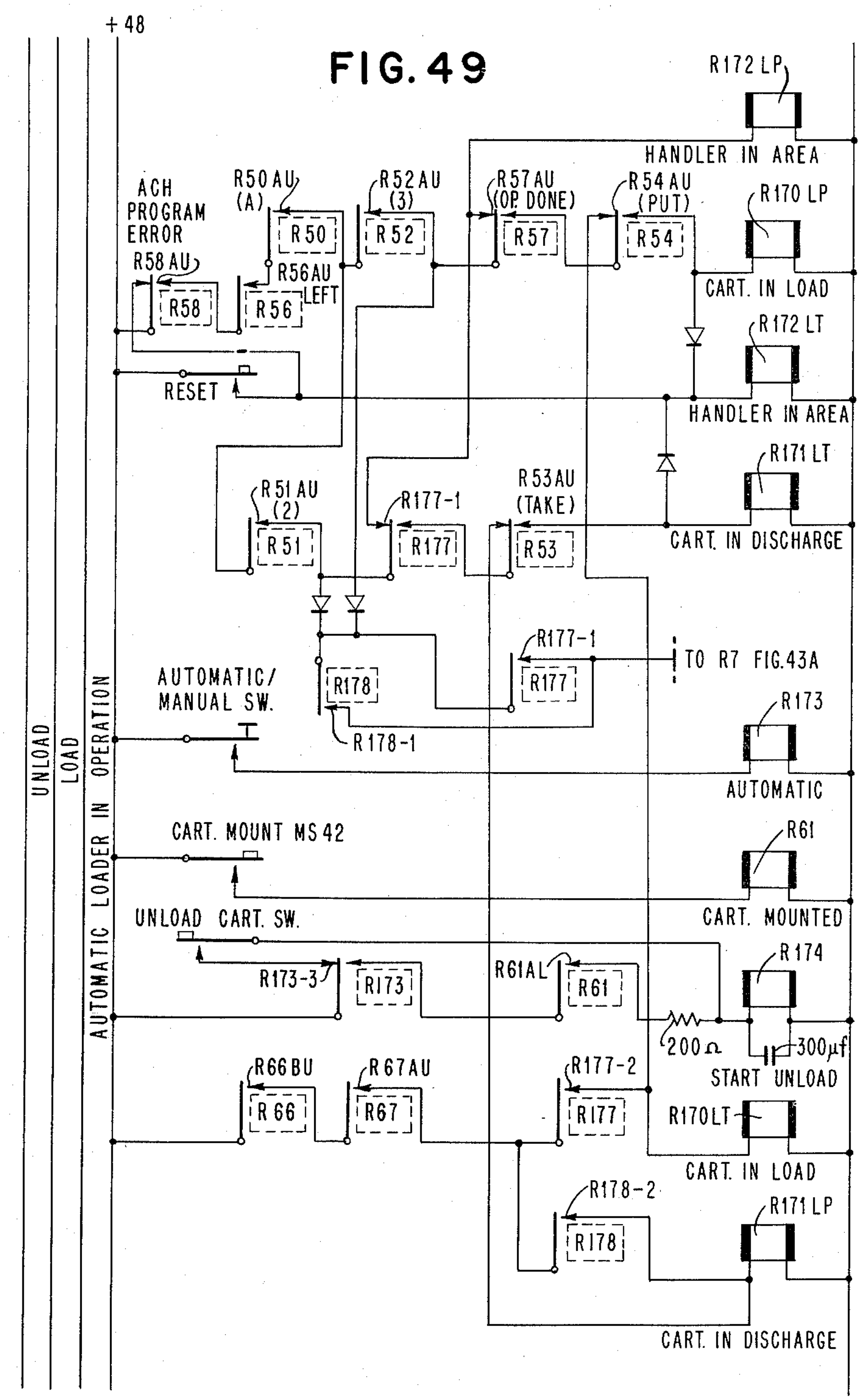

Circuits of Fig. 49 provide the necessary communication from the automatic loader to the automatic cartridge handler to inform the automatic cartridge handler that the automatic loader is operating in its discharge or delivery position, and that the automatic cartridge handler may, therefore, not operate in these same areas. In Fig. 49, for example, power may be taken from a 48 volt line through the normally closed R58AU points of the automatic cartridge handler program error relay, through the normally open but now closed R56AU points of the automatic cartridge handler left relay R56, through the normally open but now closed R50AU points of the automatic cartridge handler in A level relay, through the normally open but now closed R52AU points of the automatic handler 3 slot relay and through the R177-1 points of the load relay. This circuit will be closed whenever the automatic loader is loading a cartridge and the automatic cartridge handler is in the area. The pulse passing through relay points R177-1 is transmitted to energize the relay R7 in the circuits of Fig. 43A. Energization of the relay R7 suppresses operation of the cartridge handling slide on the elevator structure.

The circuits of Figs. 48 through 52 are those which control the manipulation of the tape reel cartridges by the automatic loading and unloading equipment associated with the tape transport units. Let it be assumed that the automatic cartridge handler has just deposited a tape reel cartridge in position 3A to the left. In order for the automatic loading system to operate properly, it must retain memory of whether cartridges are in the delivery, discharge and mount position of the automatic loading system. In order to do this, latch pick relays are used to remember the position of the cartridges as they are being manipulated into and out of processing position.

When the automatic cartridge handler delivers a tape reel cartridge to position 3A left, the following circuit is energized. Voltage from the 48 volt line (Fig. 49) is passed through the normally closed program error relay points R58AU to the now closed R56AU points of the automatic cartridge handler left relay, through the now closed R50AU points of the automatic cartridge handler A level relay, through the now closed R52AU points of the automatic cartridge handler 3 slot relay to the normally closed R57AU points of the operation done relay thereby energizing the handler in area latch pick relay R172LP. After the automatic cartridge handler has completed its operation, voltage is passed through the program error relay points R58AU, through the automatic cartridge handler A level relay points R50AU, through the automatic cartridge handler 3 slot relay points R52AU, through the now transferred R57AU points of the operation done relay, through the now closed R54AU points of the put relay to energize the cartridge in load position latch pick relay R170LP. At the same time, by way of a diode connection, energizing current is transmitted to the handler in area latch trip relay R172LT. Tripping of the handler in area relay R172LT provides an indication to the automatic loading system that it can now safely pick up a cartridge in the load position. The latch picking of the cartridge in load position latch pick relay R170LP is an indication to the loading system that there is a cartridge in the load slot of the cartridge handler. When the auto/manual switch is closed (Fig. 49), the automatic relay R173 conditions the system for a program of automatic operations. Therefore, with this switch closed, a cartridge delivered to position 3A left will be taken from the delivery position and will be mounted on the tape reels and then, after processing, it will be discharged to the discharge position of the automatic cartridge handler. In the following description, it will be assumed that the auto/manual switch is closed and the system will, therefore, automatically perform a complete cartridge handling cycle.

Figure 52:
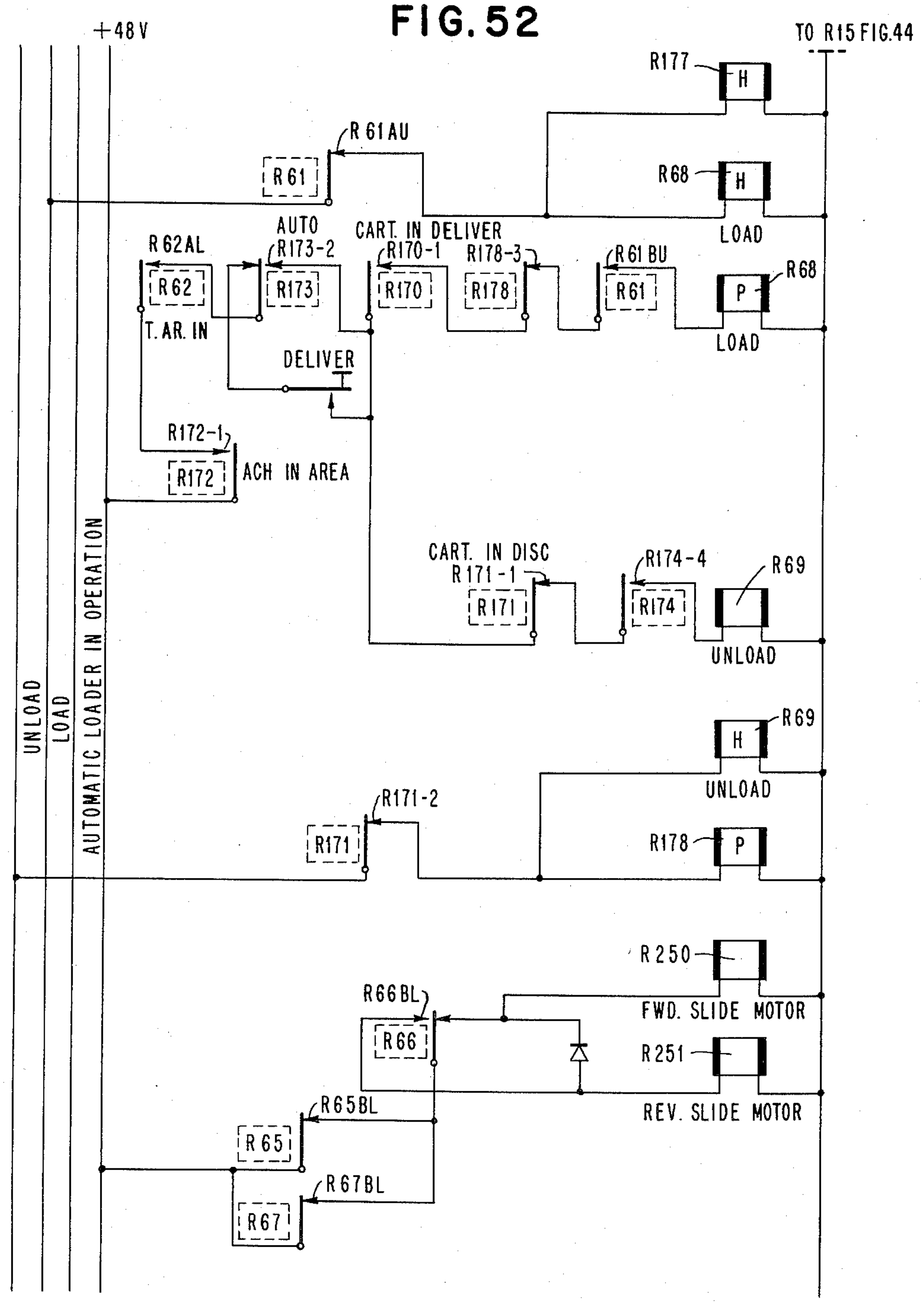

In Fig. 52, the 48 volts delivered to the R172–1 points of the automatic cartridge handler in area relay are passed through the R62AL points of the tape unit arms in relay, through the transferred points R173–2 of the automatic relay, through the now closed R170–1 points of the cartridge in load position relay, through the normally closed points R178–3 and R61BU to energize the load relay R68. The load relay R68 is held up through its own R68BU points.

Power is now transmitted through the normally open but now closed R68BU points (Fig. 51) to energize the load bus from which current is transmitted through the R61AU points of the cartridge mount relay (Fig. 52). This effectively energizes the load relays R177 and R68 which are connected in parallel. Energization of the load relay R68 will cause its R68BU points (Fig. 51) to close thus transmitting power to the tape slide go relay R64. Power is now transmitted from the 48 volt source through the normally closed R65BL points (Fig. 52) of the slide out relay, through the now closed R64BL points of the tape slide go relay and through the normally closed R66BL points of the tape slide home relay to energize the forward slide motor relay R250. This operation places power on the slide motor which drives the slide outwardly. In this connection, it should be noted that the motor circuits for controlling the slide motor associated with the tape transport mechanism are the same as the circuits associated with the slide motor carried by the elevator structure. The slide motor continues to operate until the slide out microswitch MS34 (Fig. 51) is closed. When the slide out microswitch MS34 is closed, power is transmitted from the automatic loader in operation bus through the slide out microswitch MS34 to energize the slide out relay R65. The slide out relay R65 is then held up through its own R65BU points.

Figure 51:
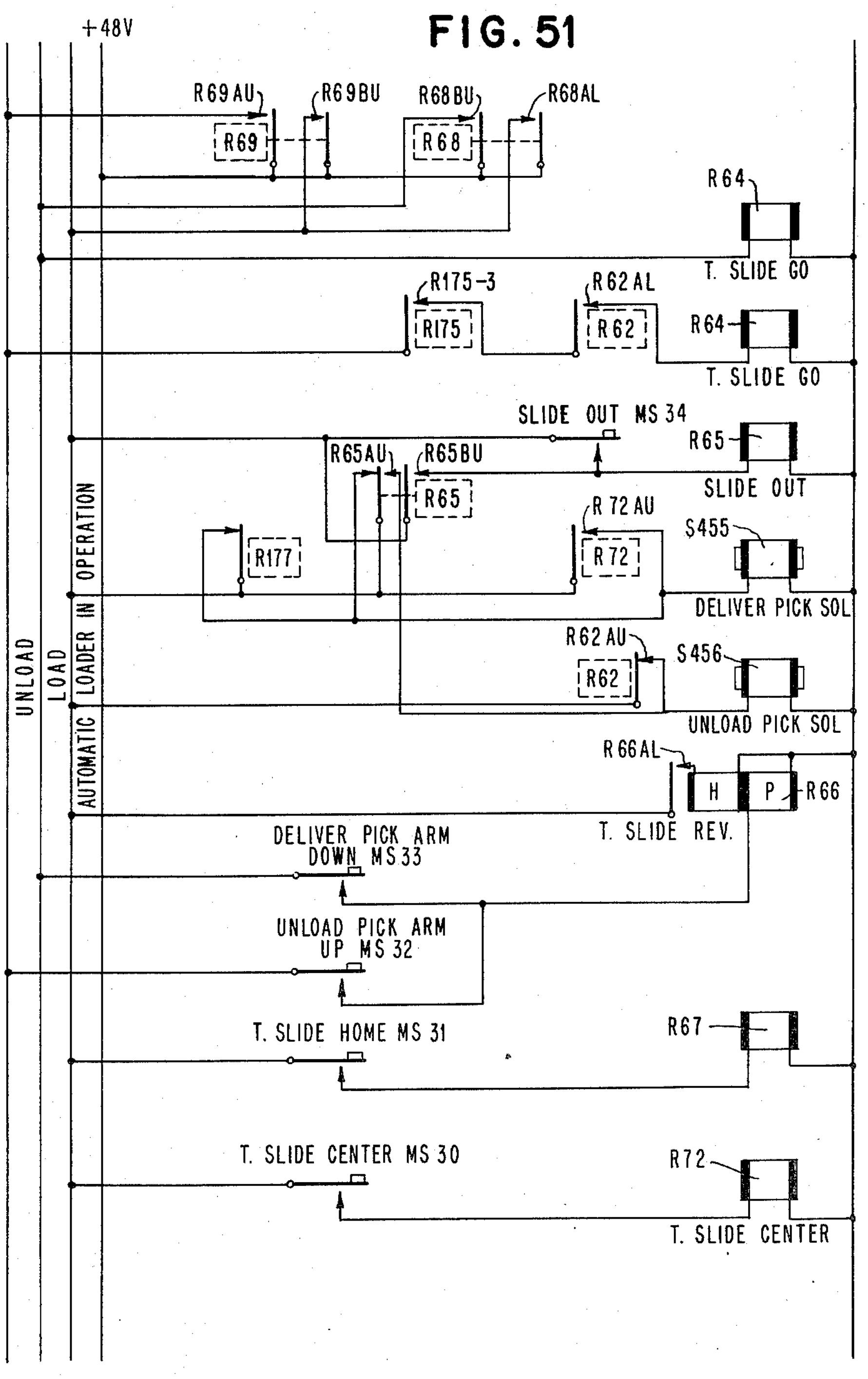

At this point, the deliver pick solenoid S455 must be deenergized in order to drop the cartridge engaging finger into engagement with the cartridge slot. In Fig. 51, there is a normally closed circuit from the automatic loader in operation bus through the R65AU points of the slide out relay which maintains the deliver pick solenoid S455 energized. Therefore, when the slide out relay R65 is energized, its normally closed R65AU points are opened, with the result that the circuit to the deliver pick solenoid S455 is broken. Deenergization of the deliver pick solenoid S455 permits the cartridge handling finger to drop and engage the slot in the cartridge. As the cartridge engaging finger drops into cartridge engaging position, it operates the deliver pick arm down microswitch MS33 (Fig. 51) thus permitting flow of current from the 48 volt line through the normally open but now closed R68BU points (Fig. 51) to the load bus and through the deliver pick arm down microswitch MS33 to energize the tape slide reverse relay R66. When this relay is energized, voltage is transmitted from the 48 volt source (Fig. 52) through the closed R65BL points of the slide out relay, through the normally open but now closed R64BL points of the slide go relay and through the now transferred points R66BL of the tape slide reverse relay to energize the reverse slide motor relay R251. The diode connection between the R66BL point and the forward slide motor relay R250 will also transmit current to energize the forward slide motor relay. Energization of both the forward slide motor relay R250 and the reverse slide motor relay R251 supplies alternating current to the slide motor and returns it to its home position. The slide continues toward its home position until the tape slide home microswitch MS31 (Fig. 51) is closed, whereupon power is conducted from the automatic loader in operation bus through the now closed tape slide home microswitch MS31 and to the tape slide home relay R67. When the tape slide home relay R67 is energized it opens its R67BL points (Fig. 52) which interrupt the circuit to the forward slide and the reverse slide motor relays R250 and R251, the R65BL points in the same circuit having been opened when the slide out relay R65 was energized. The slide continues to coast until the tape slide center microswitch MS30 (Fig. 51) is closed thereby connecting the tape slide center relay R72 to the automatic loader in operation bus. The tape slide center relay R72 imposes direct current on the motor and brings it to a complete stop.

The arrival of the slide in its center position also closes a circuit to reenergize the deliver pick solenoid S455, which withdraws the cartridge engaging finger from the cartridge slot. In Fig. 51, it can be seen that power may flow from the automatic loader in operation bus through the now closed R72AU points of the tape slide center relay to reenergize the deliver pick solenoid S455.

The foregoing operation has resulted in the extension of the slide, the engagement of a cartridge thereby and the transfer of the cartridge to the loading track at the face panel of the tape transport unit. With the cartridge so positioned, the cartridge handling arms may now be projected to pick up the cartridge and mount it on the tape drive hubs. At this point, power is taken from the load bus (Fig. 50) and passed through the now closed R65AL points of the slide out relay, through now closed R67AU points of the tape slide home relay, through the normally open but now closed points R173–1 of the automatic relay thereby energizing the cartridge mount relay R59. The relay R59 is held through its own R59AU points by way of the now closed R173–4 points of the automatic relay and the normally closed R69AL points of the unload relay.

When energized, the cartridge mount relay R59 opens its normally closed R59BL points (Fig. 50) thereby interrupting the flow of current to the up control relay R63. When the up control relay R63 is deenergized, it results in movement of the tape cartridge arms to their lower position. The circuit for effecting this operation extends from the automatic loader in operation bus (Fig. 50) through the now transferred R63AU points, through the normally closed R70BU points of the tape unit arms down relay and to the down solenoid S453. This solenoid is in the pneumatic system and controls the fluid pressure piston connected with the cartridge arm toggles. When the tape cartridge arms are in their lowered position, they close the tape unit arm down microswitch MS37 (Fig. 50) which results in the energization of the tape unit arm down solenoid R70. This results in the opening of the R70BU points of the tape unit down relay. The tape unit arms can now be driven outwardly under control of a circuit established from the 48 volt line, by way of the 59BU contacts (Fig. 50) of the cartridge mount solenoid, the normally closed R60AU points of the tape unit arms up cycle relay and through the now closed R70BL points of the tape unit arms down relay to energize the out solenoid S450.

In the meanwhile, the load detent solenoid S454 is energized from the load bus, therefore, the tape unit arms continue to move outwardly until the arms are stopped by the load detent solenoid S454 at which time the out mount microswitch MS41 is closed. Power is now transmitted from the load bus through the now closed out mount miscroswitch MS41 to energize the out mount relay R174. The out mount relay is held up through its own now closed R174 points.

Power is now transmitted from the 48 volt line to the normally open R59BL points of the cartridge mount relay to the now closed R174–1 points of the out mount relay through the normally closed R175–1 points of the out demount relay to energize the up control relay R63. At this time a circuit is completed from the automatic loader inoperation bus through the normally open R63AU points of the up control relay to the normally closed R71AU points of the tape unit arms up relay to energize the up solenoid S453. The up solenoid S453 is in the pneumatic system and controls the piston to tilt the tape unit arms upwardly. The arms are, therefore, driven up under the cartridge to engage the cartridge studs and lift the cartridge off the loading track. As soon as the cartridge is in its elevated position, the cartridge up microswitches **MS38*a* and MS38*b* (Fig. 50) are closed thereby establishing a circuit from the 48 volt line through cartridge up miscroswitches MS38*a* and MS38*b* and through the normally closed R70AU points of the tape unit arms down relay to energize the tape unit arms up cycle relay R60. Simultaneously, the tape unit arms up microswitch MS36 (Fig. 50) is closed thereby establishing an energizing circuit between the +48 volt line and the tape unit arms up relay R71. When the tape unit arms up relay R71 is energized it opens its normally closed R71AU points thereby interrupting the power to the up solenoid S452**.

The tape unit arms are now operated in the following manner. A circuit is completed from the automatic loader in operation bus to the now transferred R59BU points of the cartridge mount relay, through the transferred R60AU points of the tape unit arms up cycle relay which has just been energized and through the normally closed R62BU points of the tape unit arms in relay to energize the in solenoid S451. This solenoid is in the pneumatic control system and its operation permits the tape unit arms to continue to drive in until the tape unit arms in microswitch MS35 (Fig. 50) are closed. Upon closure of the tape unit arms in microswitch MS35 power is transmitted from the 48 volt line to energize the tape unit arms in relay R62. As a result of the energization of the tape unit arms R62 relay, its normally, closed R62BU points in the power circuit of the in solenoid S451 (Fig. 50) are opened and the flow of power to the solenoid will be interrupted.

When the tape reel cartridge is mounted on the reel hubs of the tape transport unit a cartridge mounted microswitch MS42 (Fig. 49) will close thereby completing the circuit between the 48 volt line and a cartridge mounted relay R61. Operation of the cartridge mounted relay R61 results in the opening of its normally closed R61AU points (Fig. 52) such that the flow of power to the load relays R68 and R177 is interrupted. This has the effect of terminating the load operation. In recapitulation, it may be pointed out that the automatic loader has taken the reel cartridge from the automatic cartridge handler and has mounted it on the tape reel drive of the tape transport unit. The operation will now continue to effect the loading of tape into the vacuum columns of the tape transport unit and the processing of the tape in normal course, whereafter the cartridge must be removed from the reel drive spindles of the tape transport unit and must be moved forward into position where it can be retrieved by the automatic tape handler.

It remains to be seen, therefore, how a tape reel cartridge is removed from the tape drive spindles and how it is moved forward to the retrieving track of the tape transport unit such that the automatic cartridge handler can engage the cartridge for transport back to a storage location. However, before this operation can begin, there are a number of conditions which must be fulfilled. In the first place, the automatic cartridge handler cannot be permitted to operate in a discharge or load slot, otherwise mechanical interference might result. In the second place, it must be ascertained that a cartridge is mounted on the tape drive, and finally that the discharge track associated with the tape transport unit is empty and, therefore, conditioned to receive a cartridge to be discharged. Since the automatic loader is operating in the automatic mode, the automatic relay R173 (Fig. 49) is energized by current from the 48 volt line which passes through the auto/manual switch. Heretofore it has been explained how the handler in area relay R172LP (Fig. 49) is energized if the automatic cartridge handler is in the area of the automatic cartridge loader. It may be assumed, therefort, that the handler in area relay R172 is released thereby indicating that the cartridge handler is not in the area. It will be further assumed that the cartridge in discharge relay R171LT has been released thereby indicating that the discharge track associated with the tape transport unit does not at this time have a cartridge thereon. The cartridge in discharge latch trip relay R171LT is tripped by a pulse from the 48 volt line (Fig. 49) by way of the program error relay points R58AU, the now closed left relay points R56AU, the now closed points R50AU of the A slot relay, the now closed R51AU points of the 2 slot relay, the transferred R57BU points of the operation done relay and the transferred points R53AU of the take relay. A diode connection will also trip the handler in area latch trip relay R172LT, indicating that the cartridge handler is no longer in the area. Since the cartridge mounted relay R61 is energized, the three conditions precedent necessary to the unloading cycle are satisfied, i.e., it is ascertained that the cartridge handler is not in the area in which the loader must operate, there is no cartridge on the retrieving track of the cartridge loader and there is a cartridge mounted on the spindles of the tape transport unit which is to be removed.

In the circuits of Fig. 49 the unloading operation is initiated by voltage from the 48 volt line which passes through the R172–3 points of the automatic relay which points are now transferred and through the R61AL points, now closed, of the cartridge mounted relay and by way of a 200 ohm, 2-watt resistor to the start unload relay R174 which is connected in parallel with a 300 m.f.d. condenser which provides a short time lapse before the unloading operation begins. By reference to Fig. 52, it will be seen that a circuit is established from the 48 volt line through the normally closed R172–1 points of the handler in area relay through the R62AL points of the tape arms in relay, which points are now closed, through the normally open but now closed R173–2 points of the automatic relay, through the normally closed R171–1 points of the cartridge in discharge relay and through the now closed R174–4 points of the start unload relay whereby the unload relay R69 is energized. The unload relay R69 is held through the R171–2 points which establish a circuit to the unload bus. The unload bus is energized in Fig. 51 by closure of the R69AU points of the unload relay which bridges the 48 volt line and the unload bus.

Figure 50:
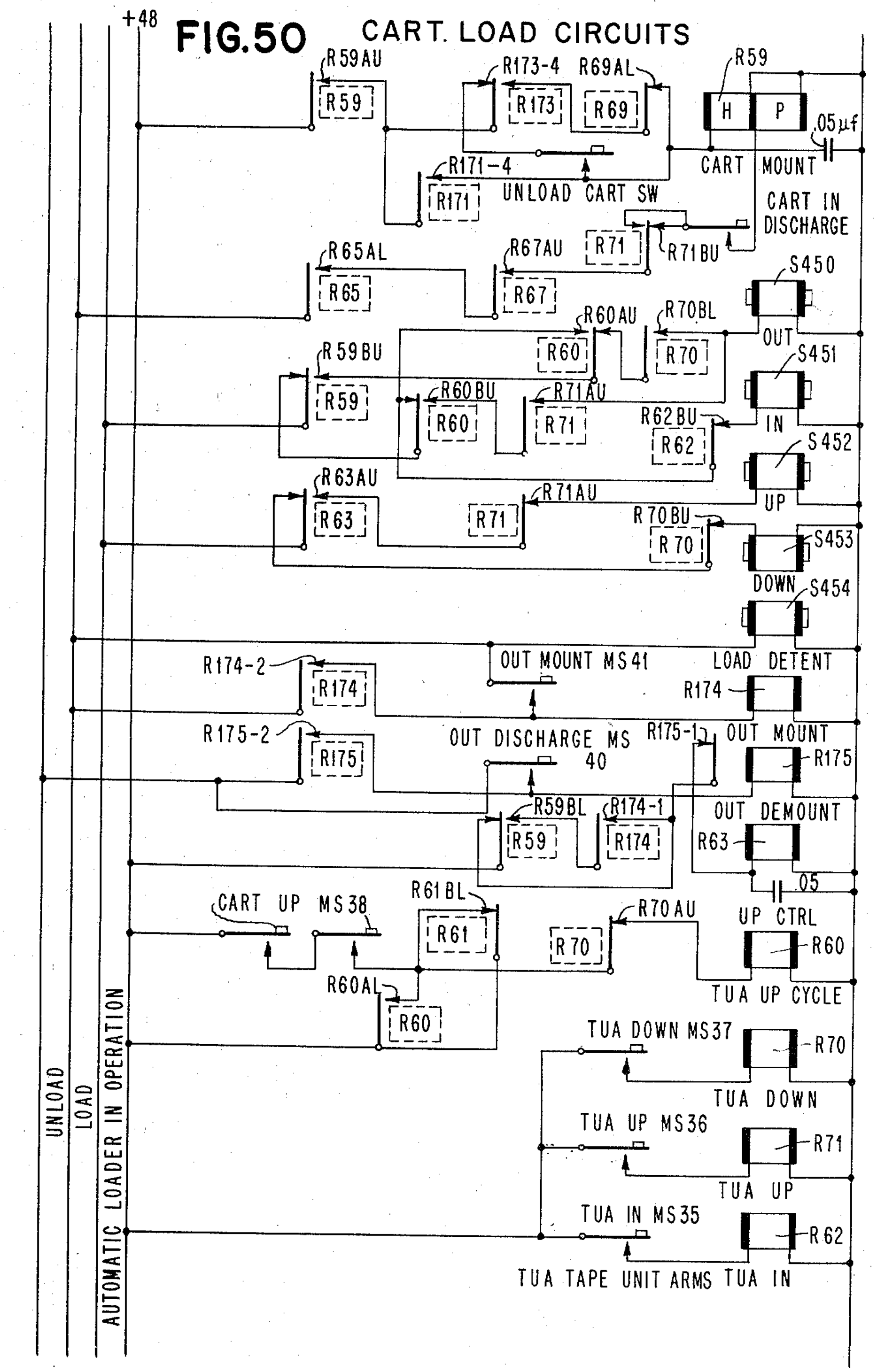

The first step in the tape cartridge unloading operation is the demounting of the cartridge, i.e., its removal from the reel drive spindles of the tape transport unit. To accomplish this, the cartridge mount relay R59 (Fig. 50) is deenergized. The hold coil of the cartridge mount relay R59 is deenergized by opening of the normally closed R69AL points of the unload relay R69 when the latter is energized. The R171–4 points of the cartridge in discharge position relay which are in parallel with the R69AL points of the unload relay would be closed were a cartridge on the discharge track and thereby the cartridge mount relay R59 would be held up such that a demounting operation could not be performed, but in the present operation it has been ascertained that this is not the case. In Fig. 50, the R59BU points of the cartridge mount relay will transfer and complete a circuit through the normally open R60BU points to the normally open but now closed R71BU points of the tape unit arms down relay to energize the out solenoid S450. This solenoid controls air flow to the drive cylinder and drives the tape unit arms outwardly. The tape unit arms now are driven to the unload position because the load detent solenoid S454 is not energized, and, therefore, does not interpose its stop in the path of the actuating piston.

When the tape unit arms reach the outer extreme of their movement, the out discharge microswitch MS40 (Fig. 50) is closed, such that the out demount relay R175 is energized from the unload bus. The out demount relay R175 is then held energized through its own R175–2 points. Energization of the demount relay R175 opens its R175–1 points (Fig. 50) thereby interrupting the circuit of the up control relay R63. When the up control relay R63 is deenergized, it causes the tape unit arms to be lowered as follows. A connection is established from the 48 volt line (Fig. 50) through the normally closed R63AU points of the up control relay and through the normally closed R70BU points of the tape unit arms down relay thereby energizing the down solenoid S453. When the tape unit arms reach their lower position, the tape unit arms down microswitch MS37 (Fig. 50) is closed such that the tape unit arms down relay R70 is energized. The tape unit arms down relay R70 then effectively interrupts the power to the down solenoid S453 by opening its normally closed R70BU points which are in the energizing circuit of the down solenoid S453.

When the tape unit arms down relay R70 is energized, it also interrupts the circuit to the tape unit arms up cycle relay R60, by opening the normally closed R70AU points in the energizing circuit of the tape unit arms up cycle relay. At the same time, the in solenoid S451 is energized through a circuit extending from the R59BU normally closed points of the cartridge mount relay, through the closed R60BU points of the tape unit arms up cycle relay, and through the normally closed R62BU points of the tape unit arms in relay. The tape arms are now driven to their in position. Since the arms were first dropped down and then driven in, the cartridge is left on the demount or discharge track. When the arms reach their home position, the tape unit arm in microswitch MS35 (Fig. 50) is closed thereby completing the circuit from the 48 volt line to the tape unit arms in relay R62 which is energized.

Arrival of the tape unit arms at their in position during an unloading operation is utilized to indicate that it is time for the slide to propel the tape cartridge to the discharge track of the adjacent tape storage unit. In Fig. 51, a connection is established from the unload bus to the tape slide go relay R64 by way of the now closed R175–3 points of the demount relay and the now closed R62AL points of the tape unit arms in relay which has just been energized. This circuit, thus closed, energizes the tape slide go relay R64. Therefore, as seen in Fig. 52, a circuit is established from the 40 volt line through the normally closed R65BL points of the slide out relay, through the now closed R64BL points of the tape slide go relay and to the normally closed R66BL points of the tape slide home relay to energize the forward slide motor relay R250. This completes a circuit to the tape slide motor which operates to drive the tape slide to its extreme outer position for the delivery of a reel cartridge to the discharge track of the adjacent storage unit.

As seen in Fig. 51, the circuit to the unload pick solenoid S456 is broken thereby deenergizing the solenoid and allowing its cartridge engaging finger to drop into the cartridge slot. A connection extends from the automatic loader in operation bus (Fig. 51) to the slide out relay R65 which relay is energized when the slide out microswitch MS34 is closed as the slide reaches its outer position. Therefore, the R65AU points (Fig. 51) of the slide out relay are transferred such that the unload pick solenoid S456 is energized with the result that the cartridge engaging finger controlled thereby is disengaged from the cartridge slot. The slide is now disengaged from the cartridge and can be returned to its home position, leaving the cartridge on the discharge track of the automatic cartridge handler.

As soon as the unload pick finger is elevated under the influence of the unload pick solenoid S456, a circuit is established from the unload bus through the now closed unload pick arm up microswitch MS32 (Fig. 51), this microswitch being closed by the arrival of the cartridge engaging finger in its elevated position. Closure of the microswitch MS32 establishes a circuit from the unload bus to the tape slide reverse relay R66 (Fig. 51).

A circuit is now completed from the 48 volt line (Fig. 52) through the R67BL points of the tape slide home relay to the R64BL points of the tape slide go relay, to the now transferred R66BL points to energize the reverse slide motor relay R251. At the same time, the diode connection applies power to the forward slide motor relay R250 such that the motor circuit is completed to drive the tape slide to its home position. This operation continues until the tape slide home microswitch MS31 (Fig. 51) is closed to energize the tape slide home relay R67. When the tape slide home relay R67 is energized its R67BL points (Fig. 52) are opened so that the forward and reverse slide motor relays R250 and R251 are deenergized. The tape slide will now coast until the tape slide center microswitch MS30 (Fig. 51) is closed and the tape slide center relay R72 is thereby energized. The tape slide center relay when energized functions to impress direct current on the slide motor thereby bringing it to a stop when the tape slide is in its home or center position.

In Fig. 49, it may be observed that a connection extends between the automatic loader in operation bus and the cartridge in discharge relay R171LP. This connection is by way of the points R66BU and the tape slide reverse relay, the points R67AU of the tape slide home relay, the points R178–2 of the handler in area relay and from thence to the cartridge in discharge relay R171LP. This relay is now latch picked to indicate that a cartridge has been deposited on the discharge track of the automatic cartridge handler. By reference to Fig. 52, it will be seen that energization of the cartridge in discharge position relay R171LP interrupts power to the unload relays R69 and R178 by opening the normally closed points R171–2. This marks the end of the unloading operation.

While the fundamentally novel features of the invention have been illustrated and described in connection with a specific embodiment of the invention, it is believed that this embodiment will enable others skilled in the art to apply the principles of the invention in forms departing from the exemplary embodiment herein, and such departures are contemplated by the claims.

What is clamed is:

1. In a device for handling tape reel cartridges, an open sided storage rack having means therein for supporting a plurality of tape reel cartridges, a carriage structure, means for supporting said carriage structure for traversing the open side of said rack, means for selectively aligning said carriage structure with reel cartridges in said rack, mechanism having cartridge engaging means mounted on said carriage, means for projecting said mechanism laterally of said carriage structure to engage a reel cartridge in said rack, means for retracting said structure whereby an engaged reel cartridge is loaded on said carriage structure, means for moving said carriage structure to one of a plurality of selectable positions, and means for discharging a reel cartridge from said carriage at a selected one of said selectable positions.

2. In a device for handling tape reel cartridges, an open sided storage rack having means therein for supporting a plurality of tape reel cartridges, a carriage structure mounted for movement along the open side of said rack, means for selectively aligning said carriage structure with reel cartridges in said rack, cartridge engaging means mounted on said carriage, means for operating said cartridge engaging means to engage a reel cartridge in a selected one of said rack, means for operating said cartridge engaging means whereby an engaged reel cartridge is loaded on said carriage structure, means for moving said carriage structure to one of a plurality of selectable positions, and means for discharging a reel cartridge from said carriage in either lateral direction at a selected one of said selectable positions.

3. In a device for handling tape reel cartridges, an open sided storage rack having means therein for supporting a plurality of tape reel cartridges, a carriage structure, means for supporting said carriage structure for traversing the open side of said rack, means for selectively aligning said carriage structure with reel cartridges in said rack, a slide mechanism having cartridge engaging means mounted on said carriage, means for projecting said slide mechanism laterally of said carriage structure to engage a reel cartridge in said rack, means for retracting said slide structure whereby an engaged reel cartridge is loaded on said carriage structure, means for moving said carriage structure to one of a plurality of selectable positions, and means for operating said slide mechanism to discharge a reel cartridge from said carriage at a selected one of said selectable positions.

4. In a device for handling tape reel cartridges, an open sided storage rack having means therein for supporting a plurality of tape reel cartridges, a carriage structure, rails for supporting said carriage structure for traversing the open side of said rack, means for driving said carriage structure along said rails, detent means for selectively aligning said carriage structure with reel cartridges in said rack, a slide mechanism having cartridge engaging means mounted on said carriage, means for projecting said slide mechanism laterally of said carriage structure to engage a reel cartridge in said rack, means for retracting said slide structure whereby an engaged reel cartridge is loaded on said carriage structure, means for moving said carriage structure to one of a plurality of selectable positions, and means for discharging a reel cartridge from said carriage at a selected one of said selectable positions.

5. In a device for handling tape reel cartridges, an open sided storage rack having means therein for supporting a plurality of tape reel cartridges, a carriage structure, means for supporting said carriage structure for traversing the open side of said rack, means for selectively aligning said carriage structure with reel cartridges in said rack, a slide mechanism having cartridge engaging means mounted on said carriage, means for projecting said slide mechanism to one side of said carriage structure to engage a reel cartridge in said rack, means for retracting said slide structure whereby an engaged reel cartridge is loaded on said carriage structure, means for moving said carriage structure to one of a plurality of selectable positions, and means for projecting said slide mechanism to the other side of said carriage structure for discharging a reel cartridge from said carriage at a selected one of said selectable positions.

6. In a device for handling tape reel cartridges, an open sided storage rack having means therein for supporting a plurality of tape reel cartridges in aligned rows and columns, a carriage structure, means for supporting said carriage structure for traversing the open side of said rack, means for selectively aligning said carriage structure with aligned columns of reel cartridges in said rack, an elevator mounted on said carriage, means for selectively aligning said elevator with a selected row of reel cartridges in said rack, mechanism having cartridge engaging means mounted on said elevator, means for projecting said mechanism laterally of said carriage structure to engage a reel cartridge in said rack, means for retracting said mechanism whereby an engaged reel cartridge is loaded on said elevator, means for moving said carriage structure and said elevator to one of a plurality of selectable positions, and means for discharging a reel cartridge from said carriage at a selected one of said selectable positions.

7. In a device for handling tape reel cartridges, an open sided storage rack having means therein for supporting a plurality of tape reel cartridges in aligned rows and columns, a carriage structure, means for supporting said carriage structure for traversing the open side of said rack, means for selectively aligning said carriage structure with aligned columns of reel cartridges in said rack, an elevator mounted on said carriage, means for selectively aligning said elevator with a selected row of reel cartridges in said rack, a slide mechanism having cartridge engaging means mounted on said elevator, means for projecting said slide mechanism laterally of said carriage structure to engage a reel cartridge in said rack, means for retracting said slide structure whereby an engaged reel cartridge is loaded on said elevator, means for moving said carriage structure and said elevator to one of a plurality of selectable positions, and means for operating said slide mechanism to discharge a reel cartridge from said carriage at a selected one of said selectable positions.

8. In a device for handling tape reel cartridges, an open sided storage rack having means therein for supporting a plurality of tape reel cartridges in aligned rows and columns, a carriage structure, rails for supporting said carriage structure for traversing the open side of said rack, means for driving said carriage structure along said rails, detent means for selectively aligning said carriage structure with aligned columns of reel cartridges in said rack, an elevator mounted on said carriage, means for selectively aligning said elevator with a selected row of reel cartridges in said rack, a slide mechanism having cartridge engaging means mounted on said elevator, means for projecting said slide mechanism laterally of said carriage structure to engage a reel cartridge in said rack, means for retracting said slide structure whereby an engaged reel cartridge is loaded on said elevator, means for moving said carriage structure and said elevator to one of a plurality of selectable positions, and means for discharging a reel cartridge from said carriage at a selected one of said selectable positions.

9. In a device for handling tape reel cartridges, an open sided storage rack having means therein for supporting a plurality of tape reel cartridges in aligned rows and columns, a carriage structure, means for supporting said carriage structure for traversing the open side of said rack, means for selectively aligning said carriage structure with aligned columns of reel cartridges in said rack, an elevator mounted on said carriage, means for selectively aligning said elevator with a selected row of reel cartridges in said rack, a slide mechanism having cartridge engaging means mounted on said elevator, means for projecting said slide mechanism to one side of said carriage structure to engage a reel cartridge in said rack, means for retracting said slide structure whereby an engaged reel cartridge is loaded on said elevator, means for moving said carriage structure and said elevator to one of a plurality of selectable positions, and means for projecting said slide mechanism to the other side of said carriage structure for discharging a reel cartridge from said carriage at a selected one of said selectable positions.

10. In a device for handling tape reel cartridges, an open sided storage rack having rails therein for supporting a plurality of tape reel cartridges in aligned rows and columns, a carriage structure, rails for supporting said carriage structure for traversing the open side of said rack, means for selectively aligning said carriage structure with aligned columns of reel cartridges in said rack, an elevator including a supporting rail mounted on said carriage, means for selectively aligning said elevator carried supporting rail with a selected storage rack rail, a mechanism having cartridge engaging means mounted on said elevator, means for projecting said mcehanism laterally of said carriage structure to engage a reel cartridge in said rack, means for retracting said slide structure whereby an engaged reel cartridge is transferred to said elevator carried supporting rail, means for moving said carriage structure and said elevator to one of a plurality of selectable positions, and means for discharging a reel cartridge from said carriage at a selected one of said selectable positions.

11. In a device for handling tape reel cartridges, an open sided storage rack having parallel tracks therein for suspending a plurality of tape reel cartridges, a carriage structure, means for supporting said carriage structure for traversing the open side of said rack, means for selectively aligning said carriage structure with reel cartridges in said rack, a reel cartridge supporting track carried by said carriage structure, a mechanism having cartridge engaging means mounted on said carriage, means for projecting said mechanism laterally of said carriage structure to engage a reel cartridge in said rack, means for retracting said mechanism whereby an engaged reel cartridge is loaded on said reel cartridge supporting track of said carriage structure, means for moving said carriage structure into alignment with a selected one of said parallel tracks, and means for transferring a reel cartridge from said reel cartridge supporting track of said carriage structure to the selected one of said parallel tracks.

12. In a device for handling tape reel cartridges, an open sided storage rack having parallel tracks therein for suspending a plurality of tape reel cartridges, a carriage structure, means for supporting said carriage structure for traversing the open side of said rack, means for selectively aligning said carriage structure with reel cartridges in said rack, a reel cartridge supporting track carried by said carriage structure, a slide mechanism having cartridge engaging means mounted on said carriage, means for projecting said slide mechanism laterally of said carriage structure to engage a reel cartridge in said rack, means for retracting said slide mechanism whereby an engaged reel cartridge is loaded on said reel cartridge supporting track of said carriage structure, means for moving said carriage structure into alignment with a selected one of said parallel tracks, and means for transferring a reel cartridge from said reel cartridge supporting track of said carriage structure to the selected one of said parallel tracks.

13. In a device for handling tape reel cartridges, an open sided storage rack having parallel tracks therein for suspending a plurality of tape reel cartridges, a carriage structure, means for supporting said carriage structure for traversing the open side of said rack, means for selectively aligning said carriage structure with reel cartridges in said rack, a reel cartridge supporting track carried by said carriage structure, a mechanism having cartridge engaging means mounted on said carriage, means for projecting said mechanism laterally of said carriage structure to engage a reel cartridge in said rack, means for retracting said slide structure whereby an engaged reel cartridge is loaded on said reel cartridge supporting track of said carriage structure, means for moving said carriage structure into alignment with a selected one of said parallel tracks, and means for operating said slide mechanism to transfer a reel cartridge from said reel cartridge supporting track of said carriage structure to the selected one of said parallel tracks.

14. In a device for handling tape reel cartridges, an open sided storage rack having parallel tracks therein for suspending a plurality of tape reel cartridges, a carriage structure, rails for supporting said carriage structure for traversing the open side of said rack, means for driving said carriage structure along said rails, detent means for selectively aligning said carriage structure with reel cartridges in said rack, a reel cartridge supporting track carried by said carriage structure, a mechanism having cartridge engaging means mounted on said carriage, means for projecting said mechanism laterally of said carriage structure to engage a reel cartridge in said rack, means for retracting said slide structure whereby an engaged reel cartridge is loaded on said reel cartridge supporting track of said carriage structure, means for moving said carriage structure into alignment with a selected one of said parallel tracks, and means for transferring a reel cartridge from said reel cartridge supporting track of said carriage structure to the selected one of said parallel tracks.

15. In a device for handling tape reel cartridges, a pair of open sided storage racks arranged in spaced, confronting, parallel relation to each other having means therein for supporting a plurality of tape reel cartridges, a carriage structure mounted between said racks for traversing the confronting open sides thereof, means for selectively aligning said carriage structure with reel cartridges in said racks, mechanism having cartridge engaging means mounted on said carriage, means for selectively projecting said mechanism laterally in either direction of said carriage structure to engage a reel cartridge in a selected one of said racks, means for retracting said slide structure whereby an engaged reel cartridge is loaded on said carriage structure, means for moving said carriage structure to one of a plurality of selectable positions, and means for discharging a reel cartridge from said carriage in either lateral direction at a selected one of said selectable positions.

16. In a device for handling tape reel cartridges, a pair of open sided storage racks arranged in spaced, confronting, parallel relation to each other having means therein for supporting a plurality of tape reel cartridges, a carriage structure mounted between said racks for traversing the confronting open sides thereof, means for selectively aligning said carriage structure with reel cartridges in said racks, a slide mechanism having cartridge engaging means mounted on said carriage, means for selectively projecting said slide mechanism laterally in either direction of said carriage structure to engage a reel cartridge in a selected one of said racks, means for retracting said slide mechanism whereby an engaged reel cartridge is loaded on said carriage structure, means for moving said carriage structure to one of a plurality of selectable positions, and means for operating said slide mechanism to discharge a reel cartridge from said carriage in either lateral direction at a selected one of said selectable positions.

17. In a device for handling tape reel cartridges, a pair of open sided storage racks arranged in spaced, confronting, parallel relation to each other having means therein for supporting a plurality of tape reel cartridges, a carriage structure mounted on rails between said racks for traversing the confronting open sides thereof, means for driving said carriage structure along said rails, detent means for selectively aligning said carriage structure with reel cartridges in said racks, mechanism having cartridge engaging means mounted on said carriage, means for selectively projecting said mechanism laterally in either direction of said carriage structure to engage a reel cartridge in a selected one of said racks, means for retracting said slide structure whereby an engaged reel cartridge is loaded on said carriage structure, means for moving said carriage structure to one of a plurality of selectable positions, and means for discharging a reel cartridge from said carriage in either lateral direction at a selected one of said selectable positions.

18. In a device for handling tape reel cartridges, a pair of open sided storage racks arranged in spaced, confronting, parallel relation to each other having means therein for supporting a plurality of tape reel cartridges, a carriage structure mounted between said racks for traversing the confronting open sides thereof, means for selectively aligning said carriage structure with reel cartridges in said racks, a slide mechanism having cartridge engaging means mounted on said carriage, means for selectively projecting said slide mechanism laterally in either direction of said carriage structure to engage a reel cartridge in a selected one of said racks, means for retracting said slide structure whereby an engaged reel cartridge is loaded on said carriage structure, means for moving said carriage structure to one of a plurality of selectable positions, and means for projecting said slide mechanism for discharging a reel cartridge from said carriage in either lateral direction at a selected one of said selectable positions.

19. In a device for handling tape reel cartridges, an open sided storage rack having means therein for supporting a plurality of tape reel cartridges, a carriage structure, means for supporting said carriage structure for traversing the open side of said rack, means for selectively aligning said carriage structure with reel cartridges in said rack, a mechanism having cartridge engaging means mounted on said carriage, means for projecting said mechanism laterally of said carriage structure for engaging a reel cartridge in said rack, means for retracting said mechanism whereby an engaged reel cartridge is loaded on said carriage structure, a reel cartridge discharge position located laterally of said carriage structure, means for moving said carriage structure to align a reel cartridge thereon with said discharge position, means for operating said mechanism to discharge a reel cartridge from said carriage into said laterally located discharge position, a tape transport mechanism having a pair of tape reel driving spindles adapted to accommodate a pair of cartridge encased tape reels in driving relation, means for supporting a tape reel cartridge wherein tape reels within such cartridge are axially aligned with said reel driving spindles, a tape reel cartridge shifting mechanism mounted on said tape transport mechanism adapted to shift a tape reel cartridge from said discharge position to a position on said supporting means, and tape transport supported tape reel mounting means adapted to engage a tape reel cartridge on said supporting means and mount the tape reels contained in such cartridge upon the spindles on said tape transport.

20. In a device for handling tape reel cartridges, an open sided storage rack having means therein for supporting a plurality of tape reel cartridges, a carriage structure, means for supporting said carriage structure for traversing the open side of said rack, means for selectively aligning said carriage structure with reel cartridges in said rack, a slide mechanism having cartridge engaging means mounted on said carriage, means for projecting said slide mechanism laterally of said carriage structure for engaging a reel cartridge in said rack, means for retracting said slide mechanism whereby an engaged reel cartridge is loaded on said carriage structure, a reel cartridge discharge position located laterally of said carriage structure, means for moving said carriage structure to align a reel cartridge thereon with said discharge position, means for operating said slide mechanism to discharge a reel cartridge from said carriage into said laterally located discharge position, a tape transport mechanism having a pair of tape reel driving spindles adapted to accommodate a pair of cartridge encased tape reels in driving relation, means for supporting a tape reel cartridge wherein tape reels within such cartridge are axially aligned with said reel driving spindles, a tape reel cartridge shifting mechanism mounted on said tape transport mechanism adapted to shift a tape reel cartridge from said discharge position to a position on said supporting means, and tape transport supported tape reel mounting means adapted to engage a tape reel cartridge on said supporting means and mount the tape reels contained in such cartridge upon the spindles of said tape transport.

21. In a device for handling tape reel cartridges, an open sided storage rack having means therein for supporting a plurality of tape reel cartridges, a carriage structure, means for supporting said carriage structure for traversing the open side of said rack, means for driving said carriage structure along said carriage supporting means, detent means for selectively aligning said carriage structure with reel cartridges in said rack, a slide mechanism having cartridge engaging means mounted on said carriage, means for projecting said slide mechanism laterally of said carriage structure for engaging a reel cartridge in said rack, means for retracting said slide structure whereby an engaged reel cartridge is loaded on said carriage structure, a reel cartridge discharge position located laterally of said carriage structure, means for moving said carriage structure to align a reel cartridge thereon with said discharge position, means for operating said slide mechanism to discharge a reel cartridge from said carriage into said laterally located discharge position, a tape transport mechanism having a pair of tape reel driving spindles adapted to accommodate a pair of cartridge encased tape reels in driving relation, means for supporting a tape reel cartridge wherein tape reels within such cartridge are axially aligned with said reel driving spindles, a tape reel cartridge shifting mechanism mounted on said tape transport mechanism adapted to shift a tape reel cartridge from said discharge position to a position on said supporting means, and tape transport supported tape reel mounting means adapted to engage a tape reel cartridge on said supporting means and mount the tape reels contained in such cartridge upon the spindles of said tape transport.

22. In a device for handling tape reel cartridges, an open sided storage rack having tracks therein for supporting a plurality of tape reel cartridges, a carriage structure, a cartridge supporting track on said carriage structure, a track for supporting said carriage structure for tranversing the open side of said rack, means for driving said carriage structure along said carriage supporting track, detent means for selectively aligning said carriage supported track structure with reel cartridges supporting tracks in said rack, a slide mechanism having cartridge engaging means mounted on said carriage, means for projecting said slide mechanism laterally of said carriage structure for engaging a reel cartridge in said rack, means for retracting said slide structure whereby an engaged reel cartridge is transferred from said rack track to said carriage supported track, a reel cartridge dischage track located laterally of said carriage structure, means for moving said carriage structure to align said track thereon with said discharge track, means for operating said slide mechanism to discharge a reel cartridge from said carriage supported track to said discharge track, a tape transport mechanism having a pair of tape reel driving spindles adapted to accommodate a pair of cartridge encased tape reels in driving relation, means for supporting a tape reel cartridge wherein tape reels within such cartridge are axially aligned with said reel driving spindles, a tape reel cartridge shifting mechanism mounted on said tape transport mechanism adapted to shift a tape reel cartridge from said discharge position to a position on said supporting means, and tape transport supported tape reel mounting means adapted to engage a tape reel cartridge on said supporting means and mount the tape reels contained in such cartridge upon the spindles of said tape transport.

23. In a device for handling tape reel cartridges, an open sided storage rack having means therein for supporting a plurality of tape reel cartridges, a carriage structure, means for supporting said carriage structure for traversing the open side of said rack, means for selectively aligning said carriage structure with reel cartridges in said rack, a slide mechanism having cartridge engaging means mounted on said carriage, means for projecting said slide mechanism laterally of said carriage structure for engaging a reel cartridge in said rack, means for retracting said slide structure whereby an engaged reel cartridge is loaded on said carriage structure, a reel cartridge discharge position located laterally of said carriage structure, means for moving said carriage structure to align a reel cartridge thereon with said discharge position, means for operating said slide mechanism to discharge a reel cartridge from said carriage into said laterally located discharge position, a tape transport mechanism having a pair of tape reel driving spindles adapted to accommodate a pair of cartridge encased tape reels in driving relation, a pair of parallel tracks for supporting a tape reel cartridge wherein tape reels within such cartridge are axially aligned with said reel driving spindles, a tape reel cartridge shifting slide mechanism mounted on said tape transport mechanism adapted to shift a tape reel cartridge from said discharge position to a position on one of said tracks, tape transport supported tape reel mounting means adapted to engage a tape reel cartridge on said track and mount the tape reels contained in such cartridge upon the spindles of said tape transport, means for thereafter operating said transport supported reel mounting means for transferring a reel from said spindles to the other of said tracks, and means for aligning said carriage structure with said second track.

24. In a device for handling tape reel cartridges, an open sided storage rack having means therein for supporting a plurality of tape reel cartridges, a carriage structure, means for supporting said carriage structure for traversing the open side of said rack, means for selectively aligning said carriage structure with reel cartridges in said rack, mechanism having cartridge engaging means mounted on said carriage, means for projecting said mechanism laterally of said carriage structure to engage a reel cartridge in said rack, means for retracting said slide structure whereby an engaged reel cartridge is loaded on said carriage structure, a reel cartridge discharge position located laterally of said carriage structure, means for moving said carriage structure to align a reel cartridge thereon with said discharge position, means for operating said slide mechanism to discharge a reel cartridge from said carriage into said laterally located discharge position, a tape transport mechanism having a pair of tape reel driving spindles adapted to accommodate a pair of cartridge encased tape reels in driving relation, a pair of parallel tracks for supporting a tape reel cartridge wherein tape reels within such cartridge are axially aligned with said reel driving spindles, a tape reel cartridge shifting mechanism mounted on said tape transport mechanism adapted to shift a tape reel cartridge from said discharge position to a position on one of said tracks, tape transport supported tape reel mounting means adapted to engage a tape reel cartridge on said track and mount the tape reels contained in such cartridge upon the spindles of said tape transport, and means for thereafter operating said transport supported reel mounting means for transferring a tape reel cartridge from said spindles to the other of said tracks.

25. In a device for handling tape reel cartridges, an open side storage rack having parallel reel cartridge supporting tracks therein for supporting a plurality of tape reel cartridges, a carriage structure, a reel cartridge supporting track on said carriage structure, means for traversing said carriage structure along the open side of said rack, means for selectively aligning said reel cartridge supporting track on said carriage structure with reel cartridge supporting tracks in said rack, means for transferring a reel cartridge from an aligned reel cartridge supporting track in said rack to said reel cartridge supporting track on said carriage, means for moving said carriage structure to another selected one of said parallel reel cartridge supporting tracks, and means for transferring a reel cartridge from said reel cartridge supporting track on said carriage to such other selected one of said parallel reel cartridge supporting tracks.

No references cited.